(12) United States Patent
Murrow et al.

(10) Patent No.: US 11,053,014 B2
(45) Date of Patent: Jul. 6, 2021

(54) VERTICAL TAKEOFF AND LANDING AIRCRAFT

(71) Applicant: General Electric Company, Schenectady, NY (US)

(72) Inventors: Kurt David Murrow, Liberty Township, OH (US); Andrew Breeze-Stringfellow, Montgomery, OH (US); Darek Tomasz Zatorski, Fort Wright, KY (US); Dominic Barone, Centerville, OH (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 16/042,299

(22) Filed: Jul. 23, 2018

(65) Prior Publication Data

US 2019/0023390 A1    Jan. 24, 2019

Related U.S. Application Data

(60) Provisional application No. 62/535,444, filed on Jul. 21, 2017.

(51) Int. Cl.
*B64D 27/24* (2006.01)
*B64C 29/00* (2006.01)
(Continued)

(52) U.S. Cl.
CPC .............. *B64D 27/24* (2013.01); *B64C 3/10* (2013.01); *B64C 3/32* (2013.01); *B64C 3/38* (2013.01); *B64C 29/0025* (2013.01); *B64D 27/08* (2013.01); *B64D 29/04* (2013.01); *B64D 31/06* (2013.01); *B64D 33/04* (2013.01); *B64D 35/02* (2013.01); *B64D 27/02* (2013.01);
(Continued)

(58) Field of Classification Search
CPC ....... B64C 9/38; B64C 27/26; B64C 29/0016; B64C 29/0025; B64C 2201/088
See application file for complete search history.

(56) References Cited

U.S. PATENT DOCUMENTS 2,973,166 A * 2/1961 Bernhardt ........... B64C 29/0025
                                                    244/23 R
3,083,935 A    4/1963 Piasecki
(Continued)

FOREIGN PATENT DOCUMENTS

DE    202015003815 U1    7/2015
DE    202016005012 U1    9/2016
(Continued)

OTHER PUBLICATIONS

European Search Report Corresponding to EP Application No. 181848904 dated Sep. 24, 2018.

*Primary Examiner* — Joseph W Sanderson
(74) *Attorney, Agent, or Firm* — Dority & Manning, P.A.

(57) ABSTRACT

A method for operating a vertical takeoff and landing aircraft includes modifying a first variable component of a wing associated with a first portion of the plurality of vertical thrust electric fans relative to a second variable component of the wing associated with a second portion of the plurality of vertical thrust electric fans to adjust an exposure ratio of the first portion of the plurality of vertical thrust electric fans relative to the second portion of the plurality of vertical thrust electric fans.

18 Claims, 24 Drawing Sheets

(51) Int. Cl.
*B64C 3/38* (2006.01)
*B64D 29/04* (2006.01)
*B64C 3/10* (2006.01)
*B64D 27/08* (2006.01)
*B64C 3/32* (2006.01)
*B64D 35/02* (2006.01)
*B64D 33/04* (2006.01)
*B64D 31/06* (2006.01)
*B64D 27/02* (2006.01)
*B64D 27/26* (2006.01)
*H02K 7/18* (2006.01)

(52) U.S. Cl.
CPC ........ *B64D 27/26* (2013.01); *B64D 2027/026* (2013.01); *F05D 2220/76* (2013.01); *F05D 2270/093* (2013.01); *H02K 7/1823* (2013.01)

(56) References Cited

U.S. PATENT DOCUMENTS

| | | | |
|---|---|---|---|
| 3,128,970 A | 4/1964 | Tinajero et al. | |
| 3,161,374 A | 12/1964 | Allred et al. | |
| 3,171,613 A * | 3/1965 | James | B64C 29/0016 244/12.3 |
| 3,206,929 A | 9/1965 | Marchant et al. | |
| 3,212,731 A | 10/1965 | Kappus | |
| 3,220,669 A | 11/1965 | Lewis et al. | |
| 3,249,323 A | 5/1966 | Vanderlip | |
| 3,388,878 A | 6/1968 | Peterson et al. | |
| 3,499,620 A | 3/1970 | Haberkorn et al. | |
| 3,618,875 A | 11/1971 | Kappus | |
| 3,730,456 A * | 5/1973 | Morgan | B64C 29/005 244/12.3 |
| 3,762,667 A | 10/1973 | Pender | |
| 4,469,294 A | 9/1984 | Clifton | |
| 4,789,115 A | 12/1988 | Koutsoupidis | |
| 4,828,203 A | 5/1989 | Clifton et al. | |
| 5,054,716 A | 10/1991 | Wilson | |
| 5,141,176 A | 8/1992 | Kress et al. | |
| 5,209,428 A | 5/1993 | Bevilaqua et al. | |
| 5,244,167 A * | 9/1993 | Turk | B64C 9/38 244/12.1 |
| 5,312,069 A | 5/1994 | Bollinger et al. | |
| 5,320,305 A | 6/1994 | Oatway et al. | |
| 5,542,625 A | 8/1996 | Burhans, Jr. et al. | |
| 5,758,844 A | 6/1998 | Cummings | |
| 5,765,777 A | 6/1998 | Schmittle | |
| 5,769,317 A | 6/1998 | Sokhey et al. | |
| 6,036,142 A | 3/2000 | Yates | |
| 6,270,037 B1 | 8/2001 | Freese et al. | |
| 6,729,575 B2 | 5/2004 | Bevilaqua | |
| 6,860,449 B1 | 3/2005 | Chen | |
| 6,892,980 B2 | 5/2005 | Kawai | |
| 7,104,499 B1 | 9/2006 | Arata | |
| 7,114,685 B1 | 10/2006 | Schulein | |
| 7,188,802 B2 * | 3/2007 | Magre | B64C 29/0033 244/7 R |
| 7,249,734 B2 | 7/2007 | Yurkovich | |
| 7,410,122 B2 | 8/2008 | Robbins et al. | |
| 7,412,825 B2 | 8/2008 | Muylaert | |
| 7,665,689 B2 | 2/2010 | McComb | |
| 7,735,774 B2 | 6/2010 | Lugg | |
| 7,806,362 B2 | 10/2010 | Yoeli | |
| 7,857,253 B2 | 12/2010 | Yoeli | |
| 7,857,254 B2 | 12/2010 | Parks | |
| 7,866,598 B2 | 1/2011 | Waide et al. | |
| 8,016,226 B1 | 9/2011 | Wood | |
| 8,128,019 B2 | 3/2012 | Annati et al. | |
| 8,336,806 B2 | 12/2012 | Dierksmeier | |
| 8,408,490 B2 | 4/2013 | McDonnell | |
| 8,544,787 B2 * | 10/2013 | Lee | B64C 3/385 244/7 R |
| 8,622,335 B2 | 1/2014 | Yoeli | |
| 8,640,985 B2 * | 2/2014 | Brunken, Jr. | B64C 29/0033 244/39 |
| 8,655,510 B2 * | 2/2014 | Eglin | B64C 27/26 701/3 |
| 8,733,690 B2 * | 5/2014 | Bevirt | B64C 29/0033 244/12.4 |
| 8,757,538 B2 | 6/2014 | Siefert | |
| 8,777,150 B2 * | 7/2014 | Wang | B64C 29/0033 244/7 R |
| 8,870,114 B2 * | 10/2014 | Botti | B64D 27/04 244/54 |
| 8,907,595 B2 * | 12/2014 | Weibel | H02P 5/74 318/3 |
| 8,915,464 B2 * | 12/2014 | Ferrier | B64C 27/26 244/12.3 |
| 8,915,467 B2 | 12/2014 | Narasimha et al. | |
| 8,931,732 B2 * | 1/2015 | Sirohi | B64D 27/24 244/17.21 |
| 9,008,942 B2 * | 4/2015 | Dyrla | B64C 27/14 701/99 |
| 9,010,693 B1 | 4/2015 | Barbieri | |
| 9,085,355 B2 | 7/2015 | DeLorean | |
| 9,126,678 B2 * | 9/2015 | Ross | B64C 29/0033 |
| 9,132,915 B2 | 9/2015 | Zhu | |
| 9,162,771 B2 * | 10/2015 | Roggemans | B64D 27/24 |
| 9,174,728 B2 * | 11/2015 | Altmikus | H02K 16/00 |
| 9,187,174 B2 * | 11/2015 | Shaw | B64C 27/28 |
| 9,199,732 B2 * | 12/2015 | Isaac | B64D 35/00 |
| 9,227,721 B1 | 1/2016 | Nguyen | |
| 9,242,729 B1 * | 1/2016 | Wang | B64C 1/00 |
| 9,248,908 B1 * | 2/2016 | Luyks | B64C 27/12 |
| 9,278,753 B2 | 3/2016 | Reckzeh et al. | |
| 9,284,059 B2 * | 3/2016 | Prud'Homme-Lacroix | B64D 27/02 |
| 9,327,822 B1 | 5/2016 | Melton et al. | |
| 9,346,542 B2 * | 5/2016 | Leng | B64C 29/00 |
| 9,481,457 B2 | 11/2016 | Alber | |
| 9,676,479 B2 | 6/2017 | Brody et al. | |
| 9,682,774 B2 | 6/2017 | Paduano et al. | |
| 9,714,090 B2 * | 7/2017 | Frolov | B64C 39/024 |
| 9,731,818 B2 | 8/2017 | Dekel et al. | |
| 10,293,914 B2 * | 5/2019 | Wiegand | B64D 27/02 |
| 10,427,784 B2 * | 10/2019 | Parks | B64C 29/0016 |
| 10,737,797 B2 * | 8/2020 | Murrow | B64D 33/04 |
| 2003/0080242 A1 | 5/2003 | Kawai | |
| 2005/0133662 A1 | 6/2005 | Magre | |
| 2006/0192046 A1 * | 8/2006 | Heath | B64D 35/04 244/12.3 |
| 2008/0230656 A1 * | 9/2008 | Kretchmer | B64C 27/26 244/7 R |
| 2012/0091257 A1 | 4/2012 | Wolff et al. | |
| 2012/0280091 A1 | 11/2012 | Saiz | |
| 2013/0140404 A1 * | 6/2013 | Parks | B64C 27/24 244/23 A |
| 2013/0251525 A1 * | 9/2013 | Saiz | B64C 39/06 416/23 |
| 2014/0060004 A1 | 3/2014 | Mast et al. | |
| 2014/0097290 A1 * | 4/2014 | Leng | B64D 17/00 244/6 |
| 2014/0158816 A1 * | 6/2014 | DeLorean | B64C 27/32 244/12.4 |
| 2015/0274289 A1 | 10/2015 | Newman et al. | |
| 2015/0314865 A1 | 11/2015 | Bermond et al. | |
| 2016/0167780 A1 | 6/2016 | Giovenga | |
| 2016/0214710 A1 | 7/2016 | Brody et al. | |
| 2016/0311522 A1 * | 10/2016 | Wiegand | B64C 3/385 |
| 2016/0333822 A1 | 11/2016 | Roberts | |
| 2016/0347447 A1 | 12/2016 | Judas et al. | |
| 2016/0368600 A1 * | 12/2016 | Frolov | B64C 39/10 |
| 2017/0029131 A1 * | 2/2017 | Steinwandel | B64C 39/024 |
| 2017/0057631 A1 | 3/2017 | Fredericks et al. | |
| 2017/0121029 A1 | 5/2017 | Blyth et al. | |
| 2017/0158322 A1 * | 6/2017 | Ragland | B64C 29/0025 |
| 2017/0159674 A1 | 6/2017 | Maciolek | |
| 2017/0197709 A1 | 7/2017 | Fink et al. | |
| 2017/0197711 A1 | 7/2017 | King et al. | |
| 2017/0203839 A1 | 7/2017 | Giannini et al. | |
| 2017/0234447 A1 | 8/2017 | Jennings et al. | |
| 2017/0240274 A1 | 8/2017 | Regev | |
| 2017/0327219 A1 | 11/2017 | Alber | |

(56) References Cited

U.S. PATENT DOCUMENTS

| | | | |
|---|---|---|---|
| 2018/0105267 A1* | 4/2018 | Tighe | B64D 29/02 |
| 2018/0141652 A1 | 5/2018 | Deslypper | |
| 2018/0162525 A1* | 6/2018 | St. Clair | B64C 5/02 |
| 2018/0290736 A1* | 10/2018 | Mikic | B64C 3/32 |
| 2019/0023391 A1* | 1/2019 | Murrow | B64C 29/0025 |
| 2019/0023408 A1* | 1/2019 | Murrow | B64D 31/06 |
| 2019/0047680 A1* | 2/2019 | Murrow | B64D 35/02 |
| 2019/0047681 A1* | 2/2019 | Murrow | B64D 33/04 |
| 2019/0047716 A1* | 2/2019 | Murrow | B64C 3/32 |
| 2019/0047717 A1* | 2/2019 | Murrow | B64C 29/0025 |
| 2019/0047718 A1* | 2/2019 | Murrow | B64D 29/04 |
| 2019/0047719 A1* | 2/2019 | Murrow | B64D 27/24 |
| 2019/0061964 A1* | 2/2019 | Murrow | B64C 3/38 |
| 2019/0112039 A1* | 4/2019 | Pfaller | B64C 27/26 |
| 2019/0270517 A1* | 9/2019 | Morgan | B64C 7/02 |
| 2019/0291860 A1* | 9/2019 | Morgan | B64D 35/04 |
| 2019/0375492 A1* | 12/2019 | Lee | B64C 11/001 |

FOREIGN PATENT DOCUMENTS

| | | |
|---|---|---|
| ES | 2288083 A1 | 12/2007 |
| WO | WO2016181044 A1 | 11/2016 |

\* cited by examiner

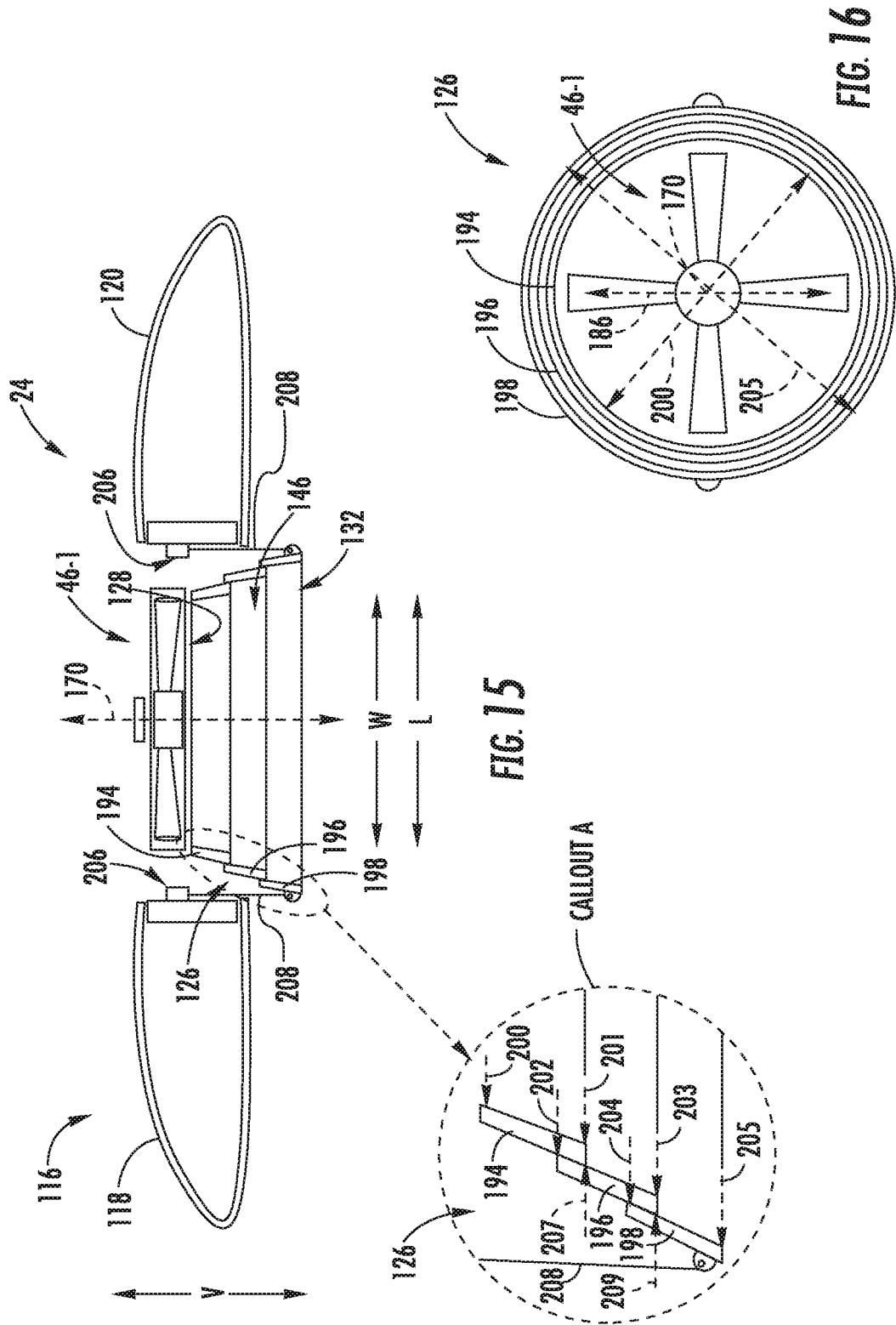

VERTICAL TAKEOFF AND LANDING AIRCRAFT

RELATED APPLICATION

The present application is based upon and claims priority to U.S. Provisional Patent Application Ser. No. 62/535,444, filed on Jul. 21, 2017.

FIELD

The present subject matter relates generally to an aircraft having vertical takeoff and landing capabilities, and a method for controlling the same.

BACKGROUND

Aircraft have been developed with a capability for performing vertical takeoff and landings. Such a capability may allow for the aircraft to reach relatively rugged terrains and remote locations, where it may be impractical or infeasible to construct a runway large enough to allow for a traditional aircraft (lacking vertical takeoff capability) to takeoff or land.

Typically these aircraft that are capable of performing vertical takeoff and landings have engines and propulsors that are vectored to generate both vertical thrust and forward thrust. These propulsors may be relatively large to generate an amount of thrust required for vertical takeoff and landings, as well as for forward flight. However, such a configuration may create complications, as the propulsors are generally designed to be most efficient during one of vertical thrust operations or forward thrust operations. Such may therefore lead to inefficiencies within the aircraft. Accordingly, a vertical takeoff and landing aircraft designed to address these inefficiencies would be useful.

BRIEF DESCRIPTION

Aspects and advantages of the invention will be set forth in part in the following description, or may be obvious from the description, or may be learned through practice of the invention.

In one aspect of the present disclosure a method for operating a vertical takeoff and landing aircraft, the aircraft including a fuselage, a wing extending from the fuselage, and a propulsion system having a plurality of vertical thrust electric fans arranged along the wing is provided. The method includes modifying a first variable component of the wing associated with a first portion of the plurality of vertical thrust electric fans relative to a second variable component of the wing associated with a second portion of the plurality of vertical thrust electric fans to adjust an exposure ratio of the first portion of the plurality of vertical thrust electric fans relative to the second portion of the plurality of vertical thrust electric fans.

In certain exemplary aspects modifying the first variable component relative to the second variable component includes positioning the first variable component in a forward thrust position.

For example, in certain exemplary aspects positioning the first variable component in the vertical thrust position includes substantially completely enclosing the first portion of the plurality of forward thrust electric fans.

For example, in certain exemplary aspects modifying the first variable component relative to the second variable component further includes positioning the second variable component in a vertical thrust position.

For example, in certain exemplary aspects positioning the second variable component in the vertical thrust position includes substantially completely exposing the second portion of the plurality of vertical thrust electric fans in the wing.

For example, in certain exemplary aspects the method further includes providing the first portion of the plurality of vertical thrust electric fans with a first amount of electrical power and providing the second portion of the plurality of vertical thrust electric fans with a second amount of electrical power, and wherein the first amount of electrical power is less than the second amount of electrical power.

In certain exemplary aspects modifying the first variable component relative to the second variable component includes positioning the first variable component in a middle position, and wherein positioning the first variable component in the middle position includes partially exposing the first portion of the plurality of vertical thrust electric fans and partially enclosing the first portion of the plurality of vertical thrust electric fans.

In certain exemplary aspects the first variable component is spaced from the second variable component along a length of the wing.

In certain exemplary aspects each of the plurality of vertical thrust electric fans are fixed in orientation within the wing and arranged substantially linearly along the length of the wing.

In certain exemplary aspects the first variable component of the wing is a first partial wing assembly, wherein the second variable component of the wing is a second partial wing assembly.

In certain exemplary aspects the wing is a starboard wing, wherein the plurality of vertical thrust electric fans is a first plurality of vertical thrust electric fans, wherein the aircraft further includes a port wing extending from the fuselage, wherein the propulsion system includes a second plurality of vertical thrust electric fans arranged along the port wing, and wherein the method further includes: modifying a first variable component of the port wing associated with a first portion of the second plurality of vertical thrust electric fans relative to a second variable component of the port wing associated with a second portion of the second plurality of vertical thrust electric fans to adjust an exposure ratio of the first portion of the second plurality of vertical thrust electric fans relative to the second portion of the second plurality of vertical thrust electric fans.

In another exemplary embodiment of the present disclosure, a method for operating a vertical takeoff and landing aircraft, the aircraft including a fuselage, a wing extending from the fuselage, and a propulsion system having a plurality of vertical thrust electric fans arranged along the wing is provided. The method includes modifying a first variable component of the wing associated with a first portion of the plurality of vertical thrust electric fans relative to a second variable component of the wing associated with a second portion of the plurality of vertical thrust electric fans to adjust an effective thrust profile of the first portion of the plurality of vertical thrust electric fans relative to an effective thrust profile of the second portion of the plurality of vertical thrust electric fans.

In certain exemplary aspects the first variable component is a first diffusion assembly, and wherein the second variable component is a second diffusion assembly.

For example, in certain exemplary aspects modifying the first variable component relative to the second variable component includes positioning the first diffusion assembly in an extended position.

For example, in certain exemplary aspects modifying the first variable component relative to the second variable component further includes positioning the second diffusion assembly in a retracted position.

For example, in certain exemplary aspects modifying the first variable component relative to the second variable component includes modifying a diffusion area ratio of the first diffusion assembly relative to a diffusion area ratio of the second diffusion assembly.

In certain exemplary aspects the first variable component is spaced from the second variable component along a length of the wing.

In certain exemplary aspects each of the plurality of vertical thrust electric fans are fixed in orientation within the wing and arranged substantially linearly along the length of the wing.

In certain exemplary aspects the first variable component of the wing is a first partial wing assembly, wherein the second variable component of the wing is a second partial wing assembly.

In one exemplary embodiment of the present disclosure, an aircraft defining a vertical direction is provided. The aircraft includes a fuselage; a propulsion system including a power source and a plurality of vertical thrust electric fans driven by the power source; and a wing extending from the fuselage. The plurality of vertical thrust electric fans are arranged along a length of the wing, the wing including a variable geometry assembly including a first variable component associated with a first portion of the plurality of vertical thrust electric fans and a second variable component associated with a second portion of the plurality of vertical thrust electric fans, the first variable component moveable relative to the second variable component to adjust an exposure ratio of the first portion of the plurality of vertical thrust electric fans relative to the second portion of the plurality of vertical thrust electric fans.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 15 is a side, schematic, cross-sectional view of the wing of the aircraft having the exemplary diffusion assembly of FIG. 14, with the wing in a vertical flight position.

FIG. 16 is a schematic, underside view of the wing of the aircraft having the exemplary diffusion assembly of FIG. 14 along a vertical direction.

DETAILED DESCRIPTION

Figure 1:
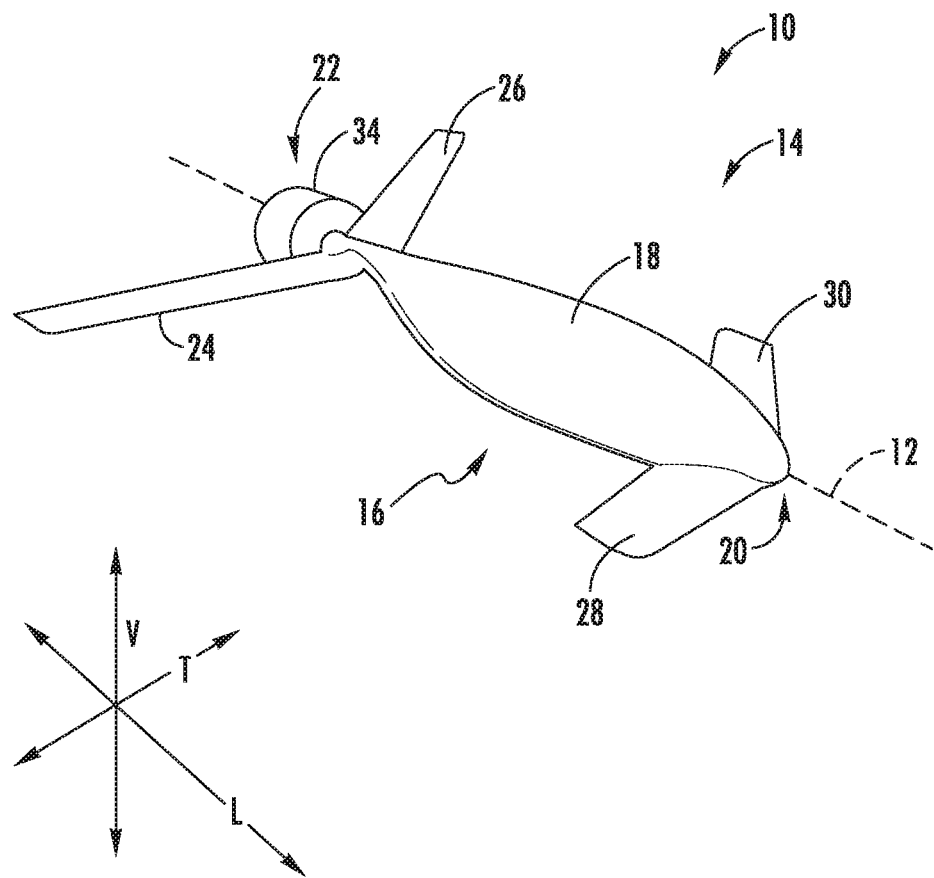
FIG. 1 is a perspective view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a method for operating a vertical takeoff and landing aircraft. The aircraft may include an electric, or hybrid electric, propulsion system with a plurality of vertical thrust electric fans arranged along one or more wings of the aircraft. At least one of the wings includes a plurality of variable components, such as a first variable component and a second variable component. The method generally includes modifying the first variable component of the wing associated with a first portion of the plurality of vertical thrust electric fans relative to the second variable component of the wing associated with a second portion of the plurality of vertical thrust electric fans.

For example, modifying the first variable component relative to the second variable component may be done to adjust an effective thrust profile of the first portion of the plurality of vertical thrust electric fans relative to an effective thrust profile of the second portion of the plurality of vertical thrust electric fans. Additionally, or alternatively, modifying the first variable component relative to the second variable component may be done to adjust an exposure ratio of the first portion of the plurality of vertical thrust electric fans relative to the second portion of the plurality of vertical thrust electric fans.

Regardless, such a modification may allow for an increased level of control of the aircraft by more precisely controlling how the first and second portions of the vertical thrust electric fans are being used to generate thrust relative to one another for the aircraft. For example, such a modification may allow one portion of the vertical thrust electric fans to operate at substantially full power to generate substantially all the vertical thrust needed for that wing (the vertical thrust electric fans potentially being more efficient when operated at full power), while the other portion(s) of the vertical thrust electric fans are operated at substantially zero power, resulting in overall more efficient operation.

Figure 2:
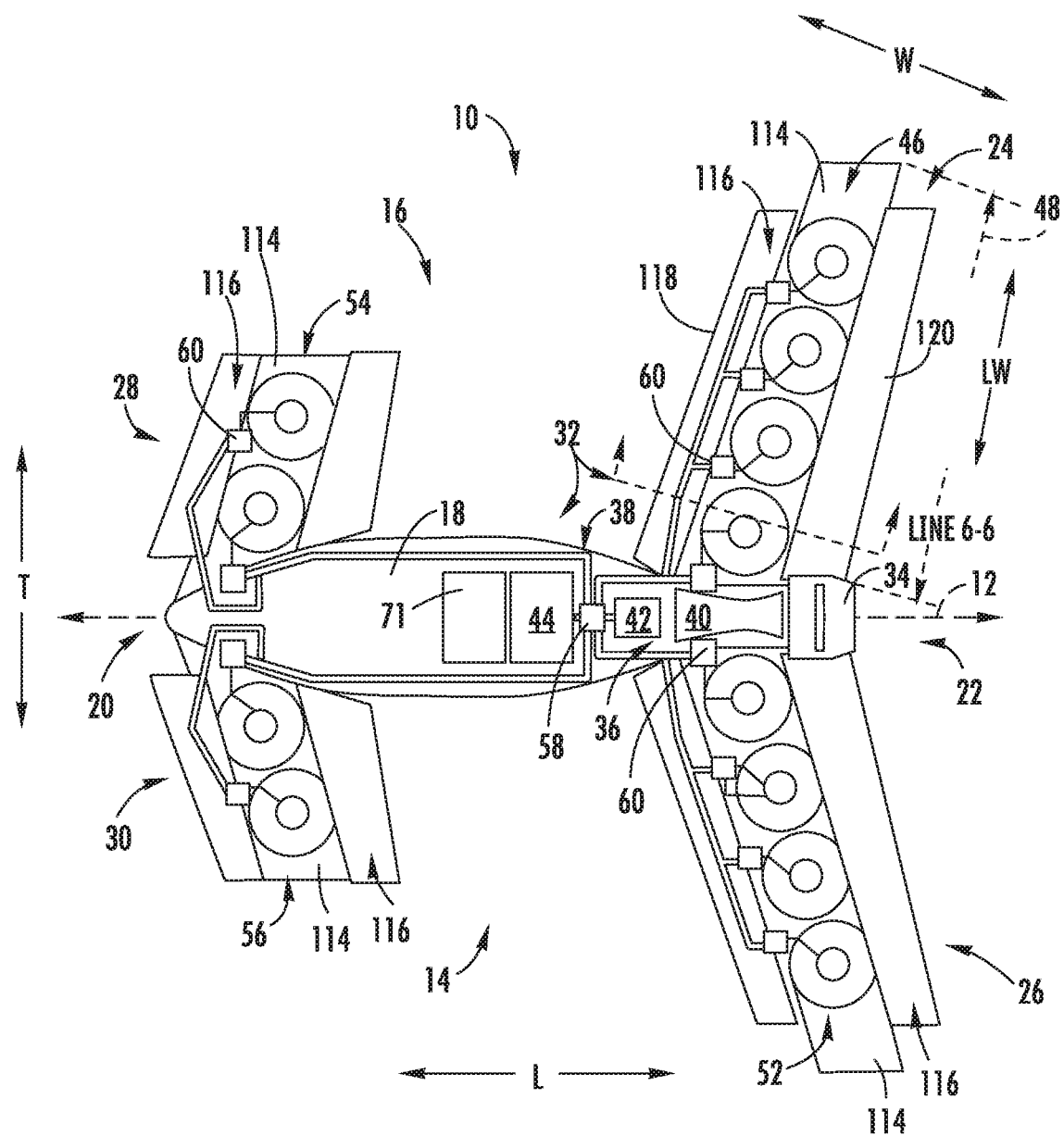
FIG. 2 is a top, schematic view of the exemplary aircraft of FIG. 1 in a vertical flight position.
Figure 3:
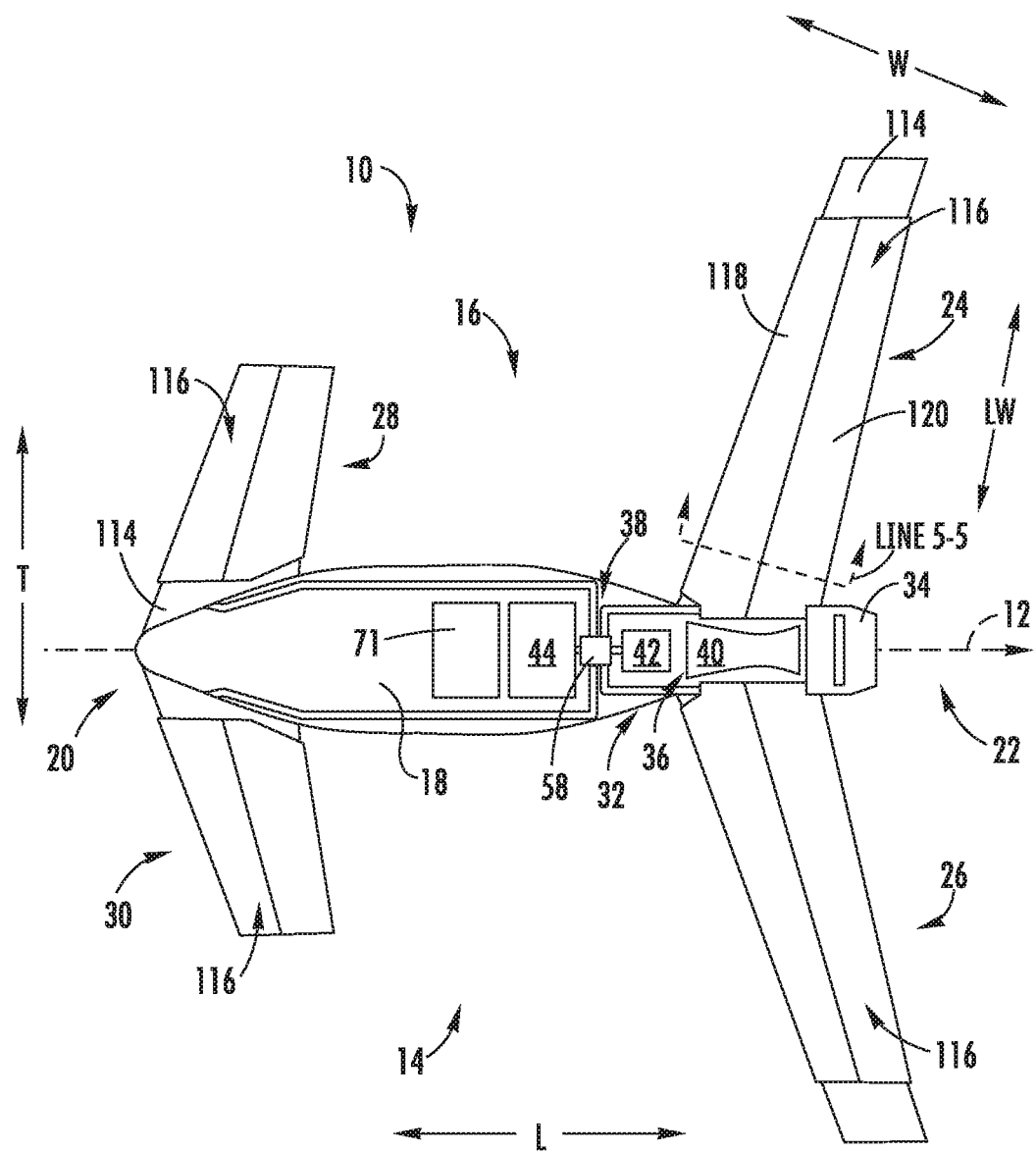
FIG. 3 is a top, schematic view of the exemplary aircraft of FIG. 1 in a forward flight position.

Referring now to the drawings, wherein identical numerals indicate the same elements throughout the Figs. ("Figs."), FIGS. 1 through 3 depict an aircraft 10 in accordance with various embodiments of the present disclosure. More specifically, FIG. 1 provides a perspective view of the exemplary aircraft 10; FIG. 2 provides a top, schematic view of the exemplary aircraft 10 of FIG. 1 in a vertical thrust configuration; and FIG. 3 provides a top, schematic view of the exemplary aircraft 10 of FIG. 1 in a forward thrust configuration. As shown in FIGS. 1 through 3 collectively, the aircraft 10 defines a longitudinal direction L (and a longitudinal centerline 12 that extends therethrough), a vertical direction V, and a transverse direction T. Additionally, the aircraft 10 defines a port side 14 and an opposite starboard side 16.

The aircraft 10 includes a fuselage 18 extending between a forward end 20 and an aft end 22 generally along the longitudinal centerline 12 of the aircraft 10. The aircraft 10 additionally includes one or more wings, each extending from the fuselage 18. More specifically, for the embodiment depicted the aircraft 10 includes four wings attached to or formed integrally with the fuselage 18. Specifically, for the embodiment depicted, the aircraft 10 includes a first wing, a second wing, a third wing, and a fourth wing, or more particularly an aft starboard wing 24, an aft port wing 26, a forward starboard wing 28, and a forward port wing 30, and. Each of these wings 24, 26, 28, 30 is attached to, or formed integrally with, the fuselage 18 and extends from the fuselage 18 outwardly generally along the transverse direction T (i.e., outwardly relative to the fuselage 18). It will be appreciated that although the forward port wing 30 and forward starboard wing 28 are depicted as being separate wings, in other embodiments, the forward port wing 30 and forward starboard wing 28 may be formed integrally, and together attached to the fuselage 18. Similarly, although the aft port wing 26 and aft starboard wing 24 are depicted as being separate wings, in other embodiments, the aft port wing 26 and aft starboard wing 24 may be formed integrally, and together attached the fuselage 18.

Although not depicted, in other embodiments, the aircraft 10 may additionally include one or more stabilizers, such as one or more vertical stabilizers, horizontal stabilizers, etc. Moreover, it will be appreciated, that although not depicted, in certain embodiments, one or more of the wings and/or stabilizers (if included) may additionally include flaps, such as leading-edge flaps or trailing edge flaps, for assisting with controlling the aircraft 10 during flight.

Referring still to FIGS. 1 through 3, the exemplary aircraft 10 further includes a propulsion system 32 for providing the aircraft 10 with a desired amount of thrust during operation. Broadly speaking, the exemplary propulsion system 32 includes a plurality of vertical thrust electric fans (or "VTE fans") for generating vertical thrust during certain operations, a forward thrust propulsor 34 for generating forward (and optionally reverse) thrust during certain operations, and a power source 36 for driving the plurality of VTE fans and the forward thrust propulsor 34. Additionally, for the embodiment depicted, the propulsion system 32 includes an electric communication bus 38 for, e.g., providing electrical power from the power source 36 to the plurality of VTE fans.

More specifically, for the embodiment depicted, the power source 36 includes a combustion engine 40, an electric machine 42, and an electric energy storage unit 44. More specifically, referring now also to FIG. 4, a schematic view is provided of the exemplary combustion engine 40 of the power source 36 of the propulsion system 32 described above with reference to FIGS. 1 through 3. As is depicted, the combustion engine 40 is configured to mechanically drive the forward thrust propulsor 34. More specifically, the forward thrust propulsor 34 is selectively or permanently mechanically coupled to the combustion engine 40. Additionally, the combustion engine 40 is coupled to the electric machine 42. Accordingly, in at least certain embodiments, the combustion engine 40 may drive the electric machine 42 such that the electric machine 42 may generate electrical power. In such a manner, the electric machine 42 may be configured as an electric generator, and the power source 36 may generally be referred to as a "hybrid-electric power source." Further, with such an exemplary embodiment the electric machine 42 may provide the electrical power to, e.g., the plurality of VTE fans during at least certain operations of the aircraft, to the electric energy storage unit 44, or both. In such a manner, the plurality of VTE fans may be driven by the power source 36, and more particularly, may be driven at least in part by the electric machine 42.

Additionally, the electric energy storage unit 44 may be a battery or other suitable component for storing electrical power. The electric energy storage unit 44 may receive electrical power from, e.g., the electric machine 42 (operating as an electric generator), and store electrical power for use during operation of the aircraft 10. For example, the electric energy storage unit 44 may receive and store electrical power from the electric machine 42 (operating as an electric generator) during certain operations, and subsequently provide electrical power to the plurality of VTE fans during other operations. Additionally, in still other operations, the electric energy storage unit 44 may provide electrical power back to the electric machine 42 to, e.g., power the aft fan for short durations, power the combustion engine 40 during emergency operations, or add power to the forward thrust propulsor 34 and/or to the combustion engine 40 during high power demand operations. Accordingly, with such exemplary embodiment, the electric machine 42 may further be configured as an electric motor.

Figure 4:
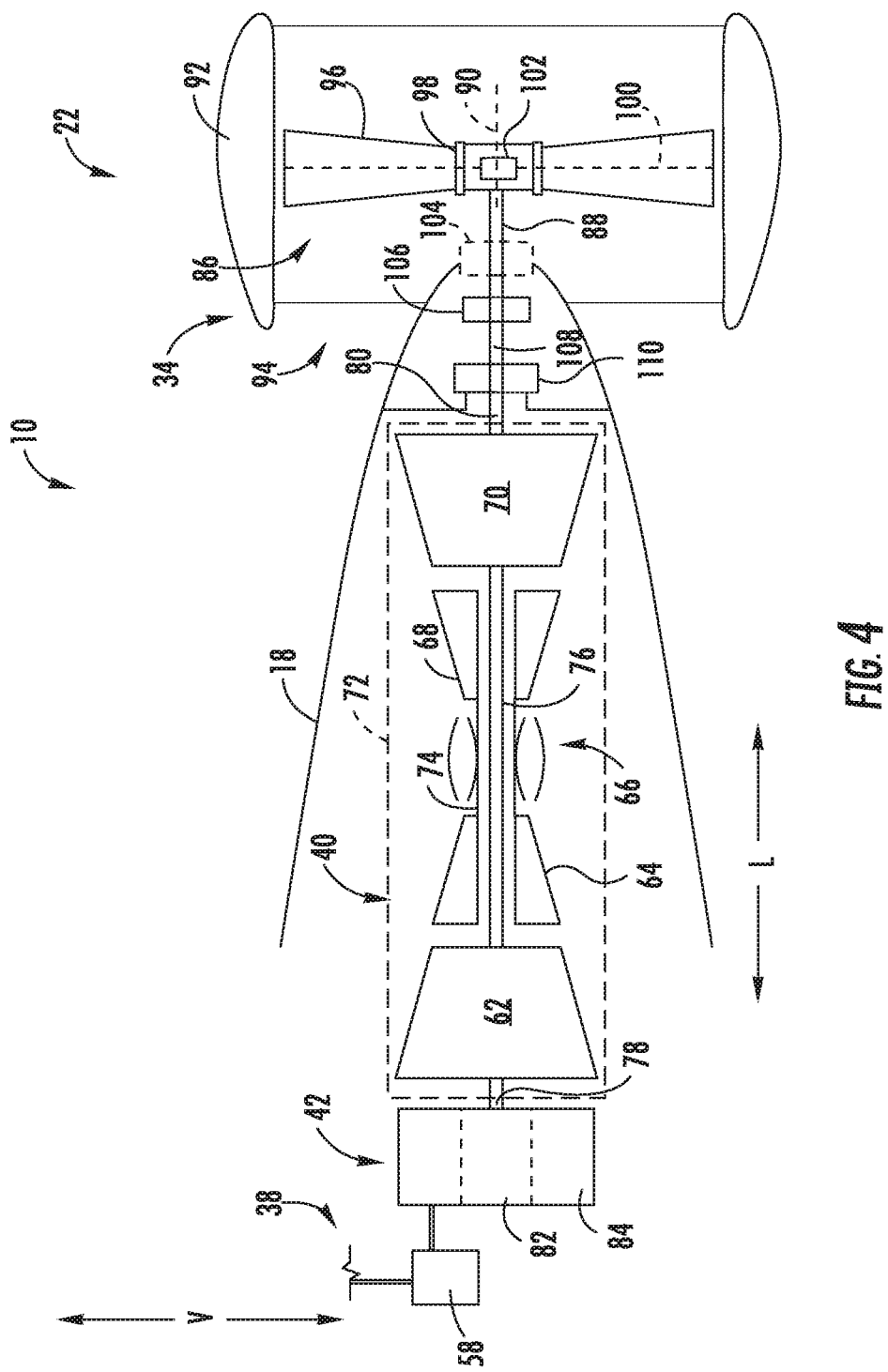
FIG. 4 is a schematic view of a power source of the exemplary aircraft of FIG. 1.

More specifically, referring particularly to FIG. 4, for the embodiment depicted, the combustion engine 40 is a turboshaft engine. The turboshaft engine includes in serial flow order, a compressor section including a low pressure compressor 62 and a high pressure compressor 64, a combustion section 66, and a turbine section including a high pressure turbine 68 and a low pressure turbine 70. During operation, a flow of air is received within the compressor section and is progressively compressed as it flows therethrough, i.e., as it flows from the low pressure compressor 62 to the high pressure compressor 64. The compressed air is then provided to the combustion section 66 where it is mixed with fuel and burned to generate hot combustion gas. The aircraft 10 further includes a fuel tank 71 for providing the fuel to the combustion section 66 (see FIGS. 2 and 3).

The hot combustion gas is expanded through the turbine section where rotational energy is extracted therefrom. Specifically, the hot combustion gas rotates the high pressure turbine 68 and the low pressure turbine 70 as the gas flows therethrough and is expanded. As is depicted in phantom, these components may be enclosed within a casing 72 within, e.g., the fuselage 18 of the aircraft 10. Although not depicted, the hot combustion gas may be exhausted, e.g., to atmosphere, from the low pressure turbine 70.

Also for the embodiment depicted, the high pressure turbine 68 is connected to the high pressure compressor 64 through a high pressure shaft or spool 74, such that a rotation of the high pressure turbine 68 additionally rotates the high pressure compressor 64. Similarly, the low pressure turbine 70 is connected to the low pressure compressor 62 through a low pressure shaft or spool 76, such that rotation of the low pressure turbine 70 additionally rotates the low pressure compressor 62.

It will be appreciated, however, that the exemplary turboshaft engine depicted in FIG. 4 is provided by way of example only. In other exemplary embodiments, the turboshaft engine may have any other suitable configuration. For example, in other embodiments, the turboshaft engine may include any other suitable number of compressors and/or any other suitable number of turbines. Further, in still other embodiments, the combustion engine may be any other suitable combustion engine, such as a rotary or internal combustion engine.

Referring still to FIG. 4, the low pressure shaft 76 additionally drives an output shaft. More specifically, for the embodiment of FIG. 4, the low pressure shaft 76 additionally drives a first output shaft, or a forward output shaft 78, of the turboshaft engine and further drives second output shaft, or an aft output shaft 80 of the turboshaft engine. The forward output shaft 78 extends to the electric machine 42. Accordingly, rotation of the turboshaft engine provides, at least during certain operations, rotational energy to the electric machine 42 via the forward output shaft 78. The electric machine 42, in turn, is configured to convert the rotational energy to generate electrical power. More specifically, it will be appreciated that at least certain embodiments of the electric machine 42, such as the embodiment shown, may generally include a rotor 82 and a stator 84. The rotational energy of the turboshaft engine is provided via the forward output shaft 78 and configured to rotate the rotor 82 of the electric machine 42 relative to the stator 84. Such relative movement may generate electrical power.

Inclusion of a turboshaft engine and electric machine 42 in accordance with such an exemplary embodiment may allow for the electric power source 36 to generate a relatively high amount of electric power and to provide such electric power to the plurality of VTE fans of the propulsion system 32.

As is briefly discussed above, the turboshaft engine further drives the forward thrust propulsor 34 of the hybrid electric propulsion system 32. For the embodiment depicted, the forward thrust propulsor 34 is comprises a fan 86 coupled to a fan shaft 88. The aft output shaft 80 of the turboshaft engine is selectively mechanically coupled to or permanently mechanically coupled to the fan shaft 88 to allow the turboshaft engine to drive the fan 86. More specifically, during operation, the aft output shaft 80 of the turboshaft engine may drive the fan shaft 88 to rotate the fan 86 about a fan axis 90. Notably, the forward thrust propulsor 34 further includes an outer nacelle 92 surrounding at least a portion of the fan 86. In such a manner, the forward thrust propulsor 34 may be referred to as a ducted fan.

It will further be appreciated that for the embodiment depicted, the forward thrust propulsor 34 is mounted to the fuselage 18 of the aircraft 10 at an aft end 22 of the aircraft 10. Although not depicted, the forward thrust propulsor 34 may include one or more struts, or other structural members, extending between the outer nacelle 92 and the fuselage 18 of the aircraft 10 to mount the forward thrust propulsor 34 to the fuselage 18 of the aircraft 10. Moreover, the forward thrust propulsor 34 is configured as a boundary layer ingestion fan defining an inlet 94 extending substantially 360 degrees around the fuselage 18. In such a manner, the forward thrust propulsor 34 may ingest a boundary layer airflow over the fuselage 18, and may re-energize such airflow to create a forward thrust for the aircraft 10.

Further, the fan 86 of the forward thrust propulsor 34 includes a plurality of fan blades 96 coupled to a disk 98, with the disk 98 coupled to the fan shaft 88. More specifically, for the embodiment depicted, each of the plurality of fan blades 96 are rotatably coupled to the disk 98 about a respective pitch axis 100. The forward thrust propulsor 34 further includes a pitch change mechanism 102 operable with each of the plurality of fan blades 96 to rotate each of the plurality of fan blades 96 about their respective pitch axes 100, e.g., in unison. Accordingly, for the embodiment depicted the forward thrust propulsor 34 is configured as a variable pitch fan.

Referring still to FIG. 4, it will be appreciated that the exemplary propulsion system 32 depicted further includes a coupling unit 106, with the turboshaft engine selectively mechanically coupled to the forward thrust propulsor 34 through the coupling unit 106. The coupling unit 106 may be at least one of a clutch or a torque converter. More specifically, for the embodiment depicted, the coupling unit 106 includes a clutch, and more specifically, includes a one-way clutch. For example, in certain embodiments, the one-way clutch may be a sprag clutch.

For example, in certain exemplary embodiments, as is depicted in phantom, the forward thrust propulsor 34 may further include a drive electric machine 104, or rather, a drive motor, coupled to the fan shaft 88. The drive electric machine 104 may be electrically coupled to the power source 36, such as to one or more of the electric machine 42 or electric energy storage unit 44, through the electric communication bus 38. The drive electric machine 104 may receive electrical power to drive the fan 86 of the forward thrust propulsor 34 during, e.g., emergency operations. Inclusion of a one-way clutch in the coupling unit 106, such as a sprag clutch, may allow for the drive electric machine 104 to rotate the fan 86 without having to correspondingly rotate the combustion engine 40 (i.e., turboshaft for the embodiment depicted).

It will be appreciated, however, that in other exemplary embodiments, the clutch may instead be a two-way clutch actuatable between an engaged position and a disengaged position. When in the engaged position, the fan shaft 88 may rotate with the aft output shaft 80 of the turboshaft engine (via an intermediate shaft 108). By contrast, when in the disengaged position, the aft output shaft 80 of the turboshaft engine may rotate independently of the fan shaft 88. For example, in certain embodiments, the aircraft 10 may move the clutch to the disengaged position during, e.g., vertical takeoff, vertical landing, or hover operations wherein forward thrust is not required from the forward thrust propulsor 34. However, when the aircraft 10 transitions to forward thrust operations, such as cruise operations, the clutch may be moved to the engaged position to allow the forward thrust propulsor 34 to generate forward thrust for the aircraft 10.

Further, still, for the embodiment depicted in FIG. 4, the aircraft 10 additionally includes a speed change mechanism 110, with turboshaft engine being mechanically coupled to the forward thrust propulsor 34 through the speed change mechanism 110. More specifically, for the embodiment of FIG. 4, the speed change mechanism 110 is configured as a gearbox. More specifically, still, for the embodiment of FIG. 4, the speed change mechanism 110 is configured as a planetary gear box.

It will be appreciated, however, that in other exemplary embodiments, the exemplary aircraft, and more specifically, the exemplary hybrid electric propulsion system, may include any other suitable combustion engine and forward thrust propulsor. For example, in other embodiments, the combustion engine may instead be a turboshaft engine having any other suitable configuration, an internal combustion engine, etc. Additionally, in other embodiments, the forward thrust propulsor may be coupled to the combustion engine in any other suitable manner. For example, in other embodiments, the forward thrust propulsor may be an electrically driven propulsor, an unducted fan, etc. Further, although depicted at an aft end 22 of the aircraft, in other embodiments, the forward thrust propulsor may instead be located at, e.g., a forward end 20 of the aircraft, or any other suitable location.

Further, still, in other exemplary embodiments of the present disclosure, the propulsion system may include any other suitable power source for driving the plurality of VTE fans and forward thrust propulsor. For example, in other exemplary embodiments, the propulsion system may not be a "hybrid-electric propulsion system," and instead may be a purely electric propulsion system. With such an exemplary embodiment, substantially all the power for the VTE fans and forward thrust propulsor may be provided from the electric energy storage unit 44.

Referring now back particularly to FIGS. 1 through 3, a first of the plurality of wings of the aircraft 10, and more particularly, the aft starboard wing 24 depicted in FIG. 2 defines a length 48 (and a lengthwise direction LW), and the propulsion system 32 includes a first plurality of VTE fans 46 arranged along the length 48 of the aft starboard wing 24, and more specifically, arranged substantially linearly along the length 48 of the aft starboard wing 24 (i.e., a center/axis of each of the first plurality of VTE fans 46 arranged in a substantially straight line along the length 48 of the aft starboard wing 24). More specifically, still, it will be appreciated that for the embodiment depicted, the first plurality of VTE fans 46 are integrated into the aft starboard wing 24 and oriented to generate thrust generally along the vertical direction V. In such a manner, each of the first plurality of VTE fans 46 are vertical lift fans, and as will be discussed in more detail below, are fixed in position such that they are only capable of generating thrust generally along the vertical direction V of the aircraft 10. As will be discussed in greater detail below, each of the first plurality of VTE fans 46 is electrically coupled to the power source 36 to receive electrical power from, e.g., the electric machine 42 or the electric energy storage unit 44.

It will be appreciated, that as used herein, the term "along the vertical direction V of the aircraft 10" refers to a vertical direction defined by a normal orientation of the aircraft 10. For example, if the aircraft 10 is, e.g., tilted forward during certain operations, the first plurality of VTE fans 46 may provide thrust in a direction that is still along the vertical direction of the aircraft 10, but tilted relative to an absolute vertical direction. Additionally, in this context, the term "generally" refers to being within about thirty degrees of the vertical direction V of the aircraft 10, such as within about fifteen degrees of the vertical direction V.

Additionally, for the embodiment depicted, the first plurality of VTE fans 46 includes at least three VTE fans 46, and more specifically, includes four VTE fans 46. However, in other embodiments, the first plurality of VTE fans 46 may instead include any other suitable number of VTE fans 46, such as two, five or more VTE fans 46. In certain embodiments, each of the first plurality of VTE fans 46 may be configured in the same manner as one another, or alternatively at least one of the first plurality of VTE fans 46 may be configured differently (e.g., variable pitch or fixed pitch, variable speed or fixed speed, etc.).

Notably, by distributing the first plurality of VTE fans 46 along the length 48 of the aft starboard wing 24, the lift forces on the aft starboard wing 24 generated by the first plurality of VTE fans may be distributed in a manner similar to a distribution of lift forces generated on the aft starboard wing 24 during forward flight operations (i.e., left generated due to an airfoil cross-sectional shape of the aft starboard wing 24). In such a manner, a structural frame of the aft starboard wing 24 (referred to as a body portion 114, below), may serve a dual function of supporting the lift forces during vertical flight operations, as well as supporting the lift forces during forward flight operations. Such may generally result in a more efficiently constructed aircraft 10.

It will further be appreciated that the exemplary propulsion system 32 includes a similar plurality of electric fans integrated into the other wings 26, 28, 30 of the aircraft 10. Each of these electric fans are similarly oriented to generate thrust generally along the vertical direction V of the aircraft 10, and in such a manner may therefore also be configured as VTE fans. More specifically, the propulsion system 32 further includes a second plurality of VTE fans 52 integrated into the aft port wing 26 and arranged substantially linearly along a length of the aft port wing 26, a third plurality of VTE fans 54 integrated into the forward starboard wing 28 and arranged substantially linearly along a length of the forward starboard wing 28, and a fourth plurality of VTE fans 56 integrated into the forward port wing 30 and arranged substantially linearly along a length of the forward port wing 30.

For the embodiment depicted, the second plurality of VTE fans 52 includes four VTE fans, and the third and fourth pluralities of VTE fans 54, 56 each include two VTE fans. It will be appreciated, however, that in other exemplary embodiments, each of the respective pluralities of VTE fans 46, 52, 54, 56 may have any other suitable number of VTE fans and further that in certain exemplary embodiments, each of the plurality of VTE fans 46, 52, 54, 56 may be configured in substantially the same manner as one another, or one or more of such pluralities of VTE fans 46, 52, 54, 56 may be configured differently. For example, in certain exemplary embodiments, each of the first plurality of VTE fans 46, second plurality of VTE fans 52, third plurality of VTE fans 54 and fourth plurality of VTE fans 56 may be configured as variable speed, fixed pitch fans, or alternatively, may each be configured as variable speed, variable pitch fans (the "variable speed" functionality described below). Or, alternatively, only a select number of these VTE fans 46, 52, 54, 56 may have such functionality.

Moreover, as is depicted most clearly in FIG. 2, the electric communication bus 38 electrically connects the power source 36, e.g., the electric machine 42 and/or the electric energy storage unit 44 for the embodiment depicted, to each of the pluralities of VTE fans 46, 52, 54, 56. Notably, for the embodiment depicted, the electric communication bus 38 includes a main controller 58 and a plurality of electric power controllers 60. The main controller 58 is electrically connected to both the electric machine 42 and the electric energy storage unit 44 and is configured to, e.g., direct electrical power from one or both of the electric machine 42 and electric energy storage unit 44 to each of the pluralities of VTE fans 46, 52, 54, 56. For example, in certain operations, the main controller 58 may direct electrical power from the electric machine 42 to each of the pluralities of VTE fans 46, 52, 54, 56, may direct electrical power from the electric energy storage unit 44 to each of the pluralities of VTE fans 46, 52, 54, 56, may direct electrical power from the electric machine 42 to the electric energy storage unit 44 (e.g., during forward flight), or may direct electrical power from the electric energy storage unit 44 to the electric machine 42 (e.g., during emergency operations or high power demand operations). Other operations are contemplated as well.

More specifically, the exemplary embodiment of FIG. 2 the electric communication bus 38 includes an electric power controller 60 for each VTE fan (i.e., each VTE fan of the first plurality of VTE fans 46, of the second plurality of VTE fans 52, of the third plurality of VTE fans 54, and of the fourth plurality of VTE fans 56). Additionally, each of the plurality of electric power controllers 60 is associated with one VTE fan of the pluralities of VTE fans 46, 52, 54, 56. More specifically, still, the power source 36 is electrically coupled to each VTE fan of the pluralities of VTE fans 46, 52, 54, 56 through the respective electric power controller 60. In such a manner, the electric power controller 60 may modify the electric power provided from the power source 36 to each respective VTE fan. Accordingly, for the embodiment shown, the propulsion system 32 includes twelve electric power controllers 60, one for each of the twelve VTE fans included within the propulsion system 32.

In certain exemplary embodiments, each of the electric power controllers 60 may be one or more of a power converter, a power inverter, or a power transformer. Accordingly, in certain exemplary embodiments, the electric power controllers 60 may be configured to convert electrical power received through the electric communication bus 38 from alternating current ("AC") electrical power to direct current ("DC") electrical power, or vice versa, and further may be configured in at least certain embodiments to modify an amount of the electrical power (e.g., a voltage or a current) received through the electric communication bus 38 from the power source 36 before transferring such electrical power to a respective VTE fan.

Accordingly, in at least certain embodiments each of the electric power controllers 60 may modify an amount of electrical power provided to a respective VTE fan, which as will be appreciated, may allow for the aircraft 10, and more specifically may allow for the main controller 58, to modify a rotational speed of each VTE fan of the pluralities of VTE fans 46, 52, 54, 56. For example, each of the electric power controllers 60 may be operably coupled to the main controller 58 through, e.g., a wired or wireless communication bus (not shown), such that the main controller 58 may control the electrical power provided to each of the individual VTE fans.

Accordingly, it will be appreciated that in at least certain embodiments each VTE fan of the pluralities of VTE fans 46, 52, 54, 56 may be variable speed fans. Accordingly, by modifying an amount of electrical power provided to each VTE fan through a respective electric power controller 60, the aircraft 10 may modify a rotational speed of the respective VTE fan, and therefore an amount of vertical thrust provided by the respective VTE fan. In such a manner, the aircraft 10 may allow for more dynamic control during vertical takeoff and landing, or other vertical thrust operations.

It should be appreciated, however, that in other exemplary embodiments, the aircraft 10, or rather, the electric communication bus 38 may not include an electric power controller 60 for each of the individual VTE fans. Instead, for example, in other embodiments, the electric communication bus 38 may include a single electric power controller 60 for each of the individual pluralities of VTE fans 46, 52, 54, 56. In still other embodiments, however, any other suitable configuration may be provided.

Referring particularly to FIGS. 2 and 3, it will be appreciated that each of the wings 24, 26, 28, 30 generally includes a structural body portion 114 (FIG. 2) and one or more components movable to selectively expose the plurality of VTE fans included therein. For the embodiment shown, the one or more components include a variable geometry assembly 116 movable relative to the body portion 114 of the respective wing between a vertical thrust position (see FIG. 2) and a forward thrust position (see FIG. 3) to facilitate a vertical takeoff and landing of the aircraft 10, or other vertical thrust operations of the aircraft 10.

For example, referring particularly to the aft starboard wing 24, for the embodiment depicted, the aft starboard wing 24, which is coupled to, and extends from, the fuselage 18, includes the structural body portion 114 (see particularly FIG. 2) and the variable geometry assembly 116. The variable geometry assembly 116 at least partially covers and encloses at least one VTE fan of the first plurality of VTE fans 46 when in the forward thrust position (FIG. 3) and at least partially exposes the at least one VTE fan of the first plurality of VTE fans 46 when in the vertical thrust position (FIG. 2). More specifically, for the embodiment shown, the variable geometry assembly 116 extends along the length 48 of the aft starboard wing 24 and at least partially covers at least two VTE fans of the first plurality of VTE fans 46 when in the forward thrust position and at least partially exposes the at least two VTE fans of the first plurality of VTE fans 46 when in the vertical thrust position.

More specifically, still, for the embodiment of FIGS. 2 and 3, the variable geometry assembly 116 includes a partial wing assembly at least partially covering at least one VTE fan of the first plurality of VTE fans 46 when the variable geometry assembly 116 is in the forward thrust position. More specifically, for the embodiment depicted, the partial wing assembly at least partially covers each of the first plurality of VTE fans 46 when the variable geometry assembly 116 is in the forward thrust position. For the embodiment depicted, the partial wing assembly is a forward partial wing assembly 118, the forward partial wing assembly 118 extending along the length 48 of the aft starboard wing 24 (i.e., in the lengthwise direction LW of the aft starboard wing 24) and at least partially covering each of the first plurality of VTE fans 46 when the variable geometry assembly 116 is in the forward thrust position. Moreover, for the embodiment depicted, the variable geometry assembly 116 additionally includes an aft partial wing assembly 120. For the embodiment depicted, the aft partial wing assembly 120 also extends along the length 48 of the aft starboard wing 24 and at least partially covers each of the first plurality of VTE fans 46 when the variable geometry assembly 116 is in the forward thrust position. Notably, when the variable geometry assembly 116 is in the forward thrust position, the forward partial wing assembly 118 and aft partial wing assembly 120 may each be referred to as being in a retracted position. Conversely, when the variable geometry assembly 116 is in the vertical thrust position, the forward partial wing assembly 118 and aft partial wing simile 120 may each be referred to as being in an extended position.

Figure 5:
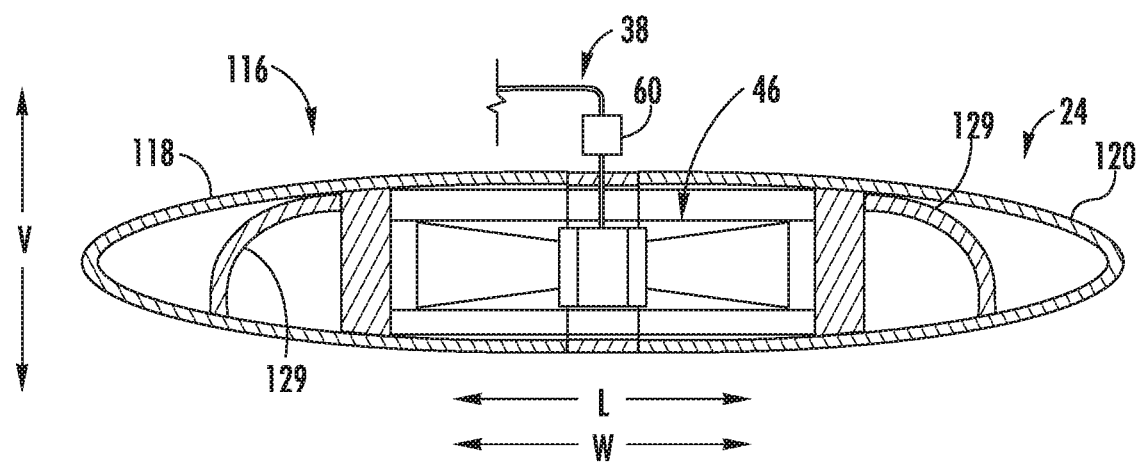
FIG. 5 is a side, schematic, cross-sectional view of a wing in accordance with an exemplary embodiment of the present disclosure as may be incorporated into the exemplary aircraft of FIG. 1 in a forward flight position.
Figure 6:
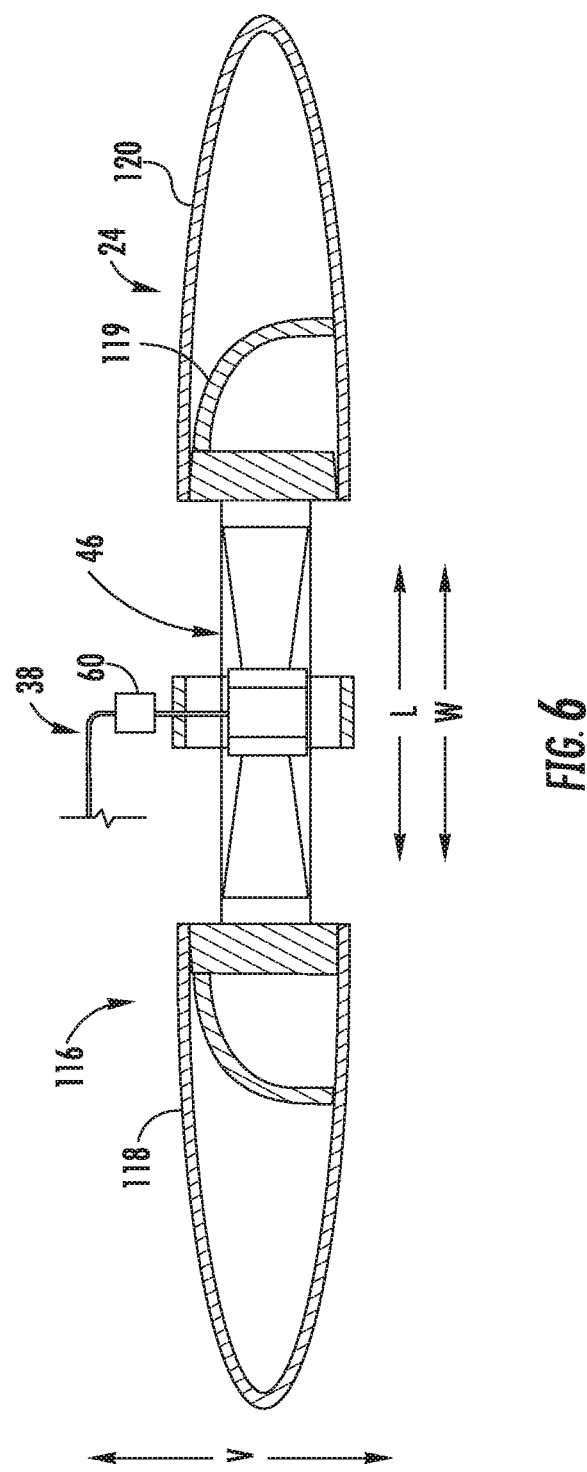
FIG. 6 is a side, schematic, cross-sectional view of the exemplary wing of FIG. 5 in a vertical flight position.

Referring now also to FIGS. 5 and 6, cross-sectional views are provided of the aft starboard wing 24. More specifically, FIG. 5 provides a cross-sectional view of the aft starboard wing 24 through Line 5-5 in FIG. 3 (with the variable geometry assembly 116 in the forward thrust position); and FIG. 6 provides a cross-sectional view of the aft starboard wing 24 through Line 6-6 in FIG. 2 (with the variable geometry assembly 116 in the vertical thrust position).

As will be appreciated, the aircraft 10 further defines a horizontal direction. The horizontal direction, as used herein refers to generally to any direction perpendicular to the vertical direction V, and therefore may also be thought of as a horizontal plane. As will be appreciated, the longitudinal direction L extends within, and therefore is parallel to the horizontal direction/horizontal plane. The variable geometry assembly 116 is movable generally along the horizontal direction between the forward thrust position and the vertical thrust position, and more specifically, for the embodiment depicted, is movable generally along the longitudinal direction L. More specifically still, it will be appreciated that the aft starboard wing 24 defines a widthwise direction W perpendicular to the lengthwise direction LW, and for the embodiment shown, the variable geometry assembly 116 is movable generally along the widthwise direction W of the aft starboard wing 24. (It should be appreciated, however, that in other embodiments, aspects of the variable geometry assembly 116 may instead move or translate in any other suitable direction along the horizontal plane. Additionally, although the widthwise direction W and Longitudinal direction L are depicted, e.g., in FIGS. 5 and 6 as being generally parallel to one another, in certain embodiments, these two directions W, L may define an angle relative to one another.)

More specifically, the forward partial wing assembly 118 is positioned generally at a forward side of the aft starboard wing 24 and is movable generally along the horizontal direction when the variable geometry assembly 116 is moved between the forward thrust position and vertical thrust position. Particularly for the embodiment depicted, the forward partial wing assembly 118 moves forward generally along the longitudinal direction L (and more specifically, along the widthwise direction W) when the variable geometry assembly 116 is moved to the vertical thrust position (FIGS. 2, 6) from, e.g., the forward thrust position (FIGS. 3, 5).

By contrast, the aft partial wing assembly 120 is positioned generally at an aft side of the aft starboard wing 24. Similar to the forward partial wing assembly 118, however, the aft partial wing assembly 120 is movable generally along the horizontal direction when the variable geometry assembly 116 is moved between the forward thrust position and vertical thrust position. More specifically, for the embodiment depicted, the aft partial wing assembly 120 moves aft generally along the longitudinal direction L (and more specifically, along the widthwise direction W) when the variable geometry assembly 116 is moved to the vertical thrust position (FIGS. 2, 6) from, e.g., the forward thrust position (FIGS. 3, 5).

Accordingly, as stated, and as will be appreciated from FIGS. 3 and 5, when the variable geometry assembly 116 is in the forward thrust position (and the forward and aft partial wing assemblies 118, 120 of the variable geometry assembly 116 are in retracted positions), the forward and aft partial wing assemblies 118, 120 of the variable geometry assembly 116 each at least partially enclose at least one VTE fan of the first plurality of VTE fans 46, and together substantially completely enclose each of the first plurality of VTE fans 46 within the aft starboard wing 24. In such a manner, each of the first plurality of VTE fans 46 are substantially completely enclosed within the aft starboard wing 24 when the variable geometry assembly 116 is in the forward thrust position.

By contrast, as will be appreciated from FIGS. 2 and 6, when the variable geometry assembly 116 is in the vertical thrust position (and the forward and aft partial wing assemblies 118, 120 of the variable geometry assembly 116 are in extended positions), the forward and aft partial wing assemblies 118, 120 of the variable geometry assembly 116 each at least partially expose at least one VTE fan of the first plurality of VTE fans 46, and together substantially completely expose each of the first plurality of VTE fans 46 within the aft starboard wing 24. In such a manner, each of the first plurality of VTE fans 46 are substantially completely exposed when the variable geometry assembly 116 is in the vertical thrust position. Notably, as used herein, the term "exposed" with respect to a VTE fan refers to such fan having a substantially open inlet and a substantially open exhaust (with the exception of any exhaust flowpath components, such as diffusion assembly components, described below), such that the fan may receive a flow of air substantially freely and exhaust such flow of air substantially freely.

It will be appreciated, however, that in other exemplary embodiments, the variable geometry assembly 116 may not substantially completely enclose each of the first plurality of VTE fans 46 when in the forward thrust position. For example, in certain exemplary embodiments, the variable geometry assembly 116 may only partially enclose one or more of the first plurality of VTE fans 46 when in the forward thrust position. In such a manner, the aircraft 10 may be configured for relatively efficient forward flight while one or more of the first plurality of VTE fans 46 is at least partially exposed (either on an inlet side/top side of the wing 24, outlet side/bottom side of the wing 24, or a combination of both).

Further, it will be appreciated that as stated above the variable geometry assembly 116, and more specifically the forward and aft partial wing assemblies 118, 120 of the variable geometry assembly 116, extend substantially along an entirety of the length 48 of the aft starboard wing 24. More particularly, each of the forward and aft partial wing assemblies 118, 120 defines a length 122 (see FIG. 3). The length 122 of each of these partial wing assemblies 118, 120 is, for the embodiment depicted, greater than or equal to at least about seventy-five percent (75%) of the length 48 of the wing and less than or equal to about one hundred twenty-five percent (125%) of the length 48 of the aft starboard wing 24. More specifically, still, the length 122 of each of the partial wing assemblies 118, 120 is greater than, or substantially equal to, a length along the lengthwise direction LW from an inner edge of an inner-most VTE fan of the first plurality of VTE fans 46 to an outer edge of an outer-most VTE fan of the first plurality of VTE fans 46, such as up to about twenty-five percent greater or fifty percent greater than such length. It will be appreciated that in this context, the terms inner and outer are relative positional terms defined relative to the fuselage 18 of the aircraft 10.

In such a manner, the variable geometry assembly 116, and more specifically, the forward and aft partial wing assemblies 118, 120 may be moved, e.g., in unison, to expose each of the first plurality of VTE fans 46 arranged along the length 48 of the aft starboard wing 24 and integrated into the aft starboard wing 24.

Moreover, it will be appreciated that for the embodiment depicted in FIGS. 1 through 3, each of the other wings (i.e., wings 26, 28, 30) similarly includes a variable geometry assembly 116 movable between a forward thrust position (FIG. 3) to substantially completely cover the plurality of VTE fans integrated therein (i.e., pluralities of fans 52, 54, 56, respectively) and a vertical thrust position (FIG. 2) to substantially completely expose the plurality of VTE fans integrated the therein (again, i.e., pluralities of fans 52, 54, 56, respectively). Each of the variable geometry assemblies 116 of these wings 26, 28, 30 may be configured in substantially the same manner as the variable geometry assembly 116 of the aft starboard wing 24 described above, or alternatively may be configured in any other suitable manner.

It should be appreciated, however, that in other exemplary embodiments, one or more of the wings of the aircraft 10 may have a variable geometry assembly 116 configured in any other suitable manner. For example, referring now to FIGS. 7 and 8, an aircraft 10 in accordance with another exemplary embodiment of the present disclosure is provided. The exemplary aircraft 10 of FIGS. 7 and 8 may be configured in substantially the same manner as exemplary aircraft 10 described above with reference to FIGS. 1 through 6. Accordingly, the same or similar numbers may refer to the same or similar parts.

For example, the aircraft 10 generally includes a fuselage 18 and a propulsion system 32 having a power source 36. Moreover, the aircraft 10 includes a plurality of wings extending from, and couple to, the fuselage 18. For example, the plurality of wings includes a forward starboard wing 28, an aft starboard wing 24, a forward port wing 30 and an aft port wing 26. The propulsion system 32 includes a plurality of VTE fans driven by the power source 36, and more particularly, includes a first plurality of VTE fans 46 arranged along a length 48 of the aft starboard wing 24, a second plurality of VTE fans 52 arranged along a length of the aft port wing 26, a third plurality of VTE fans 54 arranged along a length of the forward starboard wing 28, and a fourth plurality of VTE fans 56 arranged along a length of the forward port wing 30.

Further, each of the wings includes one or more components for selectively exposing the respective plurality of VTE fans. More specifically, each of the wings includes a variable geometry assembly 116 movable between a forward thrust position and a vertical thrust position to at least partially cover up and at least partially expose the respective pluralities of VTE fans arranged along the lengths thereof, and more specifically integrated therein. However, for the embodiment depicted, each of these variable geometry assemblies 116 is operable to selectively expose and/or cover less than all of the respective plurality of VTE fans arranged along the length of the respective wing.

For example, referring particularly to the aft starboard wing 24 including the first plurality of VTE fans 46, the variable geometry assembly 116 includes a partial wing assembly, with the partial wing assembly at least partially covering less than all of the first plurality of VTE fans 46 when the variable geometry assembly 116 is in the forward thrust position. More specifically, for the embodiment of FIGS. 7 and 8, the partial wing assembly is an inner partial wing assembly and the variable geometry assembly 116 further comprises an outer partial wing assembly (i.e., inner and outer relative to the fuselage 18 of the aircraft 10). More specifically still, the inner partial wing assembly is an inner, forward partial wing assembly 118A and the outer partial wing assembly is an outer, forward partial wing assembly 118B. The inner, forward partial wing assembly 118A and outer, forward partial wing assembly 118B are arranged sequentially along the length 48 of the aft starboard wing 24 (more particularly, along the lengthwise direction LW of the aft starboard wing 24). For the embodiment depicted, the inner, forward partial wing assembly 118A defines a length 122. The length 122 is less than or equal to about fifty percent (50%) of the length 48 of the aft starboard wing 24, and greater than or equal to at least about ten percent (10%) of the length 48 of the aft starboard wing 24. Further, for the embodiment depicted, the outer, forward partial wing assembly 118B defines a length 124 that is substantially equal to the inner, forward partial wing assembly 118A. However, in other embodiments, the length 124 of the outer, forward partial wing assembly 118B may be different than the length 122 of the inner, forward partial and assembly 118A.

Further, still, for the embodiment depicted, the variable geometry assembly 116 of the aft starboard wing 24 further includes an inner, aft partial wing assembly 120A and an outer, aft partial wing assembly 120B. The inner, aft partial wing assembly 120A is operable with the inner, forward partial wing assembly 118A to substantially completely cover or expose a first portion 46A of the first plurality of VTE fans 46 and the outer, aft partial wing assembly 120B is operable with the outer, forward partial wing assembly 118B to substantially completely cover or expose a second portion 46B of the first plurality of VTE fans 46.

Figure 8:
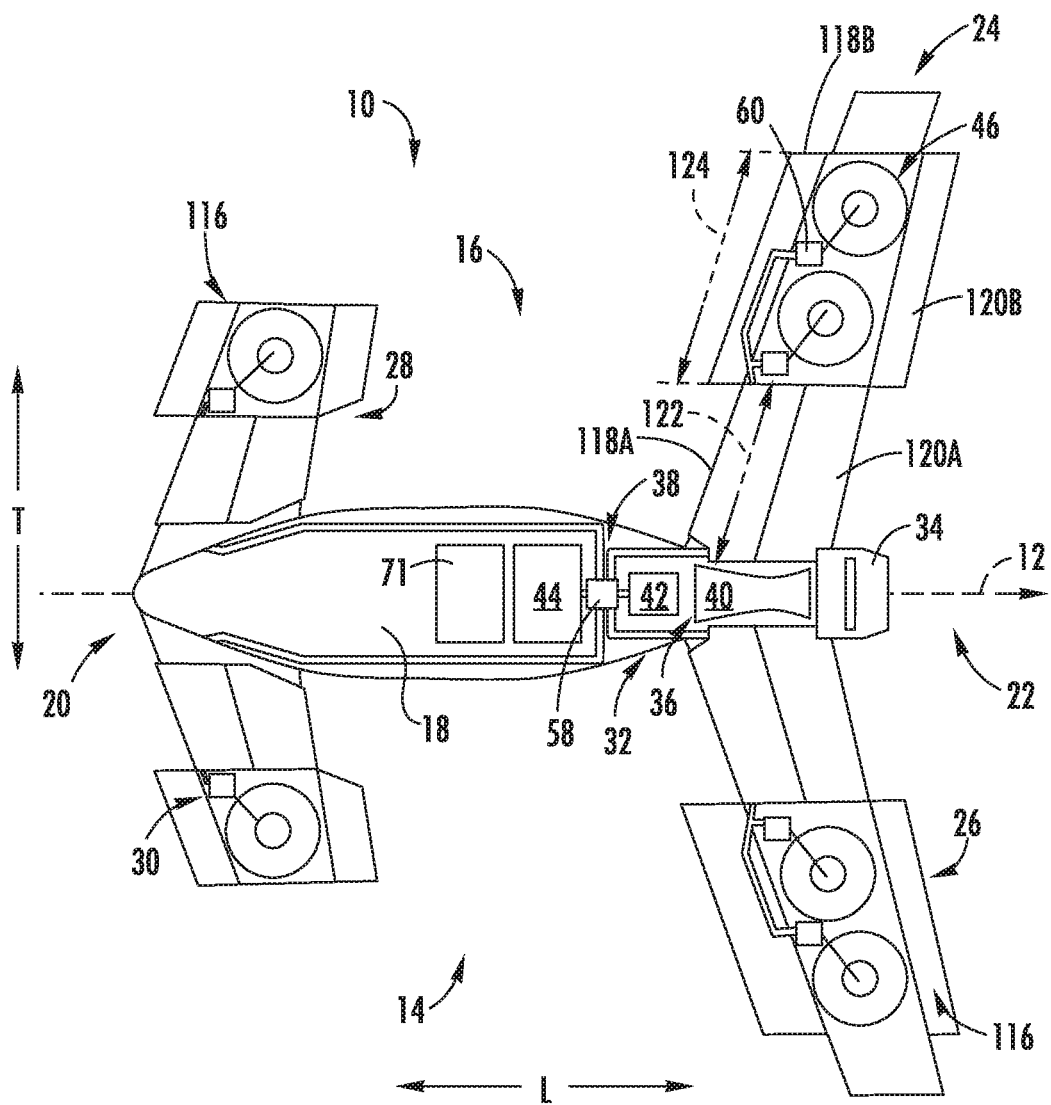
FIG. 8 is a top, schematic view of the exemplary aircraft of FIG. 7 in a partial vertical flight position.

It will be appreciated that, as is shown in FIG. 8, in certain embodiments the inner, forward partial wing assembly 118A and inner, aft partial wing assembly 120A may be operable together and independently of the outer, forward partial wing assembly 118B and outer, aft partial wing assembly 120B. Accordingly, the variable geometry assembly 116 may be movable to various "degrees" of vertical thrust positions, and as used herein, the term "vertical thrust position" with reference to the variable geometry assembly 116 of a particular wing refers generally to a position in which at least one of the VTE fans of the respective plurality of VTE fans is at least partially exposed and capable of generating vertical thrust.

For example, as is depicted, the variable geometry assembly 116 may be movable to one or more partial vertical thrust positions, such as the position shown, wherein the inner, forward partial wing assembly 118A and inner, aft partial wing assembly 120A are in retracted positions to substantially completely cover the first portion 46A of the first plurality of VTE fans 46, and wherein the outer, forward partial wing assembly 118B and outer, aft partial wing assembly 120B are in extended positions to substantially completely expose the second portion 46B of the first plurality of VTE fans 46. Such may allow for the first plurality of VTE fans 46 to provide a reduced amount of vertical thrust during, e.g., transitional flight conditions of the aircraft 10 (e.g., transitioning from vertical flight to forward flight or vice versa).

Further, it will be appreciated that for the embodiment depicted, the variable geometry assemblies 116 of each of the other wings, i.e., the aft port wing 26, forward starboard wing 28, and forward port wing 30, are depicted configured in a similar manner to the exemplary variable geometry assembly 116 of the aft starboard wing 24. Notably, at least certain operations of the aircraft 10 described above with reference to FIGS. 7 and 8 will be described below with reference to FIGS. 24 and 25.

Figure 7:
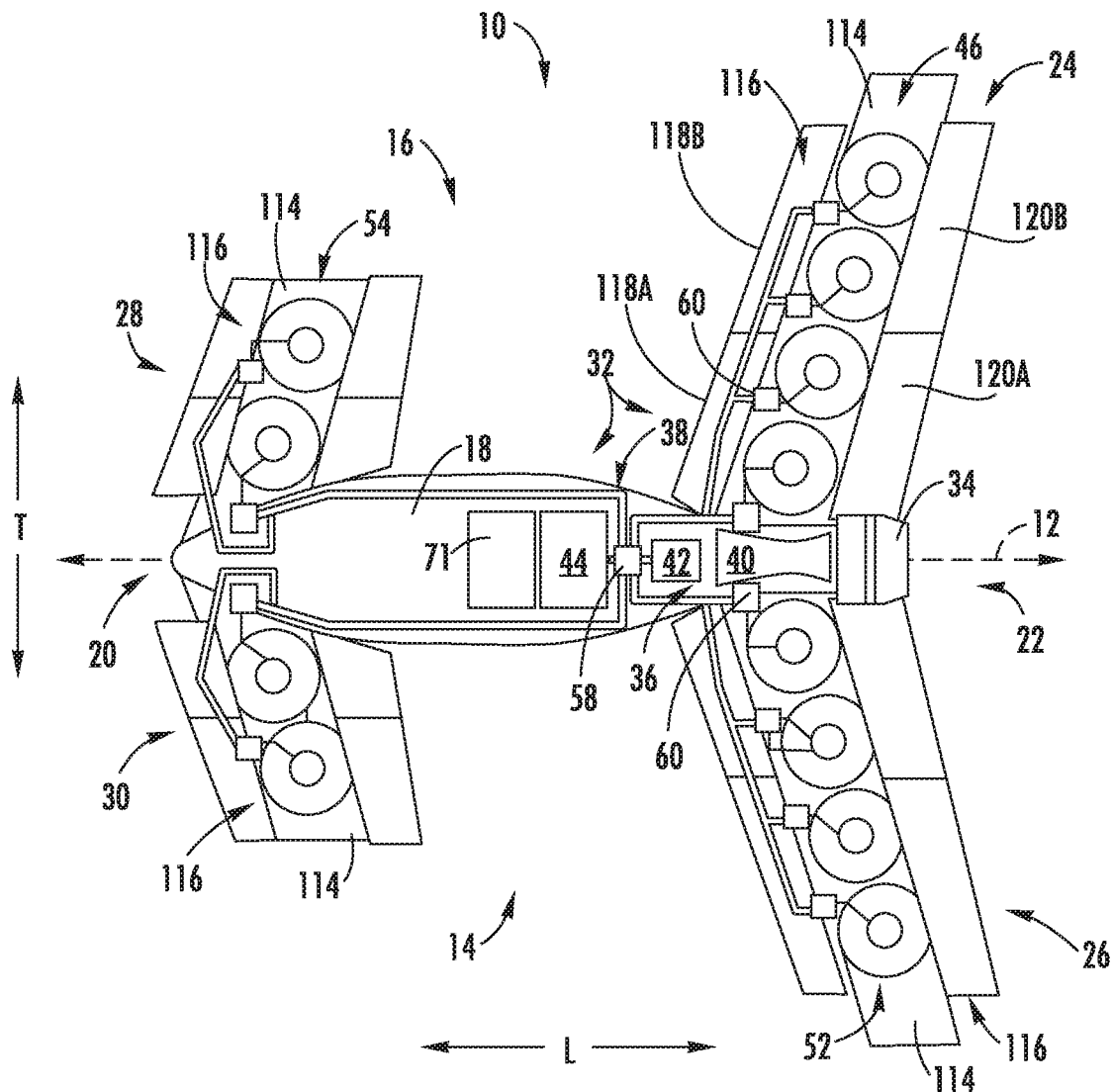
FIG. 7 is a top, schematic view of an aircraft in accordance with another exemplary embodiment of the present disclosure in a vertical flight position.

Further, still, it should be appreciated that although the exemplary variable geometry assemblies 116 depicted in FIGS. 7 and 8 generally include two sets of partial wing assemblies arranged sequentially along the lengthwise directions of the respective wings, in other exemplary embodiments, the variable geometry assemblies may include any other suitable number of partial wing assembly sets (i.e., corresponding pairs of forward and aft partial wing assemblies) arranged sequentially along the lengthwise directions of the respective wings. For example, in other exemplary embodiments, one or more of the variable geometry assemblies 116 may include three sets of partial wing assemblies spaced along the lengthwise directions of the respective wings, four sets of partial wing assemblies arranged sequentially along the lengthwise directions of the respective wings, etc. Further, in certain exemplary embodiments, one or more of the wings may include a variable geometry assembly having an individual set of partial wing assemblies for each VTE fan of the plurality of VTE fans arranged along the length of such wing. Moreover, although for the embodiment depicted in FIGS. 7 and 8 the variable geometry assemblies 116 of each wing includes the same number of partial wing assembly sets, in other embodiments, certain of the wings may include a variable geometry assembly having a different number of partial wing assembly sets than others.

In such a manner, it will be appreciated that the embodiment shown in FIGS. 7 and 8 is by way of example only. Further, although for the embodiments of FIGS. 1 through 6 and FIGS. 7 and 8, the variable geometry assemblies 116 of each of the wings of the aircraft 10 generally include a forward partial wing assembly 118 and an aft partial wing assembly 120, in other embodiments, one or more of these variable geometry assemblies 116 may instead include a single partial wing assembly (i.e., only one of a forward or aft partial wing assembly 118, 120) movable to selectively expose or cover-up one or more of the VTE fans of a respective plurality of VTE fans. Further, in still other exemplary embodiments, one or more of these variable geometry assemblies 116 may have any other suitable configuration for selectively exposing and/or covering up one or more of the VTE fans of the respective plurality of VTE fans.

Referring back to FIGS. 2 and 3, generally, it will be appreciated that an aircraft 10 in accordance with one or more exemplary aspects of the present disclosure may include features for increasing an efficiency of the VTE fans included with the propulsion system 32. More specifically, at least one of the wings, and optionally each of the wings, including VTE fans arranged along a length thereof includes features for enhancing an inlet flowpath and/or exhaust flowpath of the plurality of VTE fans for increasing an amount of thrust generated by such plurality of VTE fans. For example, in at least certain exemplary embodiments, at least one of the wings including VTE fans arranged along a length thereof may include features for defusing an airflow 130 downstream of one or more of the respective VTE fans. As will be appreciated, and as will be discussed in greater detail below, by including these diffusion features, a higher power loading may be achieved for the VTE fans, resulting in an increased performance out of the VTE fan per disk area (i.e., increased performance for a given size/diameter of VTE fan). Such may result in the ability to include smaller VTE fans while providing a desired amount of vertical thrust for the vertical thrust operations of the aircraft 10. Additionally, such a benefit may permit the distribution of a plurality of smaller VTE fans along the length of the wing, allowing for lifting forces generated therefrom to be more evenly distributed along the length of the wing and further allowing for higher aspect ratio wings, each discussed in greater detail below.

Figure 9:
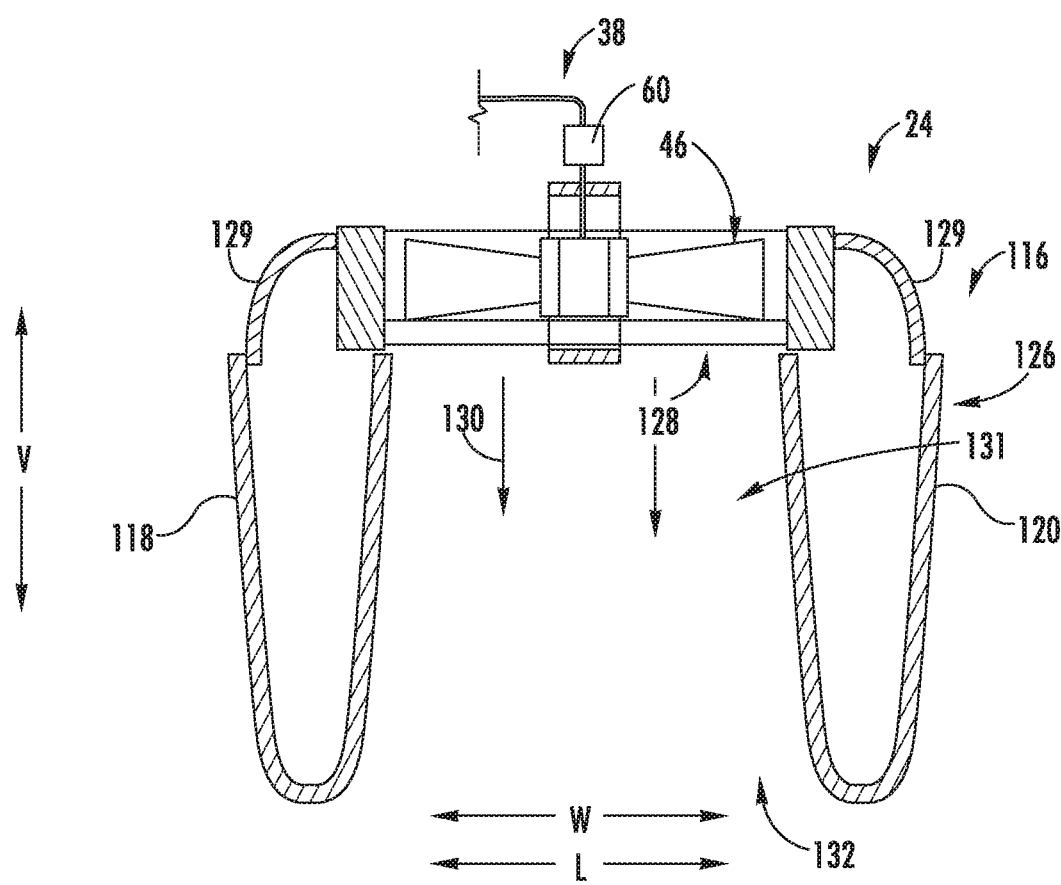
FIG. 9 is a side, schematic, cross-sectional view of a wing in accordance with an exemplary embodiment of the present disclosure as may be incorporated into an aircraft in accordance with yet another exemplary embodiment of the present disclosure in a vertical flight position.

For example, referring first briefly to FIG. 9, a side, cross-sectional view is provided of an aft starboard wing 24 of an aircraft 10, which may be configured in a manner similar to the exemplary aircraft 10 of FIGS. 1 through 6. For example, the view of FIG. 9 may be the same view provided in FIGS. 5 and 6. Accordingly, for the embodiment of FIG. 9, the aft starboard wing 24 includes one or more components that are movable to selectively expose at least one VTE fan of the first plurality of VTE fans 46 arranged along a length 48 of the aft starboard wing 24 (see FIGS. 2 and 3). More specifically, for the embodiment depicted, the one or more components that are movable to selectively expose the at least one VTE fan is a variable geometry assembly 116. The exemplary variable geometry assembly 116 depicted includes a forward partial wing assembly 118 and an aft partial wing assembly 120. As was described above with reference to FIGS. 5 and 6, the forward partial wing assembly 118 and aft partial wing assembly 120 are each movable generally along a horizontal direction, or more specifically, generally along a longitudinal direction L of the aircraft 10 when the variable geometry assembly 116 is moved from a forward thrust position to a vertical thrust position. More specifically, the forward partial wing assembly 118 is movable forward generally along the longitudinal direction L and the aft partial wing assembly 120 is movable aft generally along the longitudinal direction L when the variable geometry assembly 116 is moved from a forward thrust position to a vertical thrust position.

Referring particularly to FIG. 9, it will be appreciated that the aft starboard wing 24 further includes a diffusion assembly 126 positioned, at least in certain configurations, downstream of the at least one VTE fan. More specifically, for the embodiment depicted, the variable geometry assembly 116 is additionally configured as a diffusion assembly 126 (i.e., the diffusion assembly 126 of the aft starboard wing 24 is configured as part of the variable geometry assembly 116 of the aft starboard wing 24). Accordingly, it will be appreciated that in at least certain exemplary embodiments, the diffusion assembly 126 is positioned downstream of multiple of the first plurality of VTE fans 46, such as downstream of each of the first plurality of VTE fans 46. For example, as discussed above and depicted in FIGS. 2 and 3, in certain embodiments the forward partial wing assembly 118 and aft partial wing assembly 120 may extend from an inner (i.e., inner relative to the fuselage 18) edge of an inner-most VTE fan of the first plurality of VTE fans 46, along the lengthwise direction LW of the aft starboard wing 24, at least to an outer (i.e., outer relative to the fuselage 18) edge of an outer-most VTE fan of the first plurality of VTE fans 46. The forward and aft partial wing assemblies 118, 120 may extend continuously in such a manner (e.g., see embodiment of FIGS. 1 through 3), or alternatively, may include multiple partial wing assemblies extending in such a manner (e.g., see embodiment of FIGS. 7 and 8).

More particularly, in order to form the diffusion assembly 126, the variable geometry assembly 116 is configured to pivot the forward partial wing assembly 118 and aft partial wing assembly 120 downwardly into the diffusion configuration shown in FIG. 9. In such a manner, the forward partial wing assembly 118 may be configured to pivot downwardly when the variable geometry assembly 116 is moved to the vertical thrust position, in addition to moving forward generally along the longitudinal direction L of the aircraft 10. Similarly, the aft partial wing assembly 120 may be configured to pivot downwardly when the variable geometry assembly 116 is moved to the vertical thrust position, in addition to moving aft generally along the longitudinal direction L of the aircraft 10. As is depicted, the exemplary aft starboard wing 24 provided includes tracks 129 (see also FIGS. 5 and 6) coupled to the body portion 114, with the forward and aft partial wing assemblies 118, 120 configured to slide along these tracks 129 when being moved forward or aft, respectively, and pivoting downward. Any suitable actuation member may be provided to move the forward and aft partial wing assemblies 118, 120 in such a manner. For example, any suitable hydraulic, pneumatic, or electrical actuation member may be used.

Further, it will be appreciated that the diffusion assembly 126 for the embodiment of FIG. 9 generally defines an inlet 128 configured to receive an airflow 130 from the first plurality of VTE fans 46 and an outlet 132. Although not depicted, the wing 24 may further include an inner end flap and an outer end flap to enclose an exhaust passage 131 defined between the inlet 128 and outlet 132 and the forward partial wing assembly 118 and aft partial wing assembly 120 (similar to the flaps 190, 192 shown in the embodiment of FIG. 13).

Notably, as is shown, and as will be discussed in greater detail below, the inlet 128 may generally define an inlet cross-sectional area and the outlet 132 may generally define an outlet cross-sectional area. The outlet cross-sectional area may be greater than the inlet cross-sectional area such that the diffusion assembly 126 generally defines a diffusion area ratio greater than 1:1. In such a manner, the forward and aft partial wing assemblies 118, 120 of the variable geometry assembly 116 may act to defuse the airflow 130 from the first plurality of VTE fans 46, downstream of the first plurality of VTE fans 46 during operation. As will be discussed in greater detail below, such may allow the first plurality of VTE fans 46 to operate more efficiently.

In certain exemplary embodiments, each of the other wings of the aircraft 10 may be configured in substantially the same manner as the exemplary aft starboard wing 24 described herein with reference to FIG. 9. It will be appreciated, however, that in other exemplary embodiments, any other suitable diffusion assembly 126 may be included with one or more of the wings of a vertical takeoff and landing aircraft 10 in accordance with the present disclosure.

Figure 10:
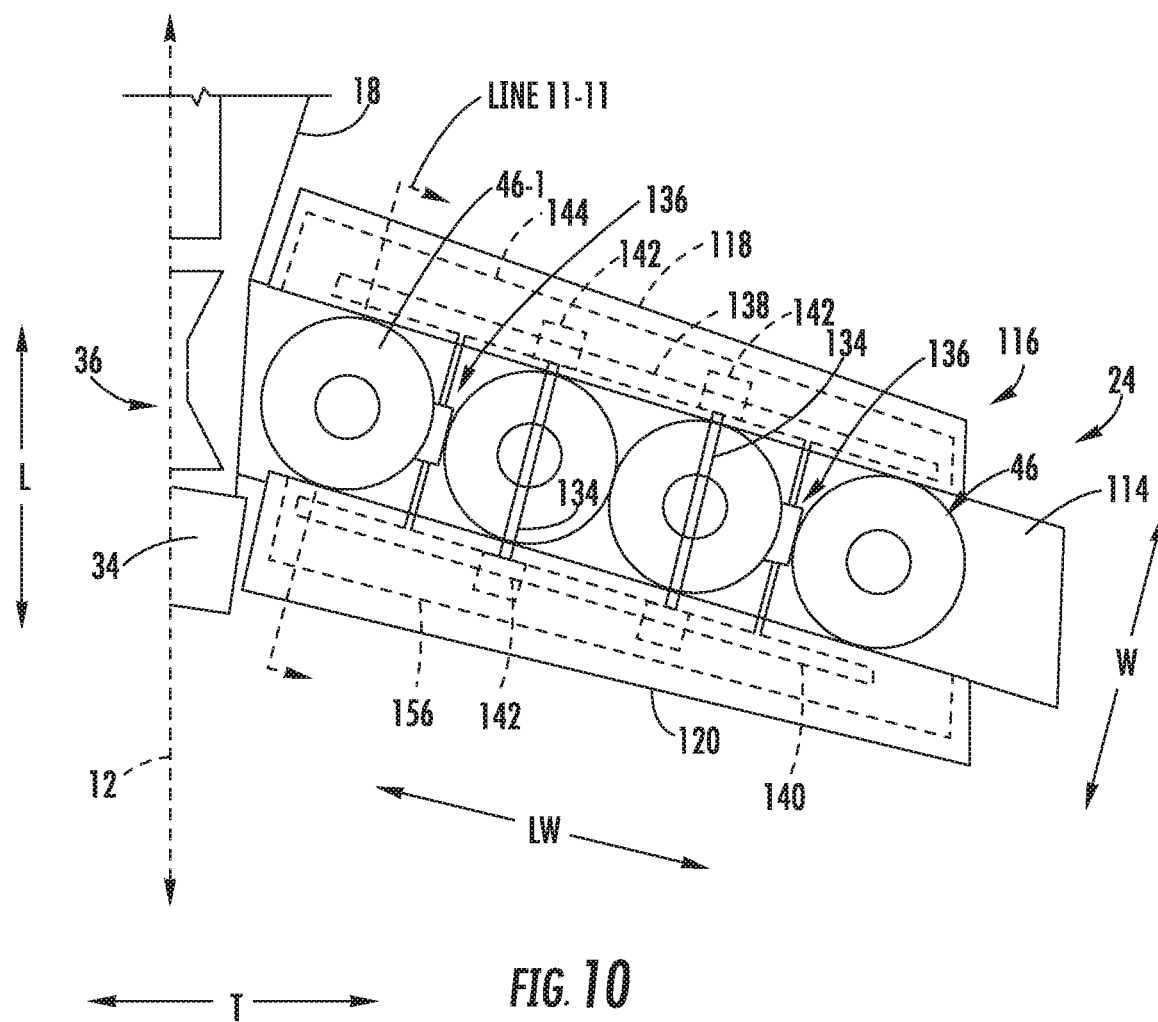
FIG. 10 is a top, schematic view of a wing of an aircraft in accordance with still another exemplary embodiment of the present disclosure in a vertical flight position.
Figure 11:
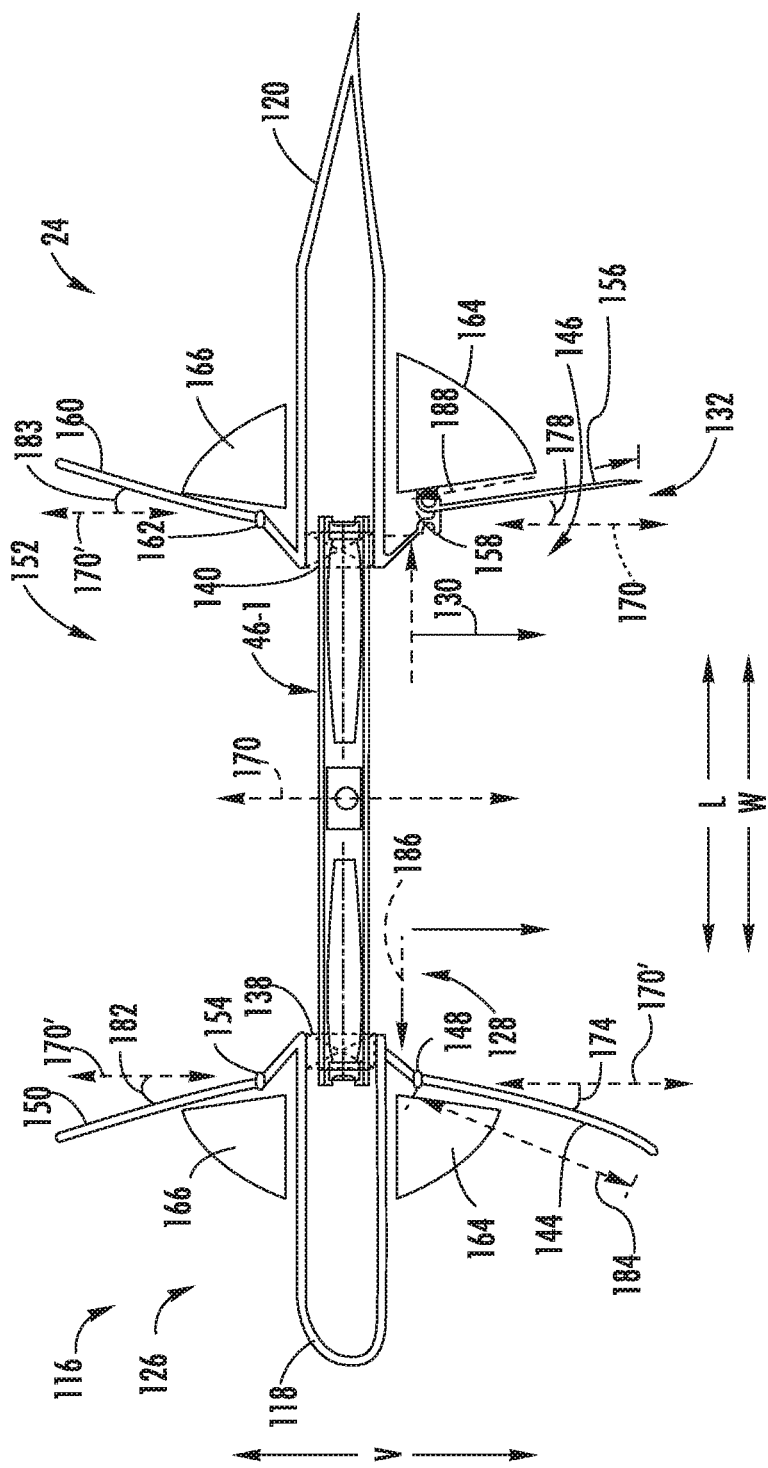
FIG. 11 is a side, schematic, cross-sectional view of the exemplary wing of FIG. 10 in the vertical flight position.
Figure 12:
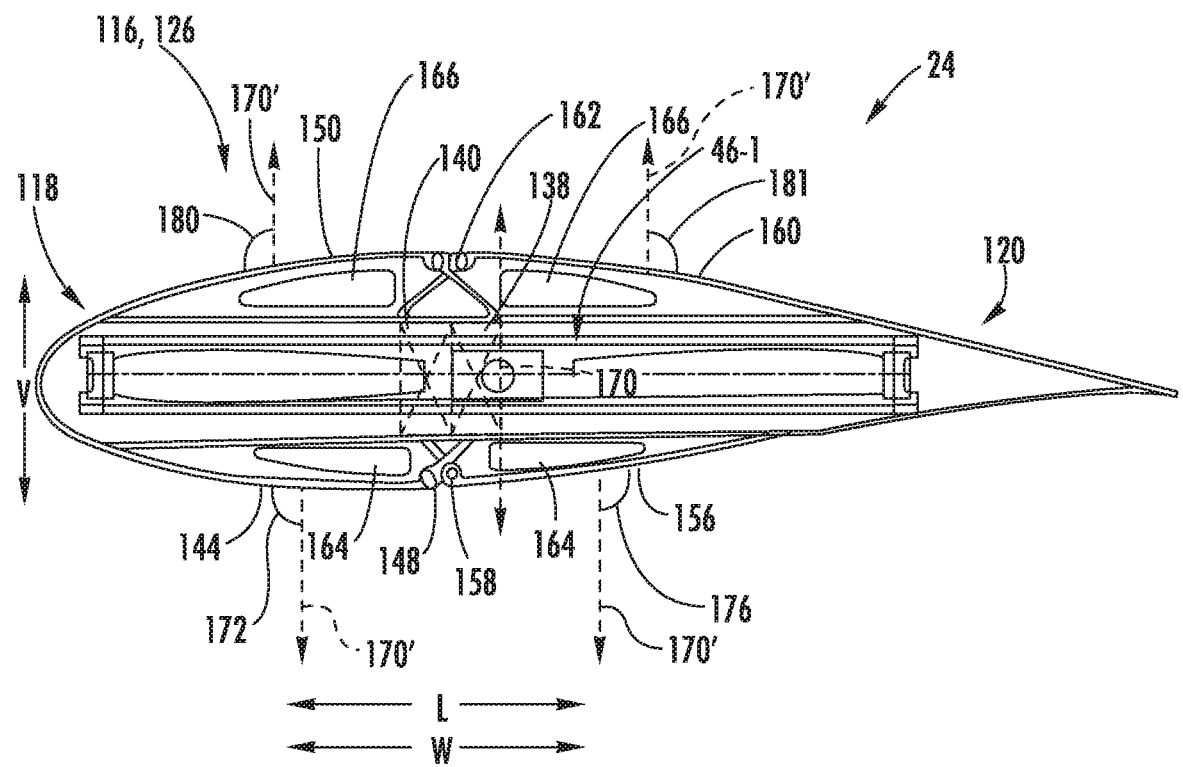
FIG. 12 is a side, schematic, cross-sectional view of the exemplary wing of FIG. 10 in a forward flight position.

For example, referring now to FIGS. 10 through 12 views of an aircraft 10 including a wing having a diffusion assembly 126 in accordance with another exemplary aspect of the present disclosure is provided. In certain exemplary embodiments, the aircraft 10 may be configured in substantially the same manner as the exemplary aircraft 10 described above with reference to FIGS. 1 through 6. Accordingly, the same or similar numbers may refer to the same or similar parts.

For example, referring back briefly to FIGS. 2 and 3, in at least certain embodiments the aircraft 10 generally includes a fuselage 18 and a propulsion system 32 having a power source 36. Moreover, the aircraft 10 includes a plurality of wings extending from, and coupled to, the fuselage 18. For example, the plurality of wings includes a forward starboard wing 28, an aft starboard wing 24, a forward port wing 30 and an aft port wing 26. The propulsion system 32 includes a plurality of VTE fans driven by the power source 36, and more particularly, includes a first plurality of VTE fans 46 arranged along a length 48 of the aft starboard wing 24, a second plurality of VTE fans 52 arranged along a length of the aft port wing 26, a third plurality of VTE fans 54 arranged along a length of the forward starboard wing 28, and a fourth plurality of VTE fans 56 arranged along a length of the forward port wing 30.

Further, each of the wings 24, 26, 28, 30 includes one or more components that are movable to selectively expose at least one VTE fan of the respective pluralities of VTE fans 46, 52, 54, 56. For example, the one or more components of each of the wings 24, 26, 28, 30 may include of a variable geometry assembly 116 movable between a forward thrust position and a vertical thrust position to at least partially cover up and at least partially expose the respective pluralities of VTE fans 46, 52, 54, 56 arranged along the lengths thereof, and more specifically integrated therein. Referring specifically to FIG. 10, providing a close-up, schematic view of the exemplary aircraft 10, and more specifically, of the exemplary aft starboard wing 24 of the exemplary aircraft 10, the aft starboard wing 24 is depicted in the vertical thrust position. Positioning the variable geometry assembly 116 in the vertical thrust position may facilitate a vertical takeoff and landing of the aircraft 10, or other vertical thrust operations. For the embodiment depicted, the aft starboard wing 24 further includes a body portion 114 and the variable geometry assembly 116 includes a partial wing assembly. The body portion 114, in turn, includes a rail 134 and a primary actuator 136. A frame of the partial wing assembly is movably, or rather, slidably, coupled to the body portion 114 of the aft starboard wing 24. More specifically, the frame of the partial wing assembly is movable along the rail 134 of the body portion 114 by the primary actuator 136 of the body portion 114.

Further, for the embodiment depicted, the partial wing assembly is a forward partial wing assembly 118, the frame of the partial wing assembly is a forward frame 138, and the variable geometry assembly 116 of the aft starboard wing 24 further includes an aft partial wing assembly 120. The aft partial wing assembly 120 similarly includes an aft frame 140, and is movable at least partially along the longitudinal direction L. When the variable geometry assembly 116 is moved to a vertical thrust position (shown; see also FIG. 11 below), the forward and aft partial wing assemblies 118, 120 are moved generally forward and aft, respectively, to extended positions, and when the variable geometry assembly 116 is moved to a forward thrust position (see FIG. 12 below), the forward and aft partial wing assemblies 118, 120 are moved generally aft and forward, respectively, to retracted positions. Moreover, as with the forward partial wing assembly 118, the aft frame 140 of the aft partial wing assembly 120 is also movably, or rather, slidably, coupled to the body portion 114 of the aft starboard wing 24. More specifically, the aft frame 140 of the aft partial wing assembly 120 is movable along the rail 134 of the body portion 114 by the primary actuator 136 of the body portion 114.

For the embodiment depicted, the body portion 114 of the aft starboard wing 24 includes two primary actuators 136, with each of these primary actuators 136 coupled to both the forward partial wing assembly 118 and the aft partial wing assembly 120 to move the forward partial wing assembly 118 and aft partial wing assembly 120 between their respective retracted positions (when the variable geometry assembly 116 is in the forward thrust position) and extended positions (when the variable geometry assembly 116 is in a vertical thrust position). The primary actuators 136 may be electric actuators (e.g., including electric motors), hydraulic actuators, pneumatic actuators, or any other suitable actuator for moving the forward and aft partial wing assemblies 118, 120 generally along the longitudinal direction L in the manner described herein.

Further, for the embodiment depicted, the body portion 114 of the aft starboard wing 24 includes three rails 134, and each of the forward partial wing assembly 118 and aft partial wing assembly 120 includes a slide member 142 (depicted in phantom; see also FIGS. 11 and 12) coupled to its respective frame 140, with the slide member 142 movable along a corresponding rail 134. It will be appreciated, however, that in other exemplary embodiments, the body portion 114 of the aft starboard wing 24 may instead include any other suitable number of primary actuators 136, positioned at any other suitable location, and further may include any other suitable number of rails 134 positioned at any other suitable location. For example, in other embodiments, the body portion 114 of the aft starboard wing 24 may include a single primary actuator 136 and a single rail 134, two rails 134, three primary actuators 136, four rails 134 and/or primary actuators 136, etc. Further, it will be appreciated that although the forward partial wing assembly 118 and aft partial wing assembly 120 are configured to move generally along the longitudinal direction L, the body portion 114 of the aft starboard wing 24 is fixedly coupled to the fuselage 18, such that it remains stationary relative to the fuselage 18 during all operating conditions of the aircraft 10.

Reference will now be made particularly to FIGS. 11 and 12. FIGS. 11 and 12 each provide a side, cross-sectional view of a VTE fan positioned within the aft starboard wing 24 of FIG. 10, taken along Line 11-11 of FIG. 10. More specifically, FIG. 11 provides a side, cross-sectional view of the aft starboard wing 24 with the variable geometry assembly 116 in the vertical thrust position; and FIG. 12 provides a side, cross-sectional view of the aft starboard wing 24 with the variable geometry assembly in the forward thrust position. As will be appreciated from FIGS. 11 and 12, the first plurality of VTE fans 46 within the aft starboard wing 24 are substantially completely enclosed within the aft starboard wing 24 when variable geometry assembly 116 is in the forward thrust position (FIG. 12). By contrast, the first plurality of VTE fans 46, for the embodiment depicted, are substantially completely exposed when the variable geometry assembly 116 is in the vertical thrust position (FIG. 11). Notably, as used herein, the term "exposed" with respect to a VTE fan refers to such fan having a substantially open inlet and a substantially open exhaust (with the exception of any exhaust flowpath components, such as diffusion assembly components, described below), such that the fan may receive a flow of air substantially freely and exhaust such flow of air substantially freely.

Moreover, referring first to the forward partial wing assembly 118, it will be appreciated that the forward partial wing assembly 118 further comprises a first member 144. The first member 144 is movable relative to the forward frame 138 of the forward partial wing assembly 118 to form an exhaust path 146 for at least one of the plurality of VTE fans 46, and more particularly, is movable relative to the forward frame 138 to form the exhaust path 146 for the least one of the first plurality VTE fans 46 when the variable geometry assembly 116 is moved to the vertical thrust position. More specifically, still, for the embodiment depicted, the first member 144 is movable relative to the forward frame 138 to form the exhaust path 146 for each of the first plurality of VTE fans 46 when the variable geometry assembly 116 is moved to the vertical thrust position. Accordingly, it will be appreciated that for the embodiment depicted, the first member 144 extends substantially continuously along a length 48 of the aft starboard wing 24, adjacent to each of the first plurality of VTE fans 46. More specifically, the first member 144 extends substantially from an inner edge (i.e., inner a relative to the fuselage 18 of the aircraft 10) of an inner-most VTE fan of the first plurality of VTE fans 46 to an outer edge (i.e., outer relative to the fuselage 18 of the aircraft 10) of an outer-most VTE fan of the first plurality of VTE fans 46 (see FIG. 10).

Further, it will be appreciated that for the embodiment depicted, the first member 144 of the forward partial wing assembly 118 is configured as a bottom member of the forward partial wing assembly 118, and accordingly, is configured to move downwardly generally along the vertical direction V when the variable geometry assembly 116 is moved to the vertical thrust position (and the forward partial wing assembly 118 is moved to an extended position). For the embodiment depicted, the bottom member is pivotably coupled to the forward frame 138 of the forward partial wing assembly 118 at a joint 148, and accordingly, is configured to pivot downwardly generally along the vertical direction V about the joint 148 when the variable geometry assembly 116 is moved to the vertical thrust position. In certain embodiments, the joint 148 may extend continuously along a length of the first member 144, or alternatively, the joint 148 may include a plurality of individual joints 134 spaced along the length of the first member 144 (i.e., along the lengthwise direction LW of the aft starboard wing 24).

Additionally, referring still to the forward partial wing assembly 118, for the exemplary embodiment depicted, the forward partial wing assembly 118 further includes a second member 150 similarly movable relative to the forward frame 138 of the forward partial wing assembly 118 to at least partially define an inlet path 152 for the at least one VTE fan of the first plurality of VTE fans 46. More specifically, still, for the embodiment depicted, the second member 150 is movable relative to the forward frame 138 to form the inlet path 152 for each of the first plurality of VTE fans 46 when the variable geometry assembly 116 is moved to the vertical thrust position. Accordingly, it will be appreciated that for the embodiment depicted, the second member 150 also extends substantially continuously along the length 48 of the aft starboard wing 24, adjacent to each of the first plurality of VTE fans 46 (i.e., substantially from an inner edge of an inner-most VTE fan of the first plurality of VTE fans 46 to an outer edge of an outer-most VTE fan of the first plurality of VTE fans 46).

Moreover, for the embodiment shown, the second member 150 is a top member and is configured to move upwardly generally along the vertical direction V when the variable geometry assembly 116 is moved to the vertical thrust position. More particularly, as with the bottom member, the top member is pivotably coupled to the forward frame 138 of the forward partial wing assembly 118 at a joint 154, and accordingly, is configured to pivot upwardly generally along the vertical direction V about the joint 154 when the variable geometry assembly 116 is moved to the vertical thrust position. As with the joint 148, the joint 154 may be a continuous joint (i.e., extending substantially continuously along the length of the second member 150), or alternatively, may be a plurality of individual joints spaced along the length of the second member 150.

Referring still to FIGS. 11 and 12, the aft partial wing assembly 120 similarly includes a first member 156 movable relative to the frame 140 of the aft partial wing assembly 120 also to form at least in part the exhaust path 146 for the at least one VTE fan of the first plurality of VTE fans 46, and more particularly, is movable relative to the frame 140 to form at least in part the exhaust path 146 for the least one VTE fan of the first plurality VTE fans 46 when the variable geometry assembly 116 is moved to the vertical thrust position. More specifically, still, for the embodiment depicted, the first member 156 of the aft partial wing assembly 120 is configured as a bottom member of the aft partial wing assembly 120, and accordingly, is configured to move downwardly generally along the vertical direction V when the aft partial wing assembly 120 is moved to the vertical thrust position. For the embodiment depicted, the bottom member is pivotably coupled to the forward frame 138 of the forward partial wing assembly 118 at a joint 158, and accordingly, is configured to pivot downwardly generally along the vertical direction V about the joint 158 when the variable geometry assembly 116 is moved to the vertical thrust position.

Moreover, as with the forward partial wing assembly 118, for the exemplary embodiment depicted, the aft partial wing assembly 120 also includes a second member 160 similarly movable relative to the frame 140 of the aft partial wing assembly 120 to form at least in part the inlet path 152 for the at least one VTE fan of the first plurality of VTE fans 46. More specifically, for the embodiment shown, the second member 160 is a top member is configured to move upwardly generally along the vertical direction V when the variable geometry assembly 116 is moved to the vertical thrust position. More particularly, as with the bottom member, the top member is pivotably coupled to the frame 140 of the aft partial wing assembly 120 at a joint 162, and accordingly, is configured to pivot upwardly generally along the vertical direction V about the joint 162 when the variable geometry assembly 116 is moved to the vertical thrust position.

Notably, as with the first and second members 144, 150 of the forward partial wing assembly 118, the first and second members 156, 160 of the aft partial wing assembly 120 may each extend substantially continuously along the length 48 of the aft starboard wing 24, such that they each extend adjacent to each of the first plurality of VTE fans 46 (i.e., substantially from an inner edge of an inner-most VTE fan of the first plurality of VTE fans 46 to an outer edge of an outer-most VTE fan of the first plurality of VTE fans 46).

It should be appreciated, however, that in other exemplary embodiments, the first and second members 144, 150 of the forward partial wing assembly 118 and/or the first and second members 156, 160 of the aft partial wing assembly 120 may not extend continuously in such a manner, and instead may have any other suitable configuration. For example, in other exemplary embodiments, one or more of such members 144, 150, 156, 160 may include a plurality of individual members arranged sequentially along the length 48 of the aft starboard wing 24. In such an embodiment, such plurality of members may operate independently of one another, and/or may operate in unison.

Regardless, referring still to FIGS. 11 and 12, it will be appreciated that for the embodiment depicted, each of the first and second members 144, 150 of the forward partial wing assembly 118 and first and second members 156, 160 of the aft partial wing assembly 120 are generally movable between an open position (FIG. 11) and a closed position (FIG. 12). When in the closed positions, the first and second members 144, 150 of the forward partial wing assembly 118 and first and second members 156, 160 of the aft partial wing assembly 120 together form an airfoil cross-sectional shape for the aft starboard wing 24. More specifically, when the first and second members 144, 150 of the forward partial wing assembly 118 and the first and second members 156, 160 of the aft partial wing assembly 120 are in the closed positions, and the variable geometry assembly 116 is in the forward thrust position (FIG. 12), the first and second members 144, 150 of the forward partial wing assembly 118 and the first and second members 156, 160 of the aft partial wing assembly 120 each form at least in part the airfoil cross-sectional shape for the aft starboard wing 24. By contrast, when the first and second members 144, 150 of the forward partial wing assembly 118 and first and second members 156, 160 of the aft partial wing assembly 120 are in the open position, they each form at least in part the inlet path 152 or the exhaust path 146 for the at least one VTE fan of the first plurality of VTE fans 46.

Additionally, for the embodiment depicted the first member 144 and the second member 150 of the forward partial wing assembly 118 are movable by a first member actuator 164 and a second member actuator 166, respectively. For the embodiment depicted, the first member actuator 164 and the second member actuator 166 are each configured as pneumatic actuators, and more specifically, as an inflatable bladder configured to receive a pressurized flow of air to expand when the forward partial wing assembly 118 is moved to the forward thrust position in order to pivot the first member 144 downwardly along the vertical direction V to its open position and the second member 150 upwardly along the vertical direction V to its open position. Notably, in certain embodiments, the first and second members 144, 150 may be biased towards the closed/retracted position, such that the first and second members 144, 150 may be moved to their respective closed positions by deactivating or deflating the respective (pneumatic) actuators 164, 166.

Accordingly, it will be appreciated that for the embodiment shown, the first member actuator 164 and the second member actuator 166 may operate independently of the primary actuators 136 described above with reference to FIG. 10 configured to move the forward partial wing assembly 118 and aft partial wing assembly 120 forward and aft, respectively, generally along the longitudinal direction L. Additionally, for the embodiment depicted, the first member actuator 164 is also operable independently of the second member actuator 166. Accordingly, in certain embodiments, the first member 144 may be moved to its opened position, while the second member 150 remains in its closed position. Such may be beneficial during, e.g., transitional operational conditions, such as when the aircraft 10 is transitioning from vertical flight to forward flight.

As is also depicted, the first member 156 and second member 160 of the aft partial wing assembly 120 are similarly movable by a first member actuator 164 and a second member actuator 166, respectfully. The first member actuator 164 of the aft partial wing assembly 120 may operate in substantially the same manner as the first member actuator 164 the forward partial wing assembly 118. Additionally, the second member actuator 166 of the aft partial wing assembly 120 may operate in substantially the same manner as the second member actuator 166 of the aft partial wing assembly 120. Accordingly, will be appreciated that the first and second members 156, 160 of the aft partial wing assembly 120 are also movable in the same manner as the first and second members 156, 160 of the forward partial wing assembly 118, as described above. (Notably, in such a manner, the first and second members 156, 160 of the aft partial wing assembly 120 may also be biased towards their respective closed positions.)

Referring particularly to FIG. 11, as discussed above, the aft starboard wing 24 is depicted with the variable geometry assembly 116 in the vertical thrust position and the first members 144, 156 of the forward and aft partial wing assemblies 118, 120 each in the open positions to form the exhaust path 146 for the at least one VTE fan. Notably, for the embodiment depicted, exhaust path 146 is a diffusion exhaust flowpath for the VTE fan. In such a manner, it will be appreciated that the diffusion assembly 126, and more specifically, the first members 144, 156, together define an inlet 128 and an outlet 132. As the exemplary flowpath 146 is a diffusion flowpath, it will be appreciated that the diffusion assembly 126 may generally define an inlet cross-sectional area at the inlet 128 that is less than an outlet cross-sectional area at the outlet 132. As will be discussed in more detail below, inclusion of the diffusion exhaust flowpath 146 may increase an overall efficiency of the VTE fan.

Further, it will be appreciated that for the embodiment depicted, a first VTE fan 46-1 (see also FIG. 10) of the first plurality of VTE fans 46 (i.e., the at least one VTE fan depicted) defines a fan axis 170. The first member 144 of the forward partial wing assembly 118 defines a first angle 172 with the fan axis 170 when the variable geometry assembly 116 is in the forward thrust position and when the first member 144 is in its closed position (FIG. 12), and further the first member 144 of the forward partial wing assembly 118 defines a second angle 174 with the fan axis 170 when the variable geometry assembly 116 is in the vertical thrust position and when the first member 144 is in its open position (FIG. 11). (Notably, the first angle 172 and second angle 174, along with the angles noted below, are shown being defined with reference fan lines 170', which are parallel to the actual fan axis 170, for convenience). As is evident, the first angle 172 is greater than the second angle 174. For example, the first angle 172, for the embodiment depicted, is between about seventy-five (75) degrees and about one hundred and five (105) degrees, whereas the second angle 174 is between about minus thirty (−30) degrees and about seventy-five (75) degrees. For example, in at least certain exemplary embodiments, the first angle 172 may be between about eighty (80) degrees and one hundred (100) degrees, and the second angle 174 may be between about sixty (60) degrees and zero (0) degrees, such as between about forty-five (45) degrees and five (5) degrees. Alternatively, it will be appreciated that instead of being configured to form a portion of a diffusion exhaust flowpath, the first member 144 may instead be configured 24 to form a nozzle exhaust flowpath. With such an exemplary embodiment, the second angle 174 may be between zero (0) degrees and minus thirty (−30) degrees, such as less than about minus five (−5) degrees.

Notably, for the embodiment depicted, the first member 156 of the aft partial wing assembly 120 also defines a first angle 176 with the fan axis 170 when the variable geometry assembly 116 is in the vertical thrust position and when the first member 156 is in its open position (FIG. 11), and a second angle 178 with the fan axis 170 when the variable geometry assembly 116 is in the forward thrust position and when the first member 156 is in its closed position (FIG. 12). The first angle 176 defined between the first member 156 of the aft partial wing assembly 120 and the fan axis 170 may be substantially equal to the first angle 172 defined between the first member 144 of the forward partial wing assembly 118 and the fan axis 170, and similarly, the second angle 178 defined between the first member 156 of the aft partial wing assembly 120 and the fan axis 170 may be substantially equal to the second angle 174 defined between the first member 144 of the forward partial wing assembly 118 and the fan axis 170.

Further, for the embodiment depicted, the second member 150 of the forward partial wing assembly 118 similarly defines a first angle 180 with the fan axis 170 when the variable geometry assembly 116 is in the forward thrust position and when the second member 150 is in its closed position (FIG. 12), and further the second member 150 of the forward partial wing assembly 118 defines a second angle 182 with the fan axis 170 when the variable geometry assembly 116 is in the vertical thrust position and when the second member 150 is in its open position (FIG. 11). As is evident, the first angle 180 is less than the second angle 182. For example, the first angle 180, for the embodiment depicted, is between about sixty degrees and about one hundred and twenty degrees and the second angle 182 is between about one hundred degrees and about one hundred and eighty degrees. More specifically, for the embodiment depicted, the first angle 180 is between about seventy-five degrees and one hundred and ten degrees and the second angle 182 is between about one hundred and ten degrees and about one hundred and seventy degrees.

Notably, for the embodiment depicted, the second member 160 of the aft partial wing assembly 120 also defines a first angle 181 with the fan axis 170 when the variable geometry assembly 116 is in the vertical thrust position and when the first member 156 is in its open position (FIG. 11), and a second angle 183 with the fan axis 170 when the variable geometry assembly 116 is in the forward thrust position and when the first member 156 is in its closed position (FIG. 12). The first angle 181 defined between the second member 160 of the aft partial wing assembly 120 and the fan axis 170 may be substantially equal to the first angle 180 defined between the second member 150 of the forward partial wing assembly 118 and the fan axis 170, and similarly, the second angle 183 defined between the second member 160 of the aft partial wing assembly 120 and the fan axis 170 may be substantially equal to the second angle 182 defined between the second member 150 of the forward partial wing assembly 118 and the fan axis 170.

Moreover, it will be appreciated that for the embodiment depicted, the first member 144 of the forward partial wing assembly 118 defines a length 184 and the first VTE fan 46-1 of the plurality of VTE fans 46 (i.e., the at least one VTE fan depicted) defines a fan diameter 186. For the embodiment depicted, the length 184 of the first member 144 of the forward partial wing assembly 118 is at least about twenty-five (25) percent of the fan diameter 186. Similarly, the first member 156 of the aft partial wing assembly 120 defines a length 188. The length 188 of the first member 156 of the aft partial wing assembly 120 is also at least about twenty-five (25) percent of the fan diameter 186. Moreover, the lengths 184, 188 of the first members 144, 156 of the forward and aft partial wing assemblies 118, 120, respectfully, may be up to about one hundred and fifty percent of the fan diameter 186.

Figure 13:
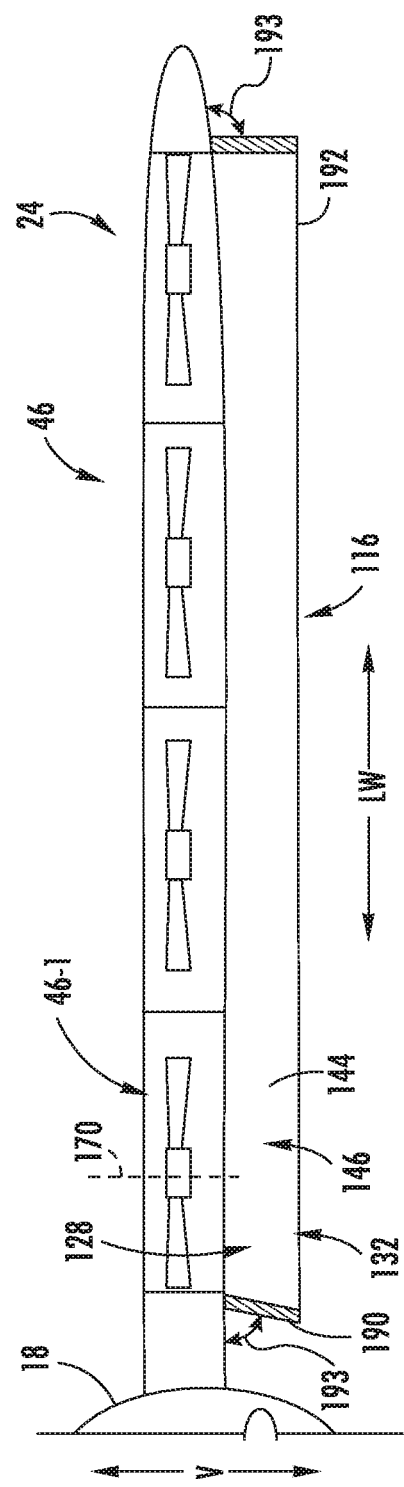
FIG. 13 is a forward, schematic, cross-sectional view along a lengthwise direction of the exemplary wing of FIG. 10 in the vertical flight position.

Further, referring now briefly to FIG. 13, an aft-looking-forward, cross-sectional view is provided of the exemplary aft starboard wing 24 described above with reference to FIGS. 10 through 12 generally along the lengthwise direction LW of the aft starboard wing 24. Briefly, FIG. 13 shows that in at least certain exemplary embodiments, the diffusion assembly 126 may further include one or more features for enclosing the exhaust flowpath 146 defined at least in part by the first members 144, 156 integrated into the forward partial wing assembly 118 and aft partial wing assembly 120, respectfully. More specifically, for the embodiment depicted, the diffusion assembly 126 further includes an inner flap 190 and an outer flap 192. The inner flap 190 may extend generally along the longitudinal direction L, or widthwise direction W, between the first members 144, 146 at an inner end of the flowpath 146 and the outer flap 192 may extend generally along the longitudinal direction L, or widthwise direction W, between the first members 144, 146 at an outer end of the flowpath 146. The inner flap 190 and outer flap 192 may include actuators similar to the first and second member actuators 164, 166, or in accordance with any other suitable configuration. Further, it will be appreciated that the inner and outer flaps 190, 192 may be moved, e.g., along directional arrows 193, to an open position (shown) from a closed position (directional arrows provided) when the variable geometry assembly 116 is moved to the vertical thrust position (shown).

Furthermore, it will be appreciated that although the embodiments shown in FIGS. 10 through 13 relate to the aft starboard wing 24 of the exemplary aircraft 10 described above with reference to FIGS. 1 through 3, in certain embodiments, each of the other wings of the aircraft 10 may also include one or more of the exemplary features described with reference to FIGS. 11 and 12. For example, in certain embodiments, the aft port wing 26, forward starboard wing 28, and forward port wing 30 may each also include forward and aft partial wing assemblies 118, 120 with the forward and aft partial wing assemblies 118, 120 having a first, bottom member and a second, top member configured in substantially the same manner as the first and second members 144, 150 of the forward and aft partial wing assemblies 118, 120 of FIGS. 10 through 13.

Inclusion of a forward partial wing assembly 118 including a first member and an aft partial wing assembly 120 including a first member in accordance with an exemplary embodiment of the present disclosure may allow for the wing to form an exhaust flowpath for the plurality of VTE fans capable of improving performance of the plurality of VTE fans. In such a manner, smaller, and less powerful VTE fans may be included within the aircraft 10, while still providing a desired amount of vertical thrust for, e.g., vertical takeoff and vertical landing.

It should be appreciated, however, that the exemplary diffusion assembly 126 described with reference to FIGS. 10 through 13 is provided by way of example only. For example, in other embodiments, any other suitable configuration may be provided. For example, in other embodiments, the forward partial wing assembly 118 may not include the second member 150, and similarly, the aft partial wing assembly 120 may not include the second member 160.

Furthermore, it will be appreciated that in still other exemplary embodiments, other suitable diffusion assemblies may be included with one or more of the wings of a vertical takeoff and landing aircraft 10.

Figure 14:
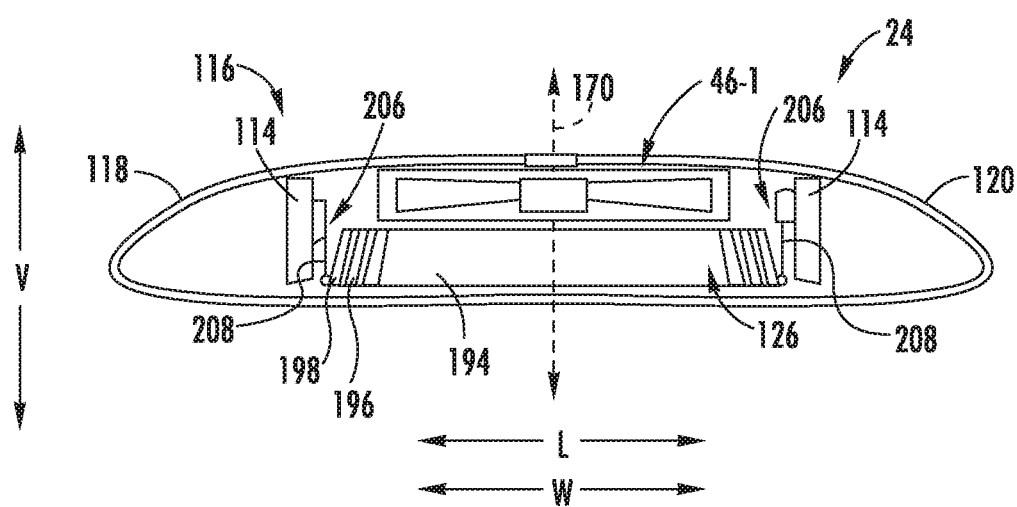
FIG. 14 is a side, schematic, cross-sectional view of a wing of an aircraft having a diffusion assembly in accordance with an exemplary embodiment of the present disclosure positioned therein, with the wing in a forward flight position.

For example, referring now generally to FIGS. 14 through 16, aspects of an aircraft 10 including a wing having a diffusion assembly 126 in accordance with yet another exemplary embodiment of the present disclosure is provided. In certain exemplary embodiments, the aircraft 10 may be configured in substantially the same manner as the exemplary aircraft 10 described above with reference to FIGS. 1 through 3. Accordingly, the same or similar numbers may refer to the same or similar parts.

For example, referring back briefly to FIGS. 2 and 3, in at least certain embodiments the aircraft 10 generally includes a fuselage 18 and a propulsion system 32 having a power source 36. Moreover, the aircraft 10 includes a plurality of wings extending from, and coupled to, the fuselage 18. For example, the plurality of wings includes a forward starboard wing 28, an aft starboard wing 24, a forward port wing 30, and an aft port wing 26. The propulsion system 32 includes a plurality of VTE fans driven by the power source 36, and more particularly, includes a first plurality of VTE fans 46 arranged along a length 48 of the aft starboard wing 24, a second plurality of VTE fans 52 arranged along a length of the aft port wing 26, a third plurality of VTE fans 54 arranged along a length of the forward starboard wing 28, and a fourth plurality of VTE fans 56 arranged along a length of the forward port wing 30.

Further, each of the wings 24, 26, 28, 30 includes one or more components that are movable to selectively expose at least one VTE fan of the respective pluralities of VTE fans 46, 52, 54, 56. For example, the one or more components of the wings 24, 26, 28, 30 may be components of a variable geometry assembly 116 movable between a forward thrust position and a vertical thrust position to at least partially cover up and at least partially expose the respective pluralities of VTE fans 46, 52, 54, 56 arranged along the lengths thereof, and more specifically integrated therein. For example, referring now particularly to FIGS. 14 and 15, a variable geometry assembly 116 of the aft starboard wing 24 in accordance with the present exemplary embodiment is depicted in the forward thrust position in FIG. 14, and in the vertical thrust position in FIG. 15. More specifically, FIG. 14 provides a side, cross-sectional view of the exemplary aft starboard wing 24 through a first VTE fan 46-1 of the first plurality of VTE fans 46, with the variable geometry assembly 116 in the forward thrust position; and FIG. 15 provides a side, cross-sectional view of the aft starboard wing 24 through the first VTE fan 46-1, with the variable geometry assembly 116 in the vertical thrust position.

Additionally, as stated above, the aft starboard wing 24 includes a diffusion assembly 126. However, as is shown, for the embodiment depicted the diffusion assembly 126 is not integrated into the variable geometry assembly 116. More specifically, the diffusion assembly 126 of the aft starboard wing 24 includes a plurality of members that are separate from the variable geometry assembly 116 and movable generally between a first position (FIG. 14) and a second position (FIG. 15). More specifically, the exemplary diffusion assembly 126 generally includes a first member 194 and a second member 196. The second member 196 is movable generally along the vertical direction V relative to the first member 194 such that the first member 194 and second member 196 together define at least in part an exhaust flowpath 146 for the first VTE fan 46-1 when the diffusion assembly 126 is in the second position (FIG. 15). More particularly, as is shown, the first VTE fan 46-1 generally defines an axis 170 about which it rotates, and the second member 196 is generally movable downwardly along the vertical direction V and along the axis 170 when the diffusion assembly 126 is moved from the first position (FIG. 14) to the second position (FIG. 15).

Further, for the exemplary embodiment depicted, the diffusion assembly 126 further includes a third member 198, the third member 198 is similarly movable generally along the vertical direction V relative to the first member 194 and the second member 196 such that the third member 198 also define at least in part the exhaust flowpath 146 for the first VTE fan 46-1 when the diffusion assembly 126 is in the second position (FIG. 15). More specifically, the third member 198 is also movable generally downwardly along the vertical direction V along the axis 170 of the first VTE fan 46-1 when the diffusion assembly 126 is moved from the first position to the second position.

For the embodiment depicted, the first member 194, second member 196, and third member 198 are generally nested within one another. More specifically, it will be appreciated that for the embodiment depicted, the first position is a retracted position (FIG. 14) and the second position is an extended position (FIG. 15). When the diffusion assembly 126 is in the retracted position, the first member 194 is nested at least partially within the second member 196 and the second member 196 is nested at least partially within the third member 198. It will be appreciated that as used herein, the term "nested" with reference to the members 194, 196, 198 of the diffusion assembly 126 refers to a smaller member being positioned substantially completely within a larger member.

Moreover, referring briefly also to FIG. 16, a view is provided of the diffusion assembly 126 and first VTE fan 46-1 along the vertical direction V from a bottom side of the diffusion assembly 126 and first VTE fan 46-1. It will be appreciated from FIG. 16 that the first member 194, the second member 196, and the third member 198 each define a closed cross-sectional shape (i.e., a closed shape in a horizontal cross-section). More specifically, for the embodiment depicted, the first member 194, the second member 196, and the third member 198 each define a substantially circular shape. Further, referring back also to FIGS. 13 and 14 (and particularly, the Callout A in FIG. 15), each of the first member 194, the second member 196, and the third member 198 define a minimum internal cross measurement. For the embodiment shown, where the closed cross-sectional shapes of these members are circular cross-sectional shapes, the minimum internal cross measurements are minimum internal diameters (i.e., the first member 194 defines a first minimum internal diameter 200, the second member 196 defines a second minimum internal diameter 202, and the third member 198 defines a third minimum internal diameter 204).

Furthermore, it will be appreciated that the first member 194 defines a substantially frustoconical shape along the axis 170 of the first VTE fan 46-1, the second member 196 defines a substantially frustoconical shape along the axis 170 of the first VTE fan 46-1, and the third member 198 also defines a substantially frustoconical shape along the axis 170 of the first VTE fan 46-1. In such a manner, it will be appreciated that each of the first member 194, second member 196, and third member 198 of the diffusion assembly 126 each additionally define a maximum internal diameter 201, 203, 205, respectively, with the portion of the respective member defining the minimum internal diameter being above the portion of the respective member defining the maximum internal diameter along the vertical direction V.

In such a manner, it will be appreciated that the diffusion assembly 126 generally defines an inlet 128 immediately downstream of the first VTE fan 46-1 and an outlet 132 downstream of the inlet 128. The diffusion assembly 126 further defines an outlet cross-sectional shape at the outlet 132 that is greater than an inlet cross-sectional shape at the inlet 128, such that the exemplary diffusion assembly 126 depicted defines a diffusion area ratio greater than about 1:1 and less than about 2:1. The benefit of such a configuration will be described in greater detail below.

Referring particularly to the embodiment depicted, will be appreciated that the first VTE fan 46-1 of the first plurality VTE fans defines a fan diameter 186 and the minimum internal diameter 200 of the first member 194 of the diffusion assembly 126 is greater than or substantially equal to the fan diameter 186. Additionally, the second member 196 is generally larger than the first member 194, and the third member 198 is generally larger than the second member 196. Such may enable the nesting configuration when the diffusion assembly 126 is in the retracted position (FIG. 14). Accordingly, it will be appreciated that the minimum internal diameter 202 of the second member 196 is greater than the minimum internal diameter 200 of the first member 194, and further, the minimum internal diameter 204 of the third member 198 is greater than the minimum internal diameter 202 of the second member 196. Similarly, the maximum internal diameter 203 of the second member 196 is greater than the maximum internal diameter 201 of the first member 194, and the maximum internal diameter 205 of the third member 198 is greater than the maximum internal diameter 203 of the second member 196.

Further, given the substantially frustoconical shapes of the first member 194, second member 196, and third member 198, the second member 196 may be configured to rest on the first member 194 when moved to the extended position, and similarly, the third member 198 may be configured to rest on the second member 196 when moved to the extended position. Accordingly, it will be appreciated that the first member 194 defines a maximum outer diameter 207 (i.e., at a bottom end along the vertical direction V; see particularly Callout A in FIG. 15) greater than the minimum internal diameter 202 of the second member 196, and similarly, the second member 196 defines a maximum outer diameter 209 (i.e., at a bottom end along the vertical direction V; see particularly Callout A in FIG. 15) greater than the minimum internal diameter of the third member 198.

In order to move the diffusion assembly 126 between the first, retracted position (FIG. 14) and the second, extended position (FIG. 15) the diffusion assembly 126 further includes an actuation member 206. More particularly, for the embodiment depicted, the diffusion assembly 126 includes a pair of actuation members 206 mounted to a body portion 114 of the aft starboard wing 24. Each actuation member 206 includes an extension 208 coupled to the third member 198 of the diffusion assembly 126. The extensions 208 of the actuation members 206 may move the third member 198 of the diffusion assembly 126 generally along the vertical direction V to move the diffusion assembly 126 between the extended position and retracted position. Notably, however, in other embodiments, the second member 196 and third member 198 may instead be biased towards the extended position, and the actuation members 206 may only move the diffusion assembly 126 to the retracted position. Alternatively, in still other embodiments, the second member 196 and third member 198 may be biased towards the retracted position and the actuation members 206 may only move the diffusion assembly 126 to the extended position.

Further, in other embodiments, any other suitable actuation member 206 may be provided for moving various members between the extended positions and the retracted positions. Moreover, although the first member 194, second member 196, and third member 198 each define a substantially circular cross-sectional shape for the embodiment shown (and more particularly, a substantially frustoconical shape for the embodiments shown), in other embodiments, one or more of the first member 194, second member 196, and third member 198 may define any other suitable cross-sectional shape. Further, although for the embodiment depicted, the diffusion assembly 126 includes three members, in other embodiments, the diffusion assembly 126 may include any other suitable number of members. For example, in other embodiments, the diffusion assembly 126 may include two members, four members, five members, or more.

Figure 17:
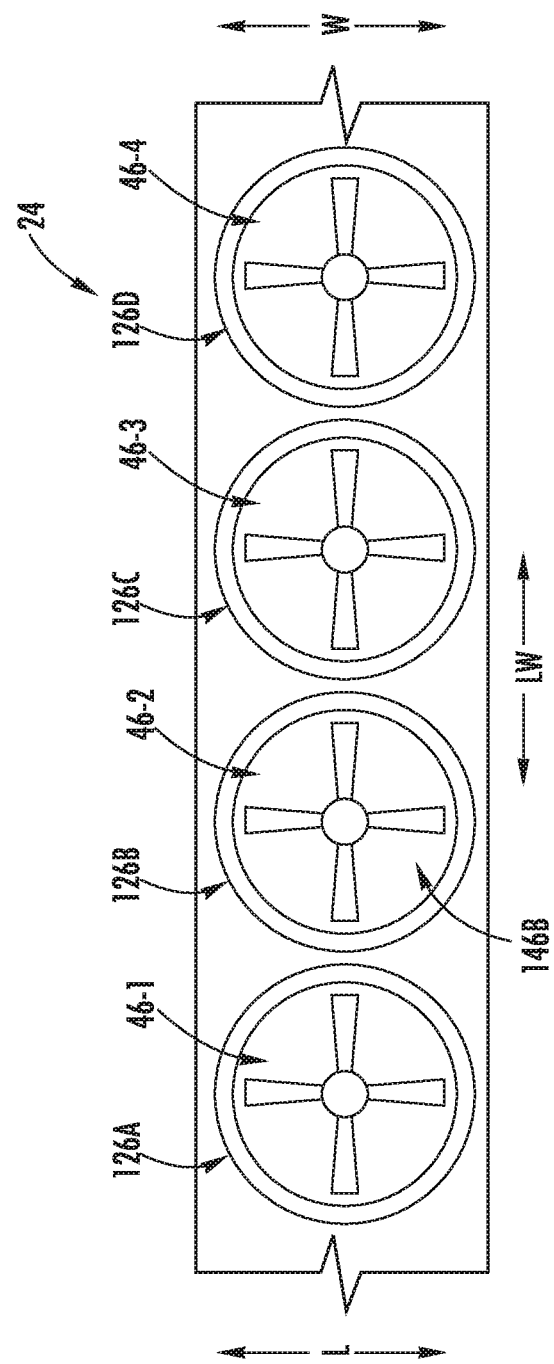
FIG. 17 is another schematic, underside view of the wing of the aircraft having the exemplary diffusion assembly of FIG. 14 along the vertical direction.

Further, still, although the exemplary diffusion assembly 126 discussed above with reference to FIGS. 14 through 16 is discussed as being associated with only the first VTE fan 46-1 of the first plurality of VTE fans 46, in other exemplary embodiments, the aft starboard wing 24 may include additional diffusion assemblies associated with each of the first plurality of VTE fans 46. For example, referring briefly to FIG. 17, providing a schematic, underside view of the aft starboard wing 24, it will be appreciated that the above discussed diffusion assembly 126 may be a first to diffusion assembly 126A, and the wing may further include a plurality of diffusion assemblies 126, with each diffusion assembly 126 associated with one of the respective VTE fans of the first plurality of VTE fans 46. More specifically, for the embodiment depicted, the first plurality of VTE fans 46 further includes a second VTE fan 46-2, a third VTE fan 46-3, and a fourth VTE fan 46-4. Additionally, the aft starboard wing 24 accordingly further includes a second diffusion assembly 126B associated with the second VTE fan 46-2, a third diffusion assembly 126C associate with the third VTE fan 46-3, and a fourth diffusion assembly 126D associated with the fourth VTE fan 46-4. Each of the second, third, and fourth diffusion assemblies 126B, 126C, 126D may be configured in substantially the same manner as exemplary diffusion assembly 126 discussed above with reference to FIGS. 14 through 16. Accordingly, for example, although not shown in FIG. 17 for clarity, the second diffusion assembly 126B may similarly include a first member, a second member, and a third member, with the second member movable generally along the vertical direction V relative to the first member, and the third member movable generally along the vertical direction V relative to the second member. The second diffusion assembly 126B may therefore be movable between a first, retracted position and a second, extended position in substantially the same manner as the diffusion assembly 126 described above with reference to FIGS. 14 through 16. The first member, second member, and third member may together define at least in part a second exhaust flowpath 146B for the second VTE fan 46-2 when the second diffusion assembly 126B is in the second, extended position (see also FIGS. 14 and 15). Notably, when the second diffusion assembly 126B in the retracted position, the first member of the second diffusion assembly 126B may be nested at least partially within the second member of the second diffusion assembly 126B, and the second member of the second diffusion assembly may be nested at least partially within the third member of the second diffusion assembly 126B.

Further, still, it will be appreciated that although the exemplary diffusion assemblies 126 are described and depicted as being included with the aft starboard wing 24, in certain embodiments, one or more of the remaining wings may also include similar diffusion assemblies 126. For example, in other embodiments, each of the aft port wing 26, forward starboard wing 28, and forward port wing 30 may include diffusion assemblies 126 configured in a manner similar to the embodiment described above with reference to FIGS. 14 through 16, such diffusion assemblies 126 being associated with each of the VTE fans of the respective pluralities of VTE fans arranged along a length thereof, or more specifically, integrated therein. However, in other embodiments, less than each of these VTE fans may have such diffusion assemblies 126 associated therewith, or alternatively, may have diffusion assemblies 126 configured in accordance with any other suitable embodiment associated with.

It will further be appreciated, however, that in still other exemplary embodiments, other suitable diffusion assemblies 126 may be included with one or more of the wings of a vertical takeoff and landing aircraft 10.

Figure 18:
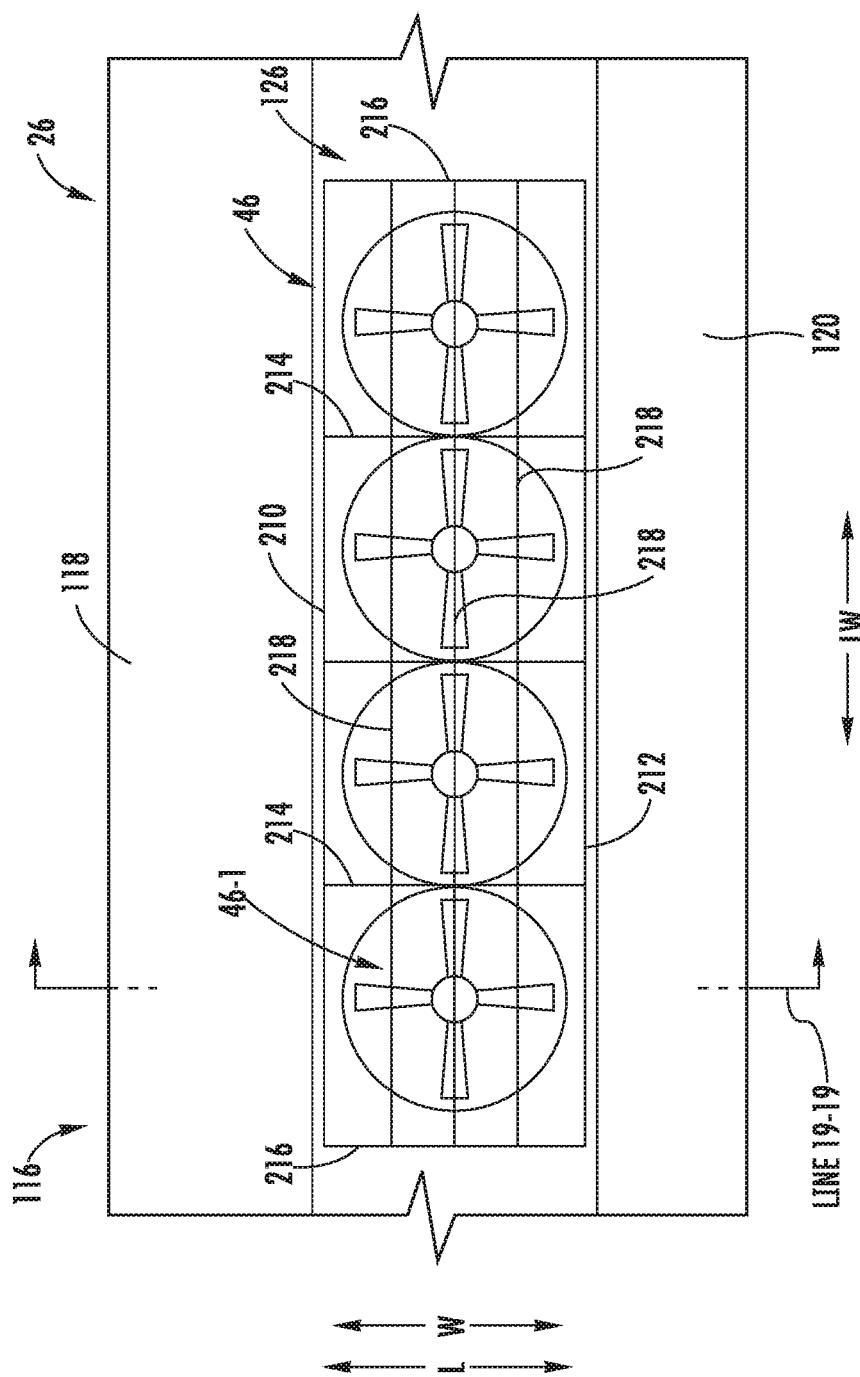
FIG. 18 is a schematic, underside view of a wing of an aircraft having a diffusion assembly in accordance with yet another exemplary embodiment of the present disclosure in a vertical thrust position.
Figure 19:
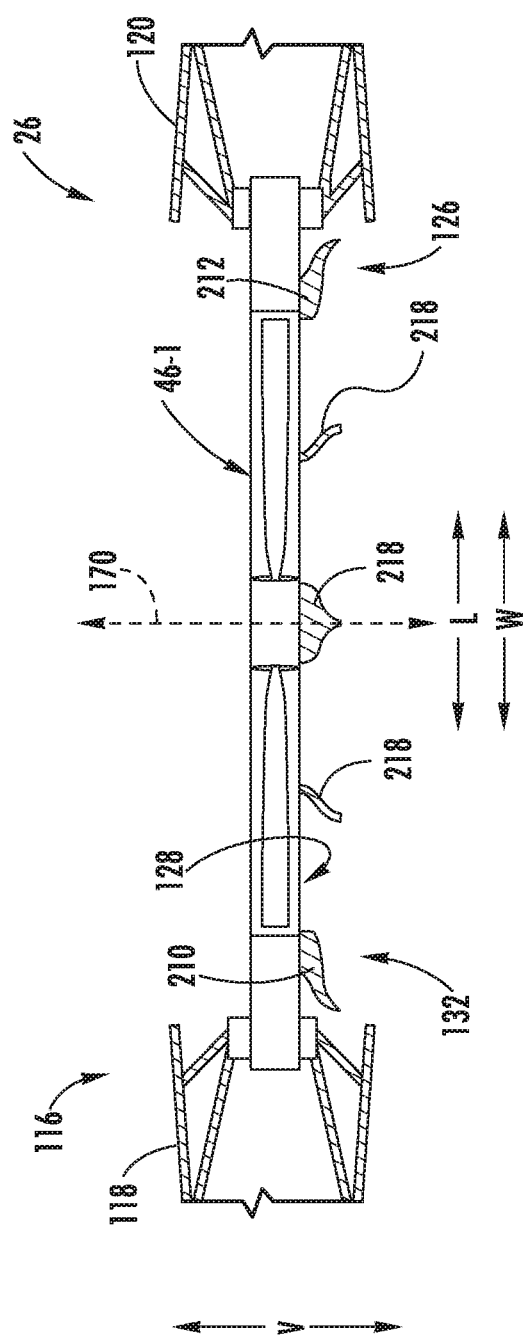
FIG. 19 is a schematic, side, cross-sectional view of the wing of the aircraft having the exemplary diffusion assembly of FIG. 18 in the vertical thrust position.
Figure 20:
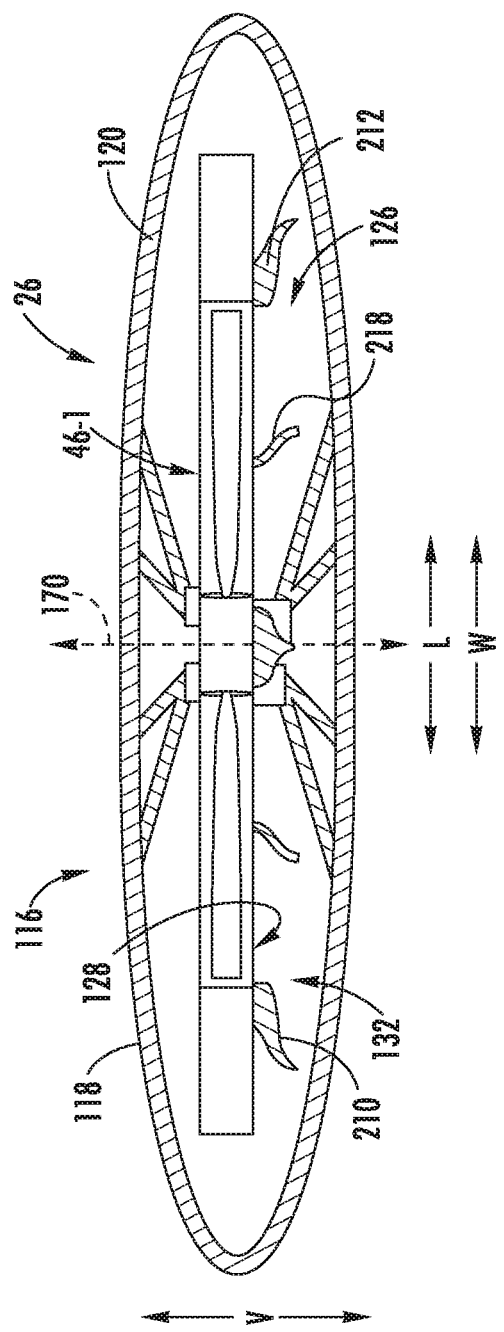
FIG. 20 is a schematic, side, cross-sectional view of the wing of the aircraft having the exemplary diffusion assembly of FIG. 18 in a forward thrust position.

For example, referring now to FIGS. 18 through 20, aspects of an aircraft 10 including a wing having a diffusion assembly 126 in accordance with yet another exemplary embodiment of the present disclosure is provided. In certain exemplary embodiments, the aircraft 10 may be configured in substantially the same manner as the exemplary aircraft 10 described above with reference to FIGS. 1 through 3. Accordingly, the same or similar numbers may refer to the same or similar parts.

For example, referring back briefly to FIGS. 2 and 3, in at least certain embodiments the aircraft 10 generally includes a fuselage 18 and a propulsion system 32 having a power source 36. Moreover, the aircraft 10 includes a plurality of wings extending from, and coupled to, the fuselage 18. For example, the plurality of wings includes a forward starboard wing 28, an aft starboard wing 24, a forward port wing 30, and an aft port wing 26. The propulsion system 32 includes a plurality of VTE fans driven by the power source 36, and more particularly, includes a first plurality of VTE fans 46 arranged along a length 48 of the aft starboard wing 24, a second plurality of VTE fans 52 arranged along a length of the aft port wing 26, a third plurality of VTE fans 54 arranged along a length of the forward starboard wing 28, and a fourth plurality of VTE fans 56 arranged along a length of the forward port wing 30.

Further, each of the wings 24, 26, 28, 30 includes one or more components that are movable to selectively expose at least one VTE fan of the respective pluralities of VTE fans 46, 52, 54, 56. For example, the one or more components of the wings 24, 26, 28, 30 may be components of a variable geometry assembly 116 movable between a forward thrust position and a vertical thrust position to at least partially cover up and at least partially expose the respective pluralities of VTE fans 46, 52, 54, 56 arranged along the lengths thereof, and more specifically integrated therein. Referring now particularly to FIGS. 18 through 20, the variable geometry assembly 116 of the aft starboard wing 24 is depicted in the vertical thrust position in FIGS. 18 and 19, and in the forward thrust position and FIG. 20. More specifically, FIG. 18 provides a schematic, bottom side view of the aft starboard wing 24 in the vertical thrust position; FIG. 19 provides a side, cross-sectional view of the aft starboard wing 24 through a first VTE fan 46-1 of the first plurality of VTE fans 46 along Line 19-19 in FIG. 18, with the variable geometry assembly 116 also in the vertical thrust position; and FIG. 19 provides a side, cross-sectional view of the aft starboard wing 24 through the first VTE fan 46-1, with the variable geometry assembly 116 in the forward thrust position.

However, as with certain of the above exemplary embodiments, for the embodiment depicted, the diffusion assembly 126 is not integrated into the variable geometry assembly 116. More specifically, the diffusion assembly 126 of the aft starboard wing 24 is separate from the variable geometry assembly 116. More specifically still, the exemplary diffusion assembly 126 depicted generally includes a plurality of diffusion members fixed in position at a location downstream of at least the first VTE fan 46-1 of the first plurality of VTE fans 46 in the aft starboard wing 24 for defusing an airflow 130 from the first VTE fan 46-1.

More particularly, as is shown in FIG. 18, for the embodiment depicted, the diffusion assembly 126 is positioned downstream of each of the VTE fans of the first plurality of VTE fans 46 for defusing an airflow 130 from each of the first plurality of VTE fans 46. The plurality of diffusion members generally includes a forward diffusion member 210 extending along a length 48 of the aft starboard wing 24 at a forward edge of each of the first plurality of VTE fans 46, and further includes an aft diffusion member 212 extending along the length 48 of the aft starboard wing 24 at an aft edge of each of the first plurality of VTE fans 46.

Further, as is shown, it will be appreciated that the aft starboard wing 24 further defines a lengthwise direction LW and a widthwise direction W perpendicular to the lengthwise direction LW. In addition to the forward and aft diffusion members 210, 212, the diffusion assembly 126 depicted further includes separation diffusion members 214 extending generally along the widthwise direction W between each of the adjacent VTE fans of the first plurality of VTE fans 46. Further, for the embodiment depicted, the separation diffusion members 214 extend generally from the forward diffusion member 210 to the aft diffusion member 212. Similarly, the diffusion assembly 126 includes end diffusion members 216 extending between the forward diffusion member 210 and the aft diffusion member 212 at an inner end of the first plurality of VTE fans 46 and at an outer end of the first plurality of VTE fans 46 (i.e., inner end and outer end relative to the fuselage 18 of the aircraft 10). Notably, the separation diffusion members 214 and end diffusion members 216 may assist with providing the desired diffusion of the airflow 130 through the first plurality of VTE fans 46, and further may provide for a separation of the airflow 130 from each of the first plurality of VTE fans 46, such that the first plurality of VTE fans 46 may still provide a desired amount of vertical thrust in the event of a failure of one of such first plurality of VTE fans 46. Additionally, or alternatively, such a configuration may allow for the operation of less than all of the first plurality of VTE fans 46 during, e.g., transitional flight periods.

Notably, in addition to the forward diffusion member 210 and aft diffusion member 212, it will be appreciated that the exemplary diffusion assembly 126 further includes a plurality of interior diffusion members 218 extending generally along the lengthwise direction LW of the aft starboard wing 24 and spaced from one another, the forward diffusion member 210, and the aft diffusion member 212 along the widthwise direction W of the aft starboard wing 24. More specifically, for the embodiment shown, the diffusion assembly 126 includes three interior diffusion members 218. However, in other embodiments, the diffusion assembly 126 may instead include any other suitable number of interior diffusion members 218 for providing a desired amount of diffusion of the airflow 130 through the first plurality of VTE fans 46.

Figure 21:
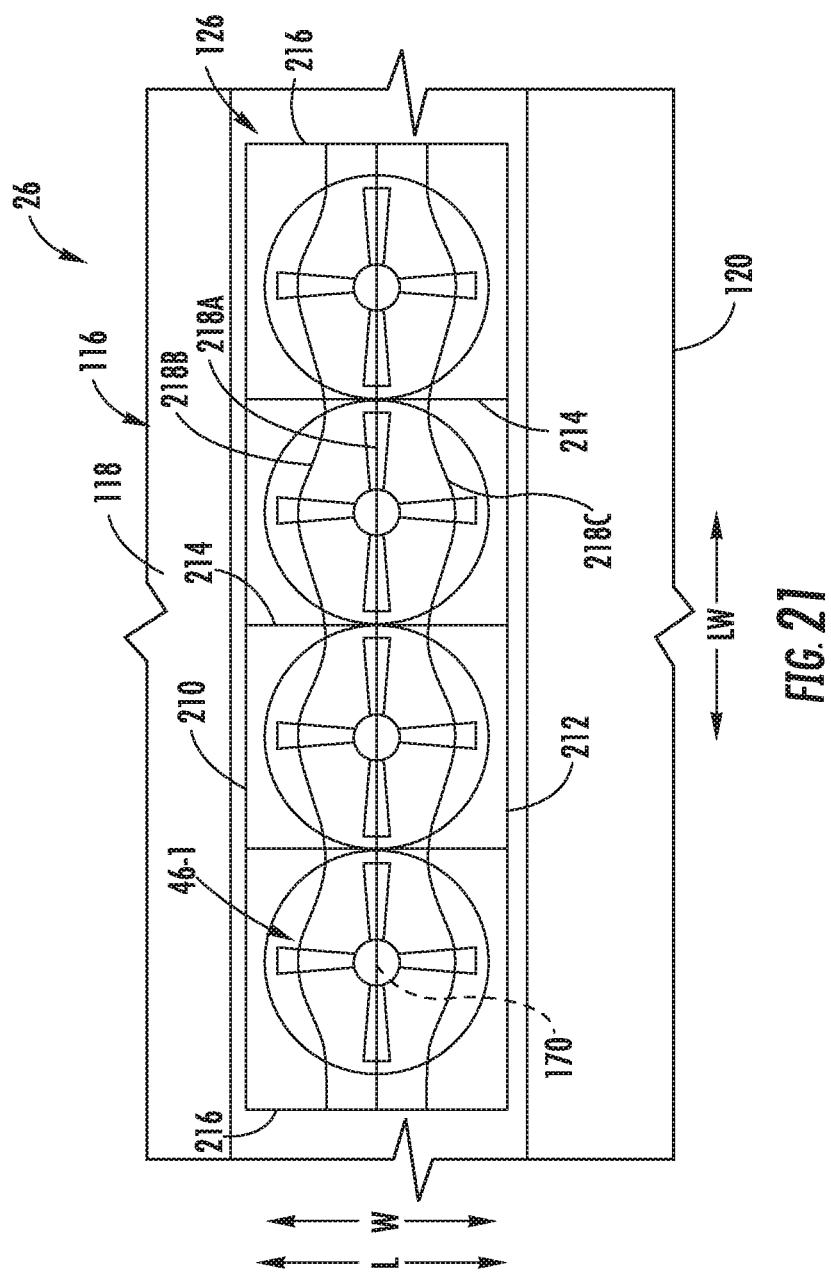
FIG. 21 is a schematic, underside view of a wing of an aircraft having a diffusion assembly in accordance with still another exemplary embodiment of the present disclosure.

Additionally, it will be appreciated that in other exemplary embodiments, one or more of the diffusion members may define any other suitable shape along the lengthwise direction LW of the aft starboard wing 24. For example, although the plurality of interior diffusion members 218 extend generally linearly along the lengthwise direction LW of the aft starboard wing 24, in other embodiments, one or more these interior diffusion members 218, or other diffusion members, may extend in any other shape or direction. For example, referring briefly to FIG. 21, providing a schematic, underside view of an aft starboard wing 24 including a diffusion assembly 126 in accordance with another exemplary embodiment of the present disclosure, it will be appreciated that in other embodiments, one or more of the interior diffusion members 218 may define a curved shape relative to the longitudinal direction L. More specifically, for the embodiment of FIG. 21, the interior diffusion members 218 generally include a central diffusion member 218A extending approximately through the axes of each of the first plurality of VTE fans 46 (including the axis 170 of the first VTE fan 46-1). The interior diffusion members 218 additionally include an interior diffusion member 218B positioned between the central diffusion member 218A and the forward diffusion member 210, as well as an interior diffusion member 218C positioned between the central diffusion member 218A and the aft diffusion member 212. For the embodiment depicted, the interior diffusion member 218B between the forward diffusion member 210 and the central diffusion member 218A defines a curved shape that is convex relative to the axis of each of the first plurality of VTE fans 46 (including the axis 170 of the first VTE fan 46-1), and similarly, the interior diffusion member 218C between the aft diffusion member 212 and the central diffusion member 218A defines a curved shape that is convex relative to the axis of each of the first plurality of VTE fans 46 (including the axis 170 of the first VTE fan 46-1). Notably, however, in other embodiments, any other suitable configuration may be provided.

Figure 22:
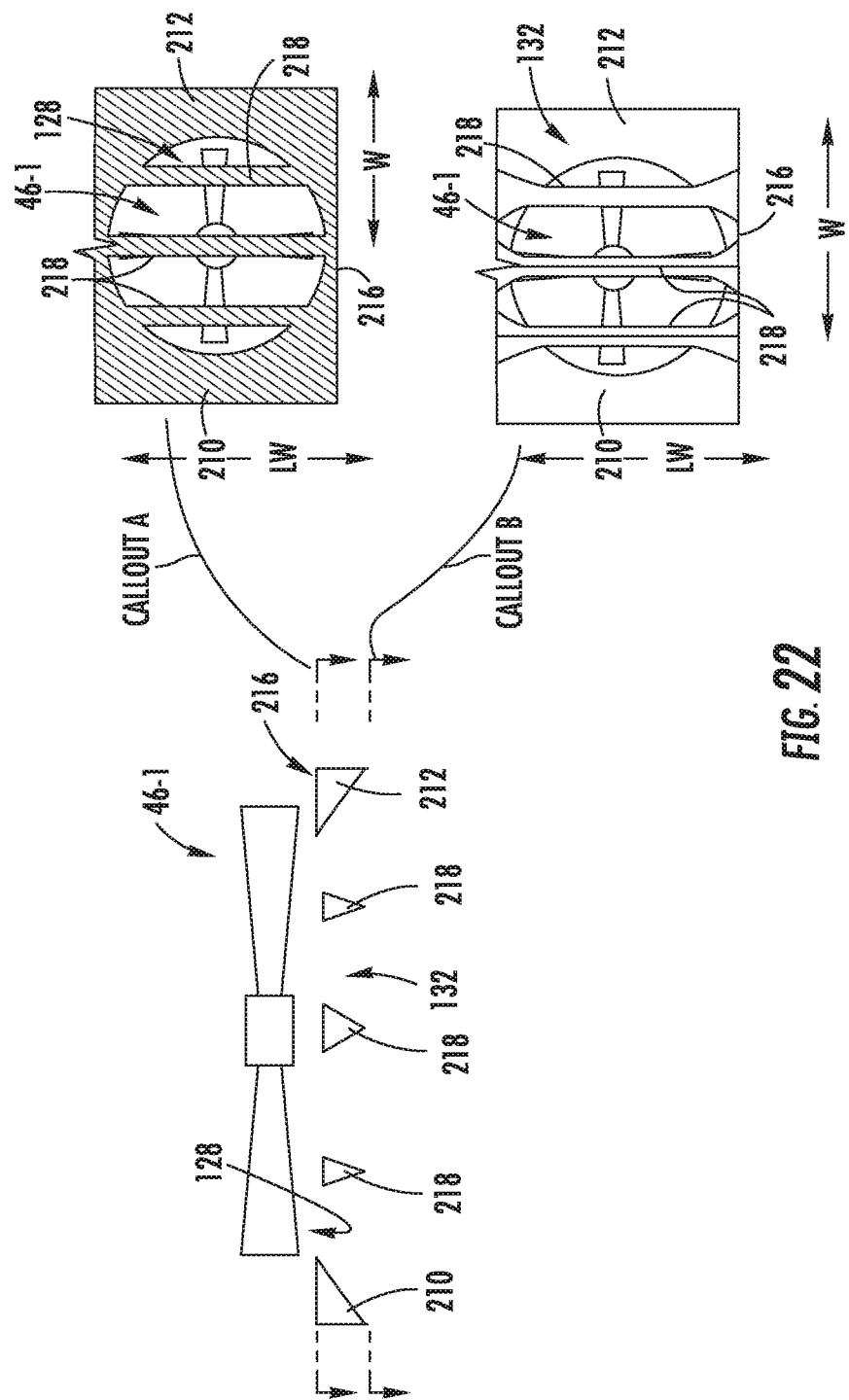
FIG. 22 is a schematic view of the exemplary diffusion assembly of FIG. 18.

Referring now to FIG. 22, a simplified, schematic view is provided of the exemplary diffusion assembly 126 described above with reference to FIGS. 18 through 20. More specifically, FIG. 22 is a simplified, schematic, cross-sectional view of a first VTE fan 46-1 of the first plurality of VTE fans 46 including the exemplary diffusion assembly 126 described above. As is depicted, the diffusion assembly 126 generally defines an inlet 128 and an outlet 132. The inlet 128 is more specifically shown in the Callout A and the outlet 132 is more specifically shown in the Callout B. The inlet 128 is located immediately downstream of the first VTE fan 46-1 of the first plurality of VTE fans 46 and defines a substantially circular cross-sectional shape (the cross-section taken in a plane perpendicular to the axis 170). Further, the inlet 128 corresponds substantially in size with the first VTE fan 46-1 of the first plurality of VTE fans 46. More specifically, the first VTE fan 46-1 defines a fan diameter 186, and the inlet 128 defines an inlet diameter 220 substantially equal to the fan diameter 186. By contrast, the outlet 132 is larger than inlet 128 and defines a substantially rectangular shape (e.g., a substantially square shape). Additionally, the outlet 132 defines a minimum cross measurement 222, the minimum cross measurement 222 being greater than the fan diameter 186.

Notably, it will be appreciated that the diffusion assembly 126 may further define a plurality of inlets 128 located immediately downstream of each of the first plurality of VTE fans 46, and further may define a plurality of outlets 132 located downstream of the respective plurality of inlets 128. For example, referring back briefly to FIG. 18, the inlet 128 shown in FIG. 22 may be a first inlet 128A, and the diffusion assembly 126 may further define a second inlet 128B immediately downstream of a second VTE fan 46-2, a third inlet 128C immediately downstream of a third VTE fan 46-3, and a fourth inlet 128D immediately downstream of a fourth VTE fan 46-4. Additionally, the outlet 132 may be a first outlet 132A, and the diffusion assembly 126 may further include a second outlet 132B downstream of the second inlet 128B, a third outlet 132C downstream of the third inlet 128C, and a fourth outlet 132D downstream of the fourth inlet 128D. Each of the second inlet 128B, third inlet 128C, and fourth inlet 128D may be configured in substantially the same manner as the inlet 128 depicted in FIG. 22, and each of the second outlet 132B, third outlet 132C, and fourth outlet 132D may be configured in substantially the same manner as the outlet 132 depicted in FIG. 22. Each of the adjacent outlets 132 may be separated by a separation diffusion member 214 (see FIG. 18).

Moreover, it will be appreciated that with the inclusion of the plurality of diffusion members of the diffusion assembly 126—including the forward and aft diffusion members 210, 212, the interior diffusion members 218, the separation diffusion members 214, and the end diffusion members 216—the diffusion assembly 126, or rather, each of the plurality of diffusion members 210, 212, 214, 216, 218 of the diffusion assembly 126, may define a relatively small maximum height 223 along the vertical direction V. Notably, as used herein, the term "maximum height along the vertical direction V" refers to a maximum measurement along the vertical direction V of any of the diffusion members from the inlet 128 of the diffusion assembly 126 to the outlet 132 of the diffusion assembly 126.

More particularly, it will be appreciated that in order to provide the desired amount of diffusion, further discussed below, a minimum amount of surface area of the various diffusion members to which the airflow 130 from the first plurality of VTE fans 46 is exposed is required. Including the multiple diffusion members may allow for each of these diffusion members to assist with the diffusion and contribute to the total amount of surface area required for such diffusion, without requiring relatively long members along the vertical direction V. Accordingly, such may provide for a relatively low profile for the diffusion assembly 126. For example, in certain exemplary embodiments, the maximum height 223 of the plurality of diffusion members may be less than about thirty percent (30%) of the fan diameter 186, such as less than about twenty-five percent (25%) of the fan diameter 186, such as less than about twenty percent (20%) of the fan diameter 186. Notably, for the embodiment depicted, each of the diffusion members is substantially the same height 223 along the vertical direction V.

In such a manner, it will be appreciated that the diffusion members are not extended or retracted when the variable geometry assembly 116 is moved between the vertical thrust position and the forward thrust position, providing for relatively simple wing assembly. For example, in such a manner, when the variable geometry assembly 116 is in the vertical thrust position, the variable geometry assembly 116 substantially completely covers the plurality of diffusion members of the diffusion assembly 126 in addition to the first plurality of VTE fans 46.

Moreover, from the Figs. and description above, it will be appreciated that the exemplary diffusion assembly 126 generally defines a diffusion area ratio. The diffusion area ratio refers to a ratio of a cross-sectional area of the outlet 132 (see Callout B of FIG. 22) to a cross-sectional area of the inlet 128 (see Callout A of FIG. 22). For the embodiments described above with reference to FIG. 18 through 21, wherein the diffusion assembly 126 includes a plurality of inlets 128 and a plurality of outlets 132, the diffusion area ratio more specifically refers to a ratio of a cumulative cross-sectional area of the outlets 132 to a cumulative cross-sectional area of the inlets 128.

Referring now generally to the various embodiments of the diffusion assembly described herein (e.g., with reference to FIG. 9; FIGS. 10 through 13; FIGS. 14 through 17; and FIG. 18 through 22), it will be appreciated that inclusion of a diffusion assembly defining diffusion area ratio as described herein may result in more efficient VTE fans. More specifically, for the embodiments described herein, the diffusion area ratio is greater than 1:1. For example, the diffusion area ratio may be greater than 1.15:1, such as greater than about 1.25:1. Further, in certain exemplary embodiments, the diffusion area ratio may be less than about 2:1. For example, the diffusion area ratio may be less than about 1.85:1, such as less than about 1.75:1. (Notably, however, in other embodiments, the diffusion assembly may define other diffusion area ratios less than 1:1, or greater than 2:1.)

Moreover, it will be appreciated that inclusion of a diffusion assembly may result in a first VTE fan 46-1 of a first plurality of VTE fans 46 defining a relatively high power loading during vertical thrust operations. Power loading, as used herein, refers to a measure of an amount of thrust produced per unit of power applied. More specifically, by utilizing an electric fan as the VTE fan to generate thrust along a vertical direction V during vertical thrust operations of the aircraft 10, and including a diffusion assembly 126 for defusing an airflow 130 from the VTE fan(s) in the manner described herein, the first VTE fan 46-1 of the first plurality VTE fans 46 may define a power loading during such vertical thrust operations greater than about three pounds per horsepower and up to, or rather less than, about fifteen pounds per horsepower. For example, in certain exemplary embodiments, the first VTE fan 46-1 may define a power loading during vertical thrust operations greater than about four pounds per horsepower and less than about ten pounds per horsepower. More specifically, still, the aircraft 10 may be designed for certain flight operations requiring a certain amount of vertical thrust. For example, in certain embodiments, the diffusion assembly 126 and propulsion system 32 may be designed such that the first VTE fan 46-1 of the first plurality of VTE fans 46 defines a power loading between about six pounds per horsepower and about nine pounds per horsepower, or alternatively, may be designed such that the first VTE fan 46-1 of the first plurality of VTE fans 46 defines a power loading between about for pounds per horsepower and about seven pounds per horsepower.

Moreover, it should be appreciated that in certain exemplary embodiments, each of the first plurality of VTE fans 46 may define such a power loading during vertical thrust operations, and further that each of the other VTE fans of the propulsion system may also define such a power loading during vertical thrust operations.

Inclusion of VTE fans defining such a power loading may allow for the inclusion of relatively small diameter VTE fans arranged along a length 48 of the aft starboard wing 24, as well as arranged along the lengths of the other wings. In such a manner, each of the wings may define a relatively high aspect ratio, which may provide for relatively efficient forward flight. More specifically, for the embodiments described herein, such as the exemplary embodiment depicted in FIGS. 1 through 3, the aft starboard wing 24 defines an aspect ratio greater than about 3:1, such as between about 3:1 and about 6.5:1. More specifically, for the embodiment depicted, the aft starboard wing 24 may define an aspect ratio between about 4:1 and about 5.5:1. The aft port wing 26 may define aspect ratio substantially equal to the aspect ratio of the aft starboard wing 24. Further, the forward wings, i.e., the forward port wing 30 and forward starboard wing 28 of the aircraft 10, may define a lower aspect ratio than the aft wings, but still a relatively high aspect ratio. For example, the forward starboard wing 28 and forward port wing 30 each define an aspect ratio between about 1.5:1 and about 5:1, such as between about 1.75:1 and about 3:1.

It will be appreciated, that as used herein, the term "aspect ratio," with reference to one or more of the wings 24, 26, 28, 30, generally refers to a ratio of the wing's span to its mean chord.

In sum, it will be appreciated that in various embodiments of the present disclosure, an aircraft 10 is provided having a wing extending from a fuselage 18 and a propulsion system 32 having a plurality of VTE fans arranged along the wing. The wing may include one or more components being movable to selectively expose at least one VTE fan of the plurality of VTE fans. For example, the one or more components may be components of a variable geometry assembly 116, which may include, e.g., a forward partial wing assembly 118 and an aft partial wing assembly 120 movable to selectively expose the plurality of VTE fans arranged along the length 48 of the wing. The wing may further include a diffusion assembly 126 positioned downstream of the at least one VTE fan of the plurality of VTE fans and defining a diffusion area ratio greater than 1:1 and less than about 2:1. Such a diffusion area ratio may be defined by the diffusion assembly 126 regardless of a particular structure forming the diffusion assembly 126. For example, the diffusion assembly 126 may be a fixed diffusion assembly 126, such as the embodiment described above with reference to FIGS. 18 through 22, or alternatively, the diffusion assembly 126 may include one or more movable components movable to an extended position to define the diffusion area ratio, such as in the embodiments described above with reference to FIGS. 9; 10 through 13; and 14 through 17. Moreover, in still other exemplary embodiments, diffusion assembly 126 may be associated with a single one of the VTE fans of the first plurality of VTE fans 46, and a wing may further include a plurality of diffusion assemblies, with each of the respective plurality of diffusion assemblies associated with one of the VTE fans of the first plurality of VTE fans 46, such as the embodiment described above with reference to FIGS. 14 through 17. Additionally, or alternatively, the diffusion assembly 126 may be positioned downstream of two or more of the VTE fans of the first plurality of VTE fans 46, such as downstream of each of the first plurality of VTE fans 46, such as with the exemplary embodiments described above with reference to FIGS. 9, 10 through 13, and 18 through 22. With such an exemplary embodiment, the diffusion area ratio may be defined relative to each of the plurality of VTE fans (i.e., a ratio of the cumulative outlet cross-sectional area to the cumulative inlet cross-sectional area).

It will be appreciated, that in other exemplary embodiments, the aircraft 10 and propulsion system 32 may have any other suitable configuration. For example, referring now briefly to FIG. 23, an aircraft 10 including a propulsion system 32 in accordance with another exemplary embodiment of the present disclosure is provided. The exemplary aircraft 10 and propulsion system 32 of FIG. 23 may be configured in substantially the same manner as one or more of the exemplary aircraft 10 and propulsion systems 32 described above with reference to FIGS. 1 through 22. For example, the aircraft 10 generally includes a fuselage 18 and one or more wings, and defines a forward end 20, an aft end 22, a port side 14, and a starboard side 16. Further, the exemplary propulsion system 32 generally includes a power source 36 and a plurality of vertical thrust electric fans ("VTE fans") driven by the power source 36. As with the embodiments above, each of the plurality of VTE fans is electrically coupled to the power source 36 to receive electrical power from, e.g., an electric machine 42 or an electric energy storage unit 44 of the power source 36.

However, for the embodiment depicted, the aircraft 10 does not include four wings arranged in a canard configuration (compare, e.g., FIG. 1), and instead includes two wings—i.e., a first wing 24 extending from the fuselage 18 of the aircraft 10 on the starboard side 16 of the aircraft 10 and a second wing 26 extending from the fuselage 18 of the aircraft 10 on the port side 14 of the aircraft 10. Notably, however, in still other exemplary embodiments, the aircraft 10 may have still other suitable configurations. For example, in still other exemplary embodiments, the aircraft 10 may have a blended-wing configuration.

Figure 23:
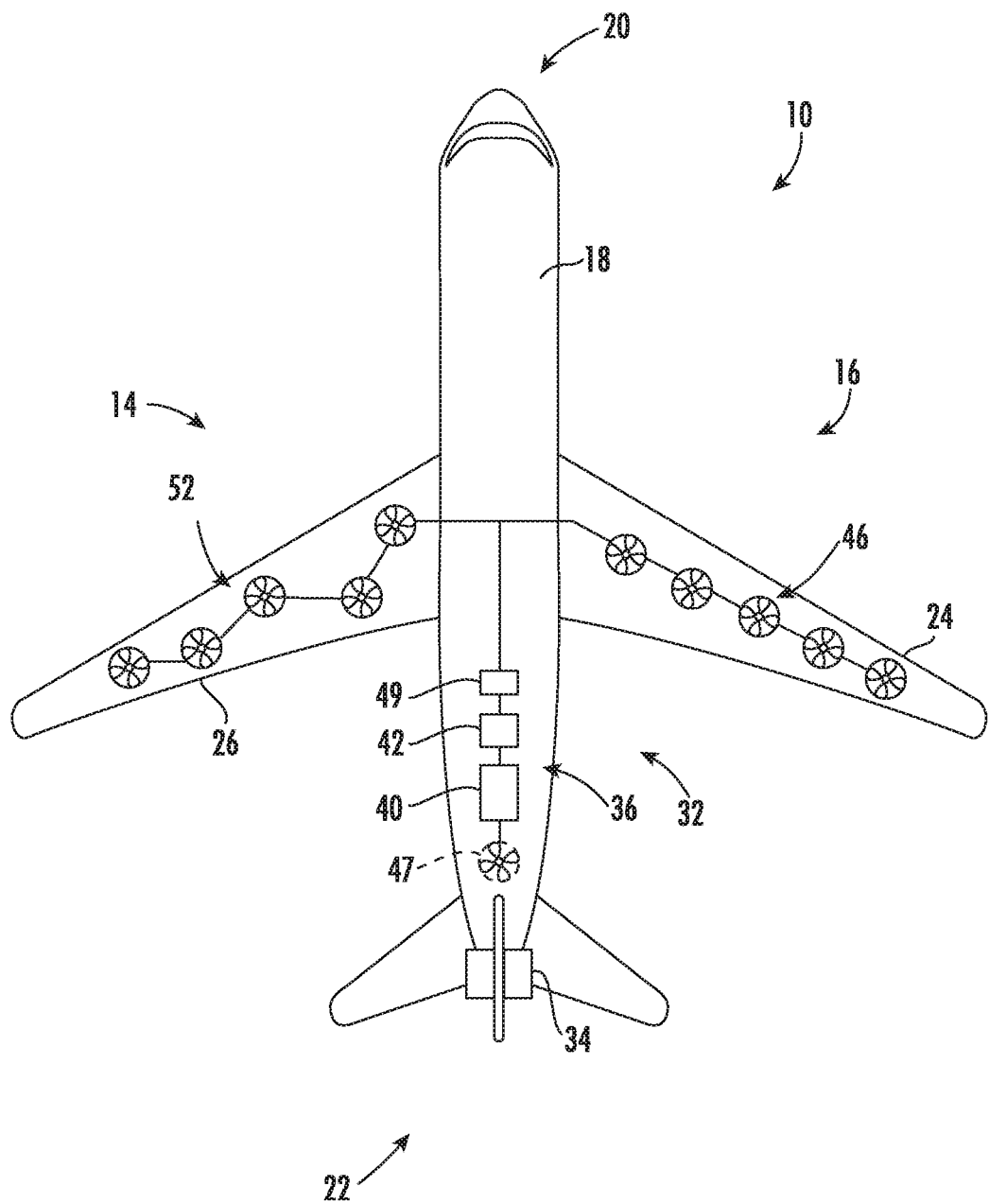
FIG. 23 is a top, schematic view of an aircraft in accordance with another exemplary embodiment of the present disclosure.

Referring still to FIG. 23, for the embodiment depicted the exemplary propulsion system 32 further varies from the embodiments of FIGS. 1 through 23. For example, the exemplary propulsion system 32 includes a first plurality of VTE fans 46 arranged generally along a length of the first wing 24 and a second plurality of VTE fans arranged generally along a length of the second wing 26. However, given that the exemplary aircraft 10 of FIG. 23 only includes two wings, the propulsion system 32 does not include a third or fourth plurality of VTE fans (cf., e.g., FIG. 2).

Further, as will be appreciated, the pluralities of VTE fans 46, 52 may be arranged in any suitable manner along the lengths of the respective first and second wings 24, 26. Specifically for the embodiment show, the first plurality of VTE fans 46 are arranged in a substantially linear manner along the length of the first wing 24. By contrast, however, the second plurality of VTE fans 52 are arranged in a staggered manner along the length of the second wing 26. Although the first and second pluralities of VTE fans 46, 52 are arranged in different manners for the embodiment shown, such is simply for explanatory purposes. In other embodiments, the first and second pluralities of VTE fans 46, 52 may each be arranged in a linear manner or in a staggered manner along the lengths of the wings 24, 26, or further in any other suitable manner (such as a hybrid linear-staggered configuration).

Additionally, although not depicted in FIG. 23, in certain exemplary embodiments, the wings 24, 26 may include any suitable variable geometry assembly or assemblies for exposing and/or covering one or more of the VTE fans 46, 52 during operation, such as during vertical flight operations or forward flight operations, as well as any suitable diffusion assembly or assemblies. For example, in certain embodiments, the wings 24, 26 may include one or more of the exemplary variable geometry assemblies and/or diffusion assemblies described above with reference to FIGS. 2 through 22.

Further, the exemplary propulsion system 32 depicted includes, a forward thrust propulsor 34 for generating forward (and optionally reverse) thrust during certain operations. For the embodiment depicted, the forward thrust propulsor 34 is mounted to the fuselage 18 of the aircraft 10 at the aft end 22 of the aircraft 10, and more specifically the forward thrust propulsor 34 is configured as a boundary layer ingestion fan for the embodiment shown. In such a manner, the forward thrust propulsor 34 may be configured in a similar manner as the forward thrust propulsor 34 described above with reference to FIGS. 2 through 4. However, in other embodiments, any other suitable forward thrust propulsor (or propulsors) 34 may be provided, such as one or more under-wing, fuselage, or stabilizer mounted forward thrust propulsors, such as one or more turbofan, turboprop, or turbojet engines.

Additionally, as is depicted in phantom, in certain exemplary embodiments, the propulsion system 32 may further include one or more VTE fans 47 positioned elsewhere in the aircraft 10, such as in the fuselage 18 proximate the aft end 22 of the aircraft 10 as is depicted in phantom in the embodiment of FIG. 23. In such a manner, such VTE fan(s) 47 may additionally be in electrical communication with the power source 36 such that the power source 36 may drive the fuselage-embedded VTE fan(s) 47.

In other embodiments, however, still other configurations may be provided.

Figure 24:
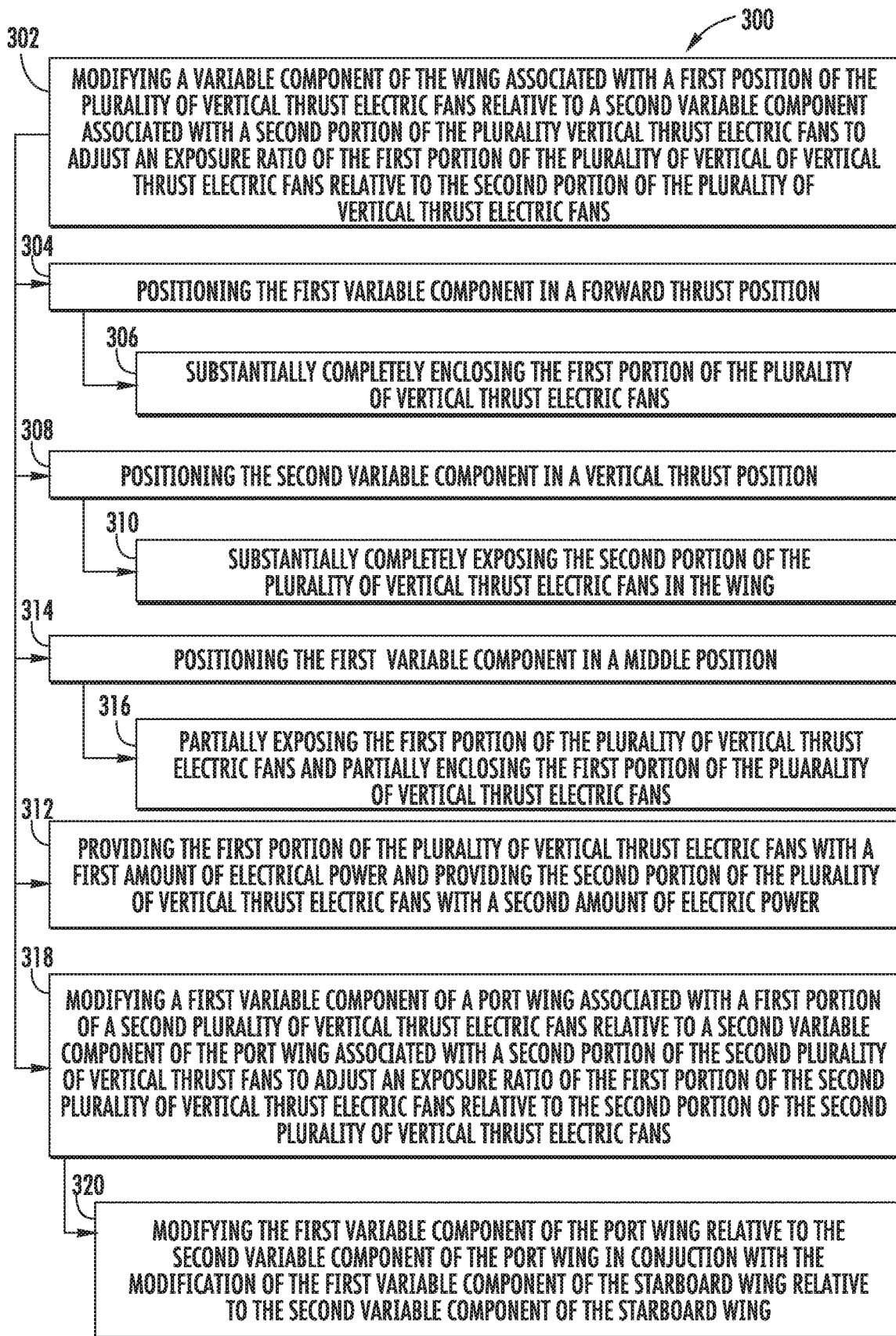
FIG. 24 is a flow diagram of a method for operating an aircraft in accordance with an exemplary aspect of the present disclosure.

Referring now to FIG. 24, a flow diagram is provided of a method 300 for operating a vertical takeoff and landing aircraft in accordance with an exemplary aspect of the present disclosure. In certain exemplary aspects, the method 300 may be configured for operating one or more of the exemplary aircraft described above with reference to FIGS. 1 through 23. Accordingly, in certain exemplary aspects, the aircraft operated by the method 300 may include a fuselage, a wing extending from the fuselage, and a propulsion system, the propulsion system, in turn, having a plurality of vertical thrust electric fans arranged along the wing.

As is depicted, the exemplary method 300 includes at (302) modifying a variable component of the wing associated with a first portion of the plurality of vertical thrust electric fans relative to a second variable component associated with a second portion of the plurality of vertical thrust electric fans to adjust an exposure ratio of the first portion of the plurality of vertical thrust electric fans relative to the second portion of the plurality of vertical thrust electric fans. In at least certain exemplary aspects, the first portion of vertical thrust electric fans may be one or more inner vertical thrust electric fans and the second portion of vertical thrust electric fans may be one or more outer vertical thrust electric fans (i.e., inner and outer relative to the fuselage). For example, when the plurality of vertical thrust electric fans arranged along the wing includes four vertical thrust electric fans, the first portion of vertical thrust electric fans may be a first and second vertical thrust electric fan and the second portion of vertical thrust electric fans may be a third and fourth vertical thrust electric fan.

More specifically, for the exemplary aspect depicted, modifying the first variable component relative to the second variable component at (302) includes at (304) positioning the first variable component in a forward thrust position. More specifically, still, positioning the first variable component in the forward thrust position at (304) includes at (306) substantially completely enclosing the first portion of the plurality of vertical thrust electric fans.

In addition, for the exemplary aspect depicted, modifying the first variable component relative to the second variable component at (302) further includes at (308) positioning the second variable component in a vertical thrust position. More specifically, for the exemplary aspect depicted, positioning the second variable component in the vertical thrust position at (308) includes at (310) substantially completely exposing the second portion of the plurality of vertical thrust electric fans in the wing. (Notably, such a configuration may be similar to the configuration discussed above with reference to FIG. 8.)

Accordingly, it will be appreciated that in certain exemplary aspects, the first variable component and second variable component may each be configured as part of a variable geometry assembly, such as one or more the exemplary variable geometry assemblies 116 described above. More specifically, in certain exemplary aspects, the first variable component of the wing may be a first partial wing assembly of a variable geometry assembly and the second variable component of the wing may be a second partial wing assembly of the variable geometry assembly. For example, in certain exemplary embodiments, the first variable component may be a first, forward partial wing assembly of a variable geometry assembly and the second variable component may be a second, forward partial wing assembly of the variable geometry assembly. With such an exemplary aspect, the first variable component/first, forward partial wing assembly may be spaced (e.g., sequentially) from the second variable component/second, forward partial wing assembly along a length of the wing (similar to the first and second forward partial wing assemblies 118A, 118B of FIGS. 7 and 8). However, in other exemplary aspects, the first and second variable component may be configured in any other suitable manner for at least partially exposing and at least partially covering up one or more of the first plurality of vertical thrust electric fans.

Notably, it will be appreciated that as used herein, the term "exposure ratio" refers to a relative exposure of the first portion of the plurality of vertical thrust electric fans relative to the second portion of the of vertical thrust electric fans. For example, the exposure ratio may refer to a comparison of a total area of the first portion of vertical thrust electric fans which are not covered up by any portion of the wing (i.e., exposed) to a total area of the second portion of vertical thrust electric fans which are not covered by any portion of the wing (i.e., exposed).

Referring still to FIG. 24, the method 300 further includes at (312) providing the first portion of the plurality of vertical thrust electric fans with a first amount of electrical power and providing the second portion of the plurality of vertical thrust electric fans with a second amount of electrical power. Given that for the exemplary aspect depicted, the first variable component is in a forward thrust position and the second variable component is a vertical thrust position, the first amount of electrical power may be less than the second amount of electrical power. For example, the first amount of electrical power may be substantially equal to zero.

By modifying an exposure ratio of the first portion of the plurality of vertical thrust electric fans relative to the second portion of the plurality of vertical thrust electric fans, the method 300 may provide increased control for the aircraft during vertical thrust operations. For example, modifying an exposure ratio of the first portion of the plurality of vertical thrust electric fans relative to the second portion of the plurality of vertical thrust electric fans may allow for the method 300 to provide an intermediate amount of vertical thrust during transitional operating conditions, such as transitioning from forward flight to vertical flight (e.g., during landings), transitioning from vertical flight to forward flight (e.g., during takeoffs), etc. Accordingly, it will be appreciated that such intermediate amount of vertical thrust may be provided by operating one portion of the vertical thrust electric fans at a relatively high power, and operating another portion of the vertical thrust electric fans at zero, or substantially zero, power (as compared to operating all vertical thrust electric fans at, e.g., half power), which may result in an overall more efficient operation as the vertical thrust electric fans may generally operate most efficiently closer to full power.

Moreover, as is shown in phantom in FIG. 24, in certain exemplary aspects, modifying the first variable component relative to the second variable component at (302) may further include at (314) positioning the first variable component and a middle position. Positioning the first variable component in the middle position at (314) may, in turn, include at (316) partially exposing the first portion of the plurality of vertical thrust electric fans and partially enclosing the first portion of the plurality of vertical thrust electric fans. It will be appreciated that in at least certain exemplary aspects, positioning the first variable component in the middle position at (314) may also allow for the method 300 provide an intermediate amount of vertical thrust for the aircraft using the first portion of the plurality of vertical thrust electric fans during transitional operating conditions.

Furthermore, referring still to the exemplary aspect of the method 300 depicted in FIG. 24, it will be appreciated that in at least certain exemplary aspects, the wing may be a starboard wing, and the plurality of vertical thrust electric fans may be a first plurality of vertical thrust electric fans of the propulsion system. With such an exemplary aspect, the aircraft may further include a port wing also extending from the fuselage and the propulsion system may further include a second plurality of vertical thrust electric fans arranged along the port wing. With such an exemplary aspect, as is also depicted in phantom in FIG. 24, the method 300 may further include at (318) modifying a first variable component of the port wing associated with a first portion of the second plurality of vertical thrust electric fans relative to a second variable component of the port wing associated with the second portion of the second plurality of vertical thrust electric fans to adjust an exposure ratio of the first portion of the second plurality of vertical thrust electric fans relative to the second portion of the second plurality of vertical thrust electric fans.

In certain exemplary aspects, modifying the first variable component of the port wing relative to the second variable component of the port wing at (318) may further include at (320) modifying the first variable component of the port wing relative to the second variable component of the port wing in conjunction with the modification of the first variable component of the starboard wing relative to the second variable component of the starboard wing at (302). For example, the method 300 may coordinate these modifications such that the exposure ratio of the first and second portions of the first plurality vertical thrust electric fans is substantially equal to the exposure ratio of the first and second portions of the second plurality of vertical thrust electric fans. Alternatively, the method 300 may coordinate these modifications such that the exposure ratio of the first and second portions of the first plurality of vertical thrust electric fans is higher than or lower than the exposure ratio of the first and second portions of the second plurality vertical thrust electric fans in order to effectuate a maneuver of the aircraft (e.g., to bank towards a starboard side of the aircraft, or alternatively, to bank towards a port side of the aircraft).

Further, it will be appreciated that in at least certain exemplary embodiments, the aircraft may include more than two wings with VTE fans attached thereto or integrated therein. For example, in at least certain exemplary aspects, the starboard wing may be an aft starboard wing and the port wing may be an aft port wing. With such an exemplary aspect, the aircraft may further include a forward starboard wing and a forward port wing, each also extending from the fuselage at locations forward of the aft starboard wing and aft port wing. Further, with such a configuration, the propulsion system may further include a third plurality of vertical thrust electric fans (or at least one vertical thrust electric fan) arranged along the forward starboard wing, and a fourth plurality of vertical thrust electric fans (or at least one vertical thrust electric fan) arranged along the forward port wing. The forward port and starboard wings may include variable geometry components similar to the aft port and starboard wings. In such a manner, the method 300 may further include modifying a first variable geometry component of a forward wing (e.g., forward port or starboard wing) relative to a second variable geometry component of the respective forward wing to adjust an exposure ratio of a first portion of the respective plurality of vertical thrust electric fans relative to a second portion of the respective plurality of vertical thrust electric fans. Further, such a modification of the variable geometry components of the forward port or starboard wing may be in conjunction with a modification of the variable geometry components of the aft port or starboard wing (similar to the modifications made at (320) between the port and starboard aft wings). Such may facilitate further maneuvering of the aircraft (e.g., nose up/pulling back, nose down/diving, etc.).

Figure 25:
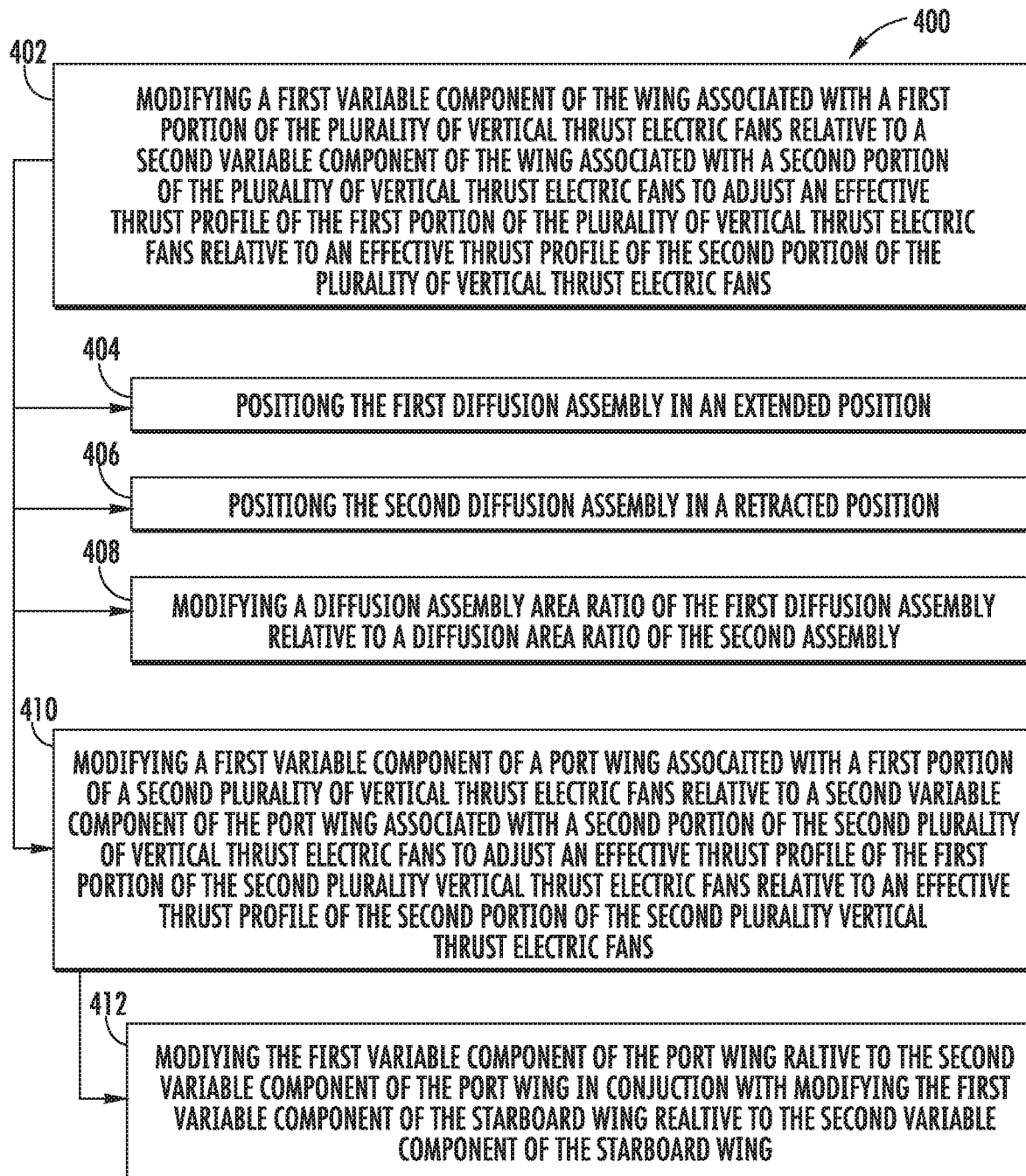
FIG. 25 is a flow diagram of a method for operating an aircraft in accordance with another exemplary aspect of the present disclosure.

Moreover, referring now to FIG. 25, a flow diagram of a method 400 of operating a vertical takeoff and landing aircraft in accordance with another exemplary aspect of the present disclosure is provided. In certain exemplary aspects, the method 400 may also be configured for operating one or more of the exemplary aircraft described above with reference to FIGS. 1 through 23. Accordingly, in certain exemplary aspects, the aircraft operated by the method 400 may include a fuselage, a wing extending from the fuselage, and a propulsion system, the propulsion system, in turn, having a plurality of vertical thrust electric fans arranged along the wing.

As is depicted, the exemplary method 400 includes at (402) modifying a first variable component of the wing associated with a first portion of the plurality of vertical thrust electric fans relative to a second variable component of the wing associated with a second portion of the plurality of vertical thrust electric fans to adjust an effective thrust profile of the first portion of the plurality of vertical thrust electric fans relative to an effective thrust profile of the second portion of the plurality of vertical thrust electric fans. It will be appreciated, that as used herein, the term "thrust profile" generally refers to an amount of thrust being generated by a given portion of vertical thrust electric fans in a given direction (e.g., along a vertical direction of the aircraft).

In certain exemplary aspects, modifying the first variable component of the wing relative to the second variable component of the wing at (402) may include modifying a variable geometry assembly in a manner to adjust an exposure ratio of the first portion of the plurality vertical thrust electric fans relative to the second portion of the plurality of vertical thrust electric fans (see, e.g., the exemplary method 300 described above with reference to FIG. 24).

However, for the exemplary aspect depicted in FIG. 25, modifying the first variable component of the wing relative to the second variable component of the wing at (402) instead includes modifying variable features of the wing configured to effectively increase or decrease an efficiency of the first and second portions of the plurality vertical thrust electric fans, and more particularly, modifying the variable features of the wing configured to increase or decrease a power loading of the first and second portions of the plurality vertical thrust electric fans.

More specifically, still, for the exemplary aspect depicted, the first variable component is a first diffusion assembly and the second variable component is a second diffusion assembly. The first and second diffusion assemblies may have any suitable configuration for being operable relative to one another. For example, in certain exemplary aspects, the exemplary method 400 may be utilized with a diffusion assembly configured in a similar manner as the exemplary diffusion assembly 126 described above with reference to FIG. 9 (e.g., embodiments wherein the forward partial wing assembly includes a plurality of forward partial wing assemblies sequentially spaced along a lengthwise direction of the aft starboard wing); as the exemplary diffusion assembly 126 described above with reference to FIGS. 10 through 13 (e.g., embodiments wherein first members of forward and aft partial wing assemblies include a plurality of first member segments spaced sequentially along a lengthwise direction of the aft starboard wing); or as the exemplary diffusion assembly 126 described above with reference to FIGS. 14 through 17. Alternatively, however, the diffusion assembly 126 may be configured in accordance with any other suitable embodiment.

Referring back to the exemplary aspect shown in FIG. 25, it will be appreciated that for the exemplary aspect depicted, modifying the first variable component relative to the second variable component at (402) includes at (404) positioning the first diffusion assembly in an extended position, and at (406) positioning the second diffusion assembly in a retracted position. Additionally, for the exemplary aspect of the method 400 depicted in FIG. 25, modifying the first variable component relative to the second variable component at (402) further includes at (408) modifying a diffusion area ratio of the first diffusion assembly relative to a diffusion area ratio of the second diffusion assembly. Notably, modifying the diffusion area ratio of the first portion of the plurality of vertical thrust electric fans relative to the diffusion area ratio of the second portion of the plurality of vertical thrust electric fans at (408) will additionally (assuming certain other conditions are remaining constant) modify a power loading of the first portion of the plurality of vertical thrust electric fans relative to a power loading of the second portion of the plurality of vertical thrust electric fans.

It will be appreciated that operating a vertical takeoff and landing aircraft in accordance with one or more of the exemplary aspects of the exemplary method 400 may allow for an increased degree of handling of the aircraft by being able to more precisely control an amount of thrust generated by the various portions of the plurality of vertical thrust electric fans arranged along a length of the wing of the aircraft.

Notably, as with the exemplary aspect described above with reference to FIG. 24, in certain exemplary aspects of the method 400 depicted in FIG. 25, the wing may be a starboard wing, and the plurality of vertical thrust electric fans may be a first plurality of vertical thrust electric fans of the propulsion system. With such an exemplary aspect, the aircraft may further include a port wing also extending from the fuselage and the propulsion system may further include a second plurality of vertical thrust electric fans arranged along the port wing. With such an exemplary aspect, the method 400 may further include, as is depicted in phantom, at (410) modifying a first variable component of the port wing associated with a first portion of the second plurality of vertical thrust electric fans relative to a second variable component of the port wing associated with the second portion of the second plurality of vertical thrust electric fans to adjust an effective thrust profile of the first portion of the second plurality vertical thrust electric fans relative to an effective thrust profile of the second portion of the second plurality vertical thrust electric fans.

In certain exemplary aspects, modifying the first variable component of the port wing relative to the second variable component of the port wing at (410) may additionally include at (412) modifying the first variable component of the port wing relative to the second variable component of the port wing in conjunction with modifying at (402) the first variable component of the starboard wing relative to the second variable component of the starboard wing. For example, the method 400 may coordinate these modifications such that the thrust profiles of the first and second portions of the first plurality of vertical thrust electric fans is substantially equal to the thrust profiles of the first and second portions of the second plurality of vertical thrust electric fans. Alternatively, the method may coordinate these modifications such that the thrust profiles of the first and second portions of the first plurality of vertical thrust electric fans is higher than or lower than the thrust profiles of the first and second portions of the second plurality vertical thrust electric fans in order to effectuate a maneuver of the aircraft (e.g., to bank towards a starboard side of the aircraft, or alternatively, to bank towards a port side of the aircraft).

Further, it will be appreciated that in at least certain exemplary embodiments, the aircraft may include more than two wings with VTE fans attached thereto or integrated therein. For example, in at least certain exemplary aspects, the starboard wing may be an aft starboard wing and the port wing may be an aft port wing. With such an exemplary aspect, the aircraft may further include a forward starboard wing and a forward port wing, each also extending from the fuselage at locations forward of the aft starboard wing and aft port wing. Further, with such a configuration, the propulsion system may further include a third plurality of vertical thrust electric fans (or at least one vertical thrust electric fan) arranged along the forward starboard wing, and a fourth plurality of vertical thrust electric fans (or at least one vertical thrust electric fan) arranged along the forward port wing. The forward port and starboard wings may include variable geometry components similar to the aft port and starboard wings. In such a manner, the method 400 may further include modifying a first variable geometry component of a forward wing (e.g., forward port or starboard wing) relative to a second variable geometry component of the respective forward wing to adjust an effective thrust profile a first portion of the respective plurality of vertical thrust electric fans relative to a second portion of the respective plurality of vertical thrust electric fans. Further, such a modification of the variable geometry components of the forward port or starboard wing may be in conjunction with a modification of the variable geometry components of the aft port or starboard wing (similar to the modifications made at (412) between the port and starboard aft wings). Such may facilitate further maneuvering of the aircraft (e.g., nose up/pulling back, nose down/diving, etc.).

Notably, however, it will be appreciated that in other exemplary aspects the present disclosure, any other suitable method may be provided for operating a vertical takeoff and landing aircraft in accordance with one or more exemplary embodiments of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a vertical takeoff and landing aircraft, the aircraft comprising a fuselage, a wing extending from the fuselage, and a propulsion system having a plurality of vertical thrust electric fans arranged along the wing, the method comprising:
   modifying a first variable component of the wing associated with a first portion of the plurality of vertical thrust electric fans relative to a second variable component of the wing associated with a second portion of the plurality of vertical thrust electric fans to adjust an exposure ratio of the first portion of the plurality of vertical thrust electric fans relative to the second portion of the plurality of vertical thrust electric fans, wherein the first variable component and the second variable component each include first and second partial wing assemblies that translate in opposing directions to define a respective exposure area therebetween.

2. The method of claim 1, wherein modifying the first variable component relative to the second variable component comprises positioning the first variable component in a forward thrust position.

3. The method of claim 2, wherein positioning the first variable component in the forward thrust position comprises substantially completely enclosing the first portion of the plurality of vertical thrust electric fans.

4. The method of claim 2, wherein modifying the first variable component relative to the second variable component further comprises positioning the second variable component in a vertical thrust position to define a diffusion area ratio, wherein the diffusion area ratio is greater than 1:1.

5. The method of claim 4, wherein positioning the second variable component in the vertical thrust position comprises substantially completely exposing the second portion of the plurality of vertical thrust electric fans in the wing.

6. The method of claim 4, further comprising:
   providing the first portion of the plurality of vertical thrust electric fans with a first amount of electrical power and providing the second portion of the plurality of vertical thrust electric fans with a second amount of electrical power, and wherein the first amount of electrical power is less than the second amount of electrical power.

7. The method of claim 1, wherein modifying the first variable component relative to the second variable component comprises positioning the first variable component in a middle position, and wherein positioning the first variable component in the middle position comprises partially exposing the first portion of the plurality of vertical thrust electric fans and partially enclosing the first portion of the plurality of vertical thrust electric fans.

8. The method of claim 1, wherein the first variable component is spaced from the second variable component along a length of the wing.

9. The method of claim 1, wherein each of the plurality of vertical thrust electric fans are fixed in orientation within the wing and arranged substantially linearly along the length of the wing.

10. The method of claim 1, wherein the first variable component of the wing is a first partial wing assembly, wherein the second variable component of the wing is a second partial wing assembly.

11. The method of claim 1, wherein the wing is a starboard wing, wherein the plurality of vertical thrust electric fans is a first plurality of vertical thrust electric fans, wherein the aircraft further comprises a port wing extending from the fuselage, wherein the propulsion system includes a second plurality of vertical thrust electric fans arranged along the port wing, and wherein the method further comprises:
   modifying a first variable component of the port wing associated with a first portion of the second plurality of vertical thrust electric fans relative to a second variable component of the port wing associated with a second portion of the second plurality of vertical thrust electric fans to adjust an exposure ratio of the first portion of the second plurality of vertical thrust electric fans relative to the second portion of the second plurality of vertical thrust electric fans.

12. A method for operating a vertical takeoff and landing aircraft, the aircraft comprising a fuselage, a wing extending from the fuselage, and a propulsion system having a plurality of vertical thrust electric fans arranged along the wing, the method comprising:

modifying a first diffusion assembly of the wing associated with a first portion of the plurality of vertical thrust electric fans relative to a second diffusion assembly of the wing associated with a second portion of the plurality of vertical thrust electric fans to adjust an effective thrust profile of the first portion of the plurality of vertical thrust electric fans relative to an effective thrust profile of the second portion of the plurality of vertical thrust electric fans, wherein modifying the first variable component relative to the second variable component comprises positioning the first diffusion assembly in an extended position to define a diffusion area ratio is greater than 1:1.

13. The method of claim 12, wherein modifying the first diffusion assembly relative to the second diffusion assembly further comprises positioning the second diffusion assembly in a retracted position.

14. The method of claim 12, wherein modifying the first diffusion assembly relative to the second diffusion assembly comprises modifying a diffusion area ratio of the first diffusion assembly relative to a diffusion area ratio of the second diffusion assembly.

15. The method of claim 12, wherein the first variable component is spaced from the second variable component along a length of the wing.

16. The method of claim 12, wherein each of the plurality of vertical thrust electric fans are fixed in orientation within the wing and arranged substantially linearly along the length of the wing.

17. The method of claim 12, wherein the first variable component of the wing is a first partial wing assembly, wherein the second variable component of the wing is a second partial wing assembly.

18. An aircraft defining a vertical direction comprising:

a fuselage;

a propulsion system comprising a power source, a first pair of vertical thrust electric fans driven by the power source, and a second pair of vertical thrust electric fans driven by the power source;

a port wing extending from the fuselage, the first pair of vertical thrust electric fans arranged along a length of the port wing, the port wing comprising a first variable component including a forward partial wing assembly and aft partial wing assembly extending over each of the first pair of vertical thrust electric fans; and a starboard wing extending from the fuselage, the second pair of vertical thrust electric fans arranged along a length of the starboard wing, the port starboard comprising a second variable component including a forward partial wing assembly and aft partial wing assembly extending over each of second pair of vertical thrust electric fans; the first variable component moveable relative to the second variable component to adjust an exposure ratio of the first portion of the plurality of vertical thrust electric fans relative to the second portion of the plurality of vertical thrust electric fans.

* * * * *